(12) United States Patent
Hattori et al.

(10) Patent No.: US 6,570,667 B1
(45) Date of Patent: May 27, 2003

(54) IMAGE PROCESSING DEVICE

(75) Inventors: Yuji Hattori, Nagoya (JP); Yoshinori Endo, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 09/233,092

(22) Filed: Jan. 19, 1999

(30) Foreign Application Priority Data

Jan. 19, 1998 (JP) .......................................... 10-021475
Jan. 19, 1998 (JP) .......................................... 10-021476
Jan. 19, 1998 (JP) .......................................... 10-021477
Jan. 19, 1998 (JP) .......................................... 10-021478

(51) Int. Cl.$^7$ ............................................. G06F 13/00
(52) U.S. Cl. .................. 358/1.15; 358/401; 358/444; 358/468
(58) Field of Search ................. 358/401, 296, 358/404, 442, 444, 468, 1.15, 1.6, 1.13, 1.14, 1.16

(56) References Cited

U.S. PATENT DOCUMENTS 5,454,066 A * 9/1995 Tsai ............................... 399/2
5,663,805 A  9/1997 Asai ............................ 358/404

FOREIGN PATENT DOCUMENTS

JP    A-9-312743    12/1997

* cited by examiner

Primary Examiner—Mark Wallerson
(74) Attorney, Agent, or Firm—Oliff & Berridge, PLC

(57) ABSTRACT

PCMCIA slots are provided to a printer. When a fax modem card is mounted in the PCMCIA slot, a variety of settings are performed to enable the printer to execute a fax function in addition to its original printing function. More specifically, a fax data area is secured in a memory region. Then, fax control interrupt routine operation, fax panel display, and fax command reception are enabled. Contrarily, when no fax modem card is mounted in the PCMCIA slot, the memory region is used entirely for storing print data. Settings of wasteful functions, such as the fax control interrupt operations, which can lead to system errors are not performed.

39 Claims, 26 Drawing Sheets

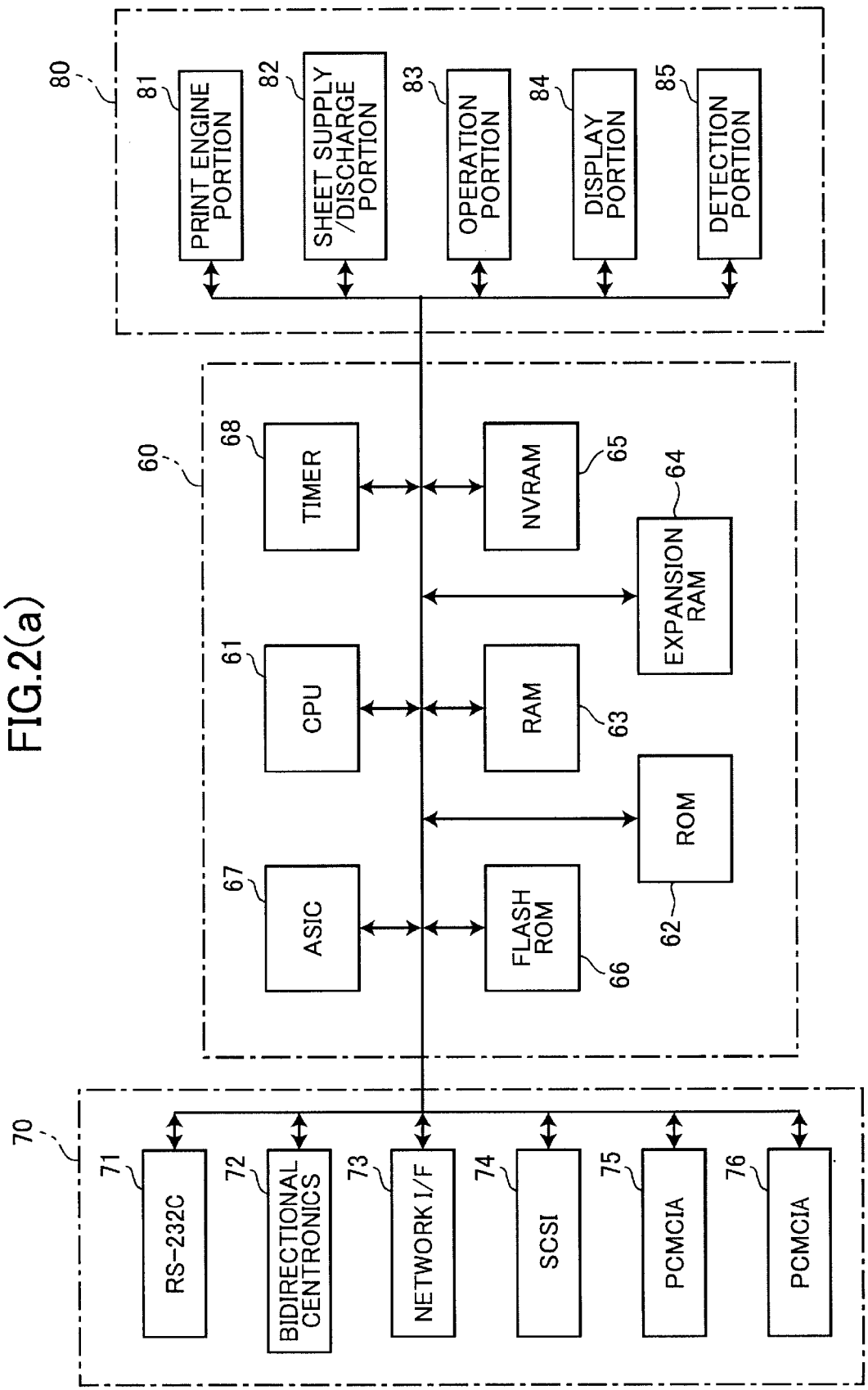

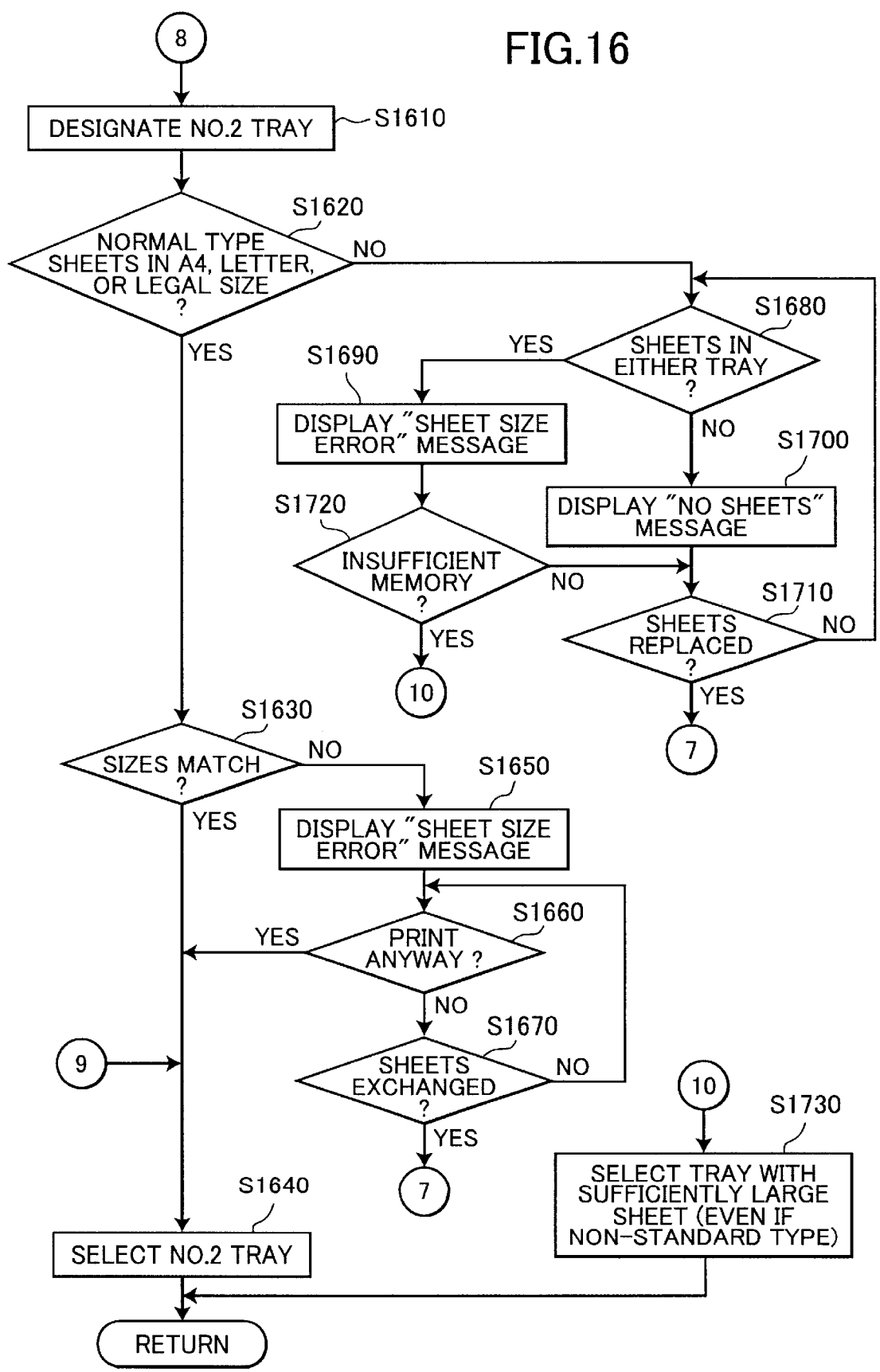

IMAGE PROCESSING DEVICE

BACKGROUND OF THE INVENTION

1. Field of the Invention

The present invention relates to an image processing device, such as an image scanner, a printer, and a printer with an image scanner, that is capable of processing image information to input or output image information.

2. Description of Related Art

In recent years, a variety of application software are available for performing fax transmission using a personal computer. When performing fax transmission using a fax transmission application software installed in a personal computer, a fax modem card is mounted in the personal computer. Or, a personal computer is provided with an internal fax modem. Then, fax transmission is performed using the personal computer by connecting the fax modem to a public telephone network.

When performing fax transmission with a fax modem mounted in the personal computer, fax data received from an external source can be displayed on the screen of the personal computer. The user designates information he or she wishes to print out on paper. Then, a printer, connected to the personal computer, is driven accordingly, so that only the information required is outputted on the paper. This configuration is convenient.

When the fax modem is thus connected to a personal computer to perform fax transmission, text data prepared by using, for example, word processing software installed in the personal computer can be transmitted to a remote device through using the fax transmission application software. It is unnecessary to print out the text data. This is also convenient.

SUMMARY OF THE INVENTION

However, when a plurality of fax data sets are received and the user wishes to print out those plural fax data sets, the user has to designate each fax message that he or she wishes to print out, and to input his/her instruction to print out. This operation is troublesome.

It takes a long time to transmit a fax message to a remote device. Therefore, either the personal computer can not be used during this time for other operations or else the processing speed of other application software is reduced.

In order to transmit, to a remote device, Information that is printed out on a paper, first the user has to retrieve information printed on the sheet using an image scanner connected to the personal computer. The information is then transmitted to the personal computer. The fax transmission application software is then started up to convert the information into a fax transmission format and then to transmit it to the remote device. Because all these processes are required, operations are troublesome.

As a method for solving the above-described problems, it is conceivable to provide a device exclusively for fax transmission, a device including fax function and a copy function, or a device including a print function in addition to a fax function and a copy function.

Such a configuration is, however, not well suited for small offices because the configuration is expensive and the user has to provide a large space to place the device. Additionally, in order to manufacture each device, a manufacturer has to provide a fax modem that meets the communication standards of each country in which each device is to be used.

It is therefore an objective of the present invention to provide an image processing device that can process image information and additionally perform fax communication operation and that can be manufactured without taking communication standards of different countries into considerations.

In order to attain the above and other objects, the present invention enables an image processing device, such as an image scanner, a printer, or a printer including an image scanner, that is often used in small offices, to additionally perform fax communication while not taking into account communication standards of different countries.

That is, the present invention provides an image processing device, comprising: means for processing an image according to an original image processing function; an interface detachably mounted with a facsimile image communication unit; and means for adding a facsimile communication function to the image processing means when the facsimile image communication unit is mounted to the interface.

The function adding means may include means for pre-storing a facsimile function adding program for adding the facsimile communication function to the image processing means.

When the facsimile image communication unit, such as a facsimile modem card, is mounted to the interface, the facsimile function adding program may be validated, and may add the facsimile communication function to the original image processing function.

The image processing means may include means for printing print data, the function adding means enabling the printing means to print facsimile data received from outside via the facsimile communication unit. It becomes unnecessary for a user to input his/her print instruction onto the received facsimile data.

That is, when the image processing device is a printer, for example, when the printer receives fax data from a remote device, the printer can immediately produce a print output with using its own printing function. It is unnecessary for a user to input a printing command to the image processing device contrary to the system where the fax modem is attached to a personal computer.

When the image processing device is an image scanner, the image processing means retrieves information from images on original documents. The function adding means enables the image scanner to directly transmit the retrieved information to remote devices. It is unnecessary to transfer the retrieved information to a personal computer.

The image processing device is unnecessarily provided with the FAX modem originally. Accordingly, when producing the image processing device, it is unnecessary to mount each device with a FAX modem that is appropriate for the FAX communication standard of a corresponding country. In each country, a FAX modem card or the like, appropriate for the FAX communication standard of the subject country, is easily available. When the user of the image processing device desires to achieve FAX communication with using the image processing device, the user can easily purchase a FAX modem card or the like available in his/her own country and set the FAX modem card to the interface of the image processing device. Through this simple operation, the user can obtain a FAX communication device that suits the communication standard of his/her own country.

Especially when the image processing device is a printer located in an office environment, the user can mount the FAX modem to his/her own personal computer at day time and uses the image processing device as a printer. When leaving the office to go home, the user detaches the FAX modem from the personal computer and then mounts it to the printer so that the printer can serve as a facsimile machine for receiving fax data transmitted from remote devices at night. When coming the office next morning, the user can obtain a print output of the received fax data. When the image processing device is used in this manner, the user can perform FAX processes at day time through observing FAX data on the personal computer screen if he/she does not desire to retain a print output of the FAX data. When a number of FAX data sets are received at night, the user can obtain print outputs of the FAX data without performing any control operation. It is unnecessary for the user to input his/her instruction to print the FAX data.

The image processing device may further comprise means for judging whether or not the facsimile communication unit is mounted to the interface, the function adding means includes means for setting the image processing means into a facsimile communication enabling state capable of performing facsimile communication when the facsimile communication unit is judged to be mounted to the interface.

A program required to set the image processing means into the facsimile communication enabling state may be prestored in the image processing device. Alternatively, the program may be written in the image processing device using a data transferring function of a personal computer.

When the facsimile communication unit such as a FAX modem card is mounted to the interface and the judging means judges that the facsimile communication unit is mounted to the interface, the image processing device is set to a condition that is capable of performing facsimile communication function in addition to its original image processing function.

The interface may include a general use interface. The communication unit, such as a facsimile modem card, that can be mounted to a general use interface, such as a PCMCIA slot and a RS-232C interface, is cheap and is therefore easily available by the user. Because the general use interface is provided to many personal computers, the communication unit may be easily mounted to the personal computer at day time and then be mounted to the image processing device at night.

The interface may include a PCMCIA slot, and the communication unit may include a facsimile modem card. It is easily determine whether the card, mounted to the PCMCIA slot, is a facsimile modem card or not. It is possible to perform the determination simply through retrieving card information from the mounted card.

In order to mount the FAX modem card to the personal computer at day time and to the printer at night, the personal computer and the printer may preferably be connected with another general use interface such as a RS-232C interface or a bi-directional Centronics interface. It becomes sufficient that the user alternately mounts the FAX modem card to the PCMCIA slot of the printer and to the PCMCIA slot of the personal computer.

The judging means may automatically judge whether or not the facsimile communication unit is mounted to the interface. When the user mounts the facsimile communication unit to the interface, the device can be automatically set to the facsimile communication enabling state. It is sufficient that the user mounts the facsimile communication unit to the interface. It is unnecessary for the user to perform other operations.

It is noted that when the interface is comprised of an RS-232C interface, the judging means may output an AT command to the interface. The judging means determines that the facsimile modem is mounted to the interface when a response to the AT command is received. When the RS-232C interface is connected to a personal computer, however, the AT command will be stored in the personal computer. When the judging means repeatedly outputs the AT command, the personal computer will be accumulated with the AT command in vain. The personal computer may possibly hung up according to its type. In order to solve this problem, it may be preferable that the judging means judge whether or not the facsimile communication unit is mounted to the interface when a judging command is inputted from outside. The image processing device may be provided with an operation panel that is formed with a manipulation switch enabling a user to input his/her instruction to perform the judging operation. Or, the instruction can be inputted from a personal computer connected to the image processing device.

The image processing device may further comprise a storage area capable of storing data, wherein the setting means may include means for setting, in the storage area, a memory region for being used for facsimile communication.

With this structure, only when the device is set to the facsimile communication enabling state, the memory region, required to perform the facsimile communication, is secured in the storage area. When the facsimile communication unit is not mounted to the device, no memory for facsimile communication is secured in the storage area. Accordingly, the entire storage area can be used for the original processing function. Thus, according to the user's desire, the original function of the image processing device can be achieved at maximum, and when necessary, the facsimile communication function can be properly added. This is contrary to the case where the memory region for the facsimile function is originally set in the storage area. If the user uses only the original function of the image processing device, the memory region for the facsimile function will not be used in vain.

The image processing device may further comprise means for prestoring a program of a facsimile control interrupt process, wherein the setting means may include means for executing the program of the facsimile control interrupt process. Only after the facsimile communication unit is mounted to the interface, the facsimile control interrupt process program is started being executed. When the facsimile communication unit is not mounted to the interface, the facsimile control interrupt process program is not executed. Accordingly, when the image processing device is used for performing its original function only, the interrupt routine, that is unnecessary for the original function, is not executed. It is possible to prevent the operating speed of the image processing device from being deteriorated.

The image processing device may further comprise means for displaying messages, wherein the setting means may include means for controlling the display means to display not only a message for the original function but also a message for the facsimile communication function. When the facsimile communication unit is not mounted to the device, a message relating to the facsimile communication is not displayed. Accordingly, when the device is used for its original function only, unnecessary messages are not displayed.

The image processing device may further comprise means connected to an external device and capable of receiving commands from the external device, wherein the setting means may include means for controlling the command receiving means into a state capable of receiving a facsimile communication command from the external device.

When the facsimile communication unit is not mounted to the device, even when the facsimile communication command is outputted from the external device, the device will not receive the command. Only after the facsimile communication unit is mounted to the device, the device can receive the facsimile communication command. If the device receives the facsimile communication command when the device is not set for performing the facsimile communication function, a system error will possibly occur.

The image processing device may further comprise: means for interpreting whether a command received from the external device is either a command for the original function or a facsimile communication function; and means for switching, based on the interpreted result, the image processing means to perform the original function and to perform the facsimile communication function.

When the external device, such as a personal computer, transmits data to the image processing device, the external device may add, in front of the data, a command instructing which of the functions should be executed to process the data. The command and the data is then outputted to the image processing device. With this structure, when the image processing device is provided in connection with a local area network and when the image processing device is a printer, data for printing and data for facsimile communication can be processed by a single common server provided in the local area network. It is unnecessary to provide an additional server for the facsimile communication operation.

The image processing device may further comprise: means for Inputting a reset command; and means for executing different resetting processes onto data, stored in the storage area, for being processed by the original function and data, stored in the storage area, for being processed by the facsimile communication function.

When the image processing device is a printer, for example, when a system error or the like occurs to the printer and the printer prints meaning less characters, a user can input a reset command to the printer. In this case, reception data presently stored in the memory area for the facsimile communication function can be subjected to a reset process different from that effected onto reception data (print data, in this example) presently stored in the memory area for the original function. Accordingly, even when it is necessary for the printer system to clear the data for printing, the properly-received FAX transmission data may not be cleared. It is possible to prevent the properly-received FAX transmission data from being cleared in vain.

The reset execution means may include: means for clearing the data for being processed by the original function; and means for clearing transmission data for being processed by the facsimile function when the transmission data is being received when the reset command is inputted and for maintaining the transmission data for being processed by the facsimile function when the transmission data is already stored in the storage area when the reset command is inputted.

With this construction, FAX transmission data that is being in the middle of reception is cleared by the reset command. However, already-received FAX data will be retained. Accordingly, the reset operation can be immediately executed to return the image processing device into its proper condition. Still, the properly-received FAX transmission data is prevented from being cleared.

The reset execution means may further include means for performing an error process to notify an error to outside when the clearing means clears the transmission data in response to the reset command. When FAX transmission data is cleared in the middle of its reception, the image processing device may notify an external device, such as a personal computer, as an error notification indicating that the FAX transmission data is cleared. Accordingly, it is possible to prevent a problem from occurring even when the image processing device is used by a plurality of people. There is a possibility that while some person controls his/her own personal computer to output FAX transmission data to the image processing device, another person inputs a reset command to the image processing device to clear the FAX transmission data. Even in this case, the user that has outputted the FAX transmission data is certainly informed that the data is cleared.

The reset execution means may include means for continuing receiving transmission data for being processed by the facsimile function when the transmission data is being received when the reset command is inputted and for maintaining the transmission data after the reception is completed, and for disabling reception of other transmission data to be received after the transmission data and for clearing data for being processed by the original function.

When some person is outputting FAX transmission data when another person resets the image processing device, the image processing device will completely receive the FAX transmission data and will maintain the FAX transmission data. Then, the image processing device is disabled to receive FAX transmission data from other persons. Various settings for the original function is then reset. It becomes unnecessary to perform the error notification operation. Still, the reset operation can be performed immediately after the FAX transmission data is completely received. It is possible to allow the image processing device to immediately return to the proper condition, without losing the FAX transmission data.

The image processing device may further comprise: means capable of displaying a message; and means for controlling the display means to display a warning screen to inform a user that the facsimile communication is being performed. The warning screen can prevent the user from erroneously turning off a power of the image processing device while the image processing device performs facsimile receiving/transmitting operation.

The control means may control the display means to stop displaying the warning screen when the user operates an operation panel. While the user manipulates the operation panel, the operation panel does not display the warning screen in addition to a screen for the manipulation. The user can easily manipulate the operation panel. Generally, before manipulating the operation panel, the user watches the warning screen on the operation panel and knows that the image processing device is now performing the facsimile communication operation. Accordingly, the user will not turn off the power.

The image processing means may include means for printing print data, the function adding means enabling the printing means to print facsimile data received from outside via the facsimile communication unit. The image processing device may further comprise: means capable of receiving print data to be printed and facsimile data to be printed; and a storage area having a print data memory region capable of storing the received print data to be printed, wherein the function adding means may include means for forming, in the storage area, a facsimile data memory region capable of storing the facsimile data to be printed.

The image processing device may further comprise: first facsimile data control means for, while the reception means receives the facsimile data, controlling the printing means not to start printing facsimile data and to store the facsimile data in the facsimile data memory region, while enabling the reception means to receive a print request for print data until the reception means completes receiving the facsimile data; second facsimile data control means for, when the reception means completes receiving the facsimile data and when printing of print data is not yet started, controlling the printing means to start printing the facsimile data stored in the facsimile data memory region, and for prohibiting an interruption by a print request for print data until printing of the facsimile data is completed; and print data control means for storing print data to the print data memory region while interruption by the print request is prohibited by the second facsimile data control means and for, when the interruption by the print request is not prohibited, controlling the printing means to print print data while prohibiting the printing means from printing facsimile data until printing of the print data is completed.

While FAX data is being received, printing of the FAX data is not started until reception of the FAX data is completed. However, a printing request for the printer function can be received. When reception of the FAX data is completed, printing of the FAX data is started. Only during the printing of FAX data, interruption of a printing request for the printer function is disabled. Accordingly, even when FAX data is being received, until printing by the FAX function is started, printing by the printer function can be attained. It is possible to greatly shorten the period of time when printing is disabled by the printer function. Because printing interruption for print data is prohibited while FAX data is being printed, it is possible to prevent print outputs of FAX data from being mixed with print outputs of print data. When printing of print data by the printer function is started, printing of FAX data is prohibited until the printing of print data is completed. It is also possible to prevent print outputs of FAX data from being mixed with print outputs of print data.

The first facsimile data control means may include: means for judging, while facsimile data is being received, whether the amount of an empty area in the facsimile data memory region will become smaller than a predetermined amount and the facsimile data memory region will become a memory full condition; and means for, when the memory full condition is judged, prohibiting the interruption by the print data printing request, controlling the printing means to start printing the facsimile data stored in the facsimile data memory region, and enabling the interruption by the print data printing request when printing of the facsimile data is completed.

Even when FAX data is being received, if it is speculated that the memory region will become full when storage of the FAX data into the memory region is continued, the interruption by the print request for printer function is disabled, and printing of the FAX data stored in the memory region is started. When the printing of the FAX data is completed, the interrupt by the printing request for printing function is enabled. Accordingly, when the FAX reception error will possibly occur, the printer function is disabled and printing of the FAX data is started, thereby preventing FAX reception error by the memory full condition. It is still possible to prevent print outputs of FAX data from being mixed with print outputs of print data.

The image processing means may include means for printing print data, the function adding means enabling the printing means to print facsimile data received from outside via the facsimile communication unit. The image processing device may further comprise a storage area capable of storing data, the storage area having a predetermined common area, wherein the function adding means may include means for securing, in the storage area, a facsimile data memory region capable of storing the facsimile data to be printed. The image processing device may further comprise means for setting a page protect mode for securing, in the common area, an image region for developing one page's worth of print data as image data to be printed by the printing means; and means for controlling the printing means to print the facsimile data while turning off the page protect mode to the common area.

When printing is performed according to the FAX function, the page protect mode with respect to the common area is turned off. Accordingly, the common area or free area can be increased, and therefore a sufficiently large area can be secured for developing FAX data. In order to print FAX data, a well-known band process can be employed to develop FAX data into image data. FAX data is consecutively received lines one by one from the upper left end and therefore is appropriate for the band process. The band process does not require a large amount of area as an image region.

The control means may return the page protect mode to the original state after the printing means completes printing the facsimile data. Accordingly, when printing is executed according to the printer function, printing can be properly performed under the page protect mode.

The control means may include: means for storing data of conditions, on which the page protect mode is set by the page protect mode setting means; means for turning off the page protect mode after data of the page protect mode setting conditions is stored; means for controlling the printing means to print facsimile data after the page protect mode is turned off; and means for returning the page protect mode to the original state, according to the setting condition stored by the page protect mode setting condition storing means, after the printing of the facsimile data is completed.

In order to perform printing by the FAX function, the page protect mode setting condition is stored, and the pate protect mode is turned off. As a result, the common area or free area is increased, and FAX data printing operation is executed using the increased common area as a developing area. When the printing of FAX data is completed, the page protect mode is turned ON with respect to the common area according to the stored condition. Thus, when printing FAX data by the FAX function, the increased-sized common area can be used. When printing print data by the print function, the page protect mode can be properly used.

The image processing means may include means for printing print data, the function adding means enabling the printing means to print facsimile data received from outside via the facsimile communication unit. The image processing device may further comprise: a storage area capable of storing data, the storage area having a predetermined common area; and at least one interface capable of receiving facsimile data and print data, wherein the function adding means may include: means for securing, in the storage area, a facsimile data memory region capable of storing the facsimile data to be printed; and means for controlling the printing means to print the facsimile data, stored in the facsimile data memory region, while developing the facsimile data in the predetermined common area. The image processing device may further comprise: means for judging whether or not a sufficient empty area exists in the common area for developing the facsimile data; and means for, when it is judged that the sufficient empty area does not exist in the common area, bringing an interface, that is not presently receiving facsimile data, into a data reception disabled condition incapable of receiving any data.

When executing print process by the FAX function, it is judged whether or not a sufficient amount of empty area for developing FAX data exists in the common area or free area. When a sufficient empty area is not secured, interfaces, that are not presently receiving FAX data, is set to a busy state incapable of receiving FAX data. Any data for printing will not be inputted through the interfaces that are not receiving FAX data. The entire empty region in the common area can be used to develop the presently-receiving FAX data.

The image processing device may further comprise means for returning the interface, that has been brought into the data reception disabled condition, into a condition that can receive data when the Judging means judges that a sufficient empty area exists in the common area. When the sufficient empty area exists, the busy state of the interface is turned off. Thus, it is possible to sufficiently attain the printer function and also to prohibit reception of data other than FAX data when necessary.

The image processing means may include means for printing print data, the function adding means enabling the printing means to print facsimile data received from outside via the facsimile communication unit, wherein the printing means may include: at least one sheet feed tray each for storing a recording sheet; means capable of receiving print data from outside and capable of receiving facsimile data from the facsimile communication unit; and means capable of automatically feeding the recording sheet from each sheet feed tray and for printing the print data onto the recording sheet. The image processing device may further comprise: means for determining at least one of a size and a kind of the recording sheet stored in the at least one sheet feed tray; and means for prohibiting the sheet feeding and printing means from printing facsimile data when the facsimile data is received via the facsimile communication unit and at least one of the time when the determined size of the recording sheet is inappropriate for printing the facsimile data and the time when the determined kind of the recording sheet is not a normal sheet of paper.

The determining means may determine size of the recording sheet stored in the sheet feed tray, the prohibiting means prohibiting the sheet feeding and printing means from printing facsimile data when the receiving means receives the facsimile data and when the determined size of the recording sheet is inappropriate for printing the facsimile data. When the sheet stored in the sheet feed tray has a size inappropriate for printing FAX data, printing of FAX data is not executed. Accordingly, when the image processing device receives FAX data via the communication unit after someone locates a post card in the sheet feed tray, the FAX data will not be printed out on the post card. It is possible to prevent FAX data from being lost.

The determining means may determine kind of the recording sheet stored in the sheet feed tray, the prohibiting means prohibiting the sheet feeding and printing means from printing facsimile data when the receiving means receives the facsimile data and when the determined kind of the recording sheet is not a normal sheet of paper. When the sheet stored in the sheet feed tray is not a normal sheet of paper, printing of FAX data is not executed. Accordingly, when the image processing device receives FAX data via the communication unit after someone locates an overhead projector sheet in the sheet feed tray, the FAX data will not be printed out on the overhead projector sheet. It is possible to prevent waste of such an expensive sheet in vain.

The determining means may include: means for determining size of the recording sheet stored in the sheet feed tray; and means for determining kind of the recording sheet stored in the sheet feed tray, and wherein the prohibiting means may prohibit the sheet feeding and printing means from printing facsimile data when the determined kind of the recording sheet is not a normal sheet of paper even when the determined size of the recording sheet is appropriate for printing the facsimile data.

Accordingly, even when the sheet stored in the sheet feed tray has an appropriate size, if the sheet is not a normal sheet of paper, but is an overhead projector sheet, a thick sheet, a color sheet, or the like, printing of the FAX data is not executed. It is possible to prevent waste of expensive sheets in vain.

The image processing device may further comprise: means for, when print data is received by the receiving means, judging whether or not the determined sheet size is appropriate for printing the print data; and means for controlling, when it is judged that the determined size is appropriate for printing the print data, the sheet feeding and printing means to automatically feed the recording sheet from the sheet feed tray and to print the print data on the recording sheet, wherein the prohibiting means may prohibit the sheet feeding and printing means from printing facsimile data when the receiving means receives the facsimile data and when the determined kind of the recording sheet is not a normal sheet of paper even when it is judged that size of the recording sheet stored in the feed sheet tray is appropriate for printing the facsimile data.

A plurality of feed sheet trays may be provided to the image processing device. The image processing device may further comprise: means for designating a tray to be used for printing; and means for determining at least size and kind of the recording sheet stored in each feed sheet tray, wherein the prohibiting means may prohibit the sheet feeding and printing means from printing facsimile data when the receiving means receives the facsimile data and at least one of time when the determined size of the recording sheet stored in the designated feed sheet tray is inappropriate for printing the facsimile data and time when the determined kind of the recording sheet stored in the designated feed sheet tray is not a normal sheet of paper.

The determining means may include: means for determining size of the recording sheet stored in each sheet feed tray; and means for determining kind of the recording sheet stored in each sheet feed tray, and wherein the prohibiting means may prohibit the sheet feeding and printing means from printing facsimile data when the determined kind of the recording sheet in the designated sheet feed tray is not a normal sheet of paper even when the determined size of the recording sheet in the designated sheet feed tray is appropriate for printing the facsimile data.

The image processing device may further comprise: means for, when print data is received by the receiving means, judging whether or not the determined size of the sheet in the designated sheet feed tray is appropriate for printing the print data; and means for controlling, when it is judged that the determined size is appropriate for printing the print data, the sheet feeding and printing means to automatically feed the recording sheet from the designated sheet feed tray and to print the print data on the recording sheet, wherein the prohibiting means may prohibit the sheet feeding and printing means from printing facsimile data when the receiving means receives the facsimile data and when the determined kind of the recording sheet in the designated sheet feed tray is not a normal sheet of paper even when it is judged that size of the recording sheet stored in the designated feed sheet tray is appropriate for printing the facsimile data.

When the size of the designated sheet feed tray is inappropriate for printing, printing is not executed. Especially for printing FAX data, even when the size of the designated sheet feed tray is appropriate for printing, the printing is not executed onto sheets other than a normal sheet of paper. It is possible to prevent loss of FAX data and prevent printing of FAX data to sheets other than normal sheets of papers.

When a plurality of feed sheet trays are provided, the determining means may include: means for determining size of the recording sheet stored in each feed sheet tray; and means for determining kind of the recording sheet stored in each feed sheet tray. The image processing device may further comprise means for selecting a tray, to be used for printing print data, that has a recording sheet with a size consistent with print data received by the receiving means, wherein the prohibiting means may prohibit the sheet feeding and printing means from printing facsimile data when the receiving means receives the facsimile data, when the selecting means selects one feed sheet tray that has a recording sheet with a size appropriate for printing the facsimile data, and when the determined kind of the recording sheet stored in the selected feed sheet tray is not a normal sheet of paper.

When printing, a sheet feed tray storing a sheet having an appropriate size is automatically selected. When no sheet feed tray stores a sheet having an appropriate size, a tray selection is not executed. Especially for printing FAX data, even when a sheet feed tray storing a sheet having an appropriate size can be selected, the sheet feed tray stores a sheet other than a normal sheet of paper, printing is not executed. With this configuration, in order to print print data, a sheet of any kind can be used if the sheet has an appropriate size. On the other hand, in order to print FAX data, printing is executed only when a normal sheet of paper having an appropriate size can be used.

The image processing device may further comprise means for instructing a forced printing operation to the sheet feeding and printing means when the feeding and printing means is controlled not to perform printing operation due to inconsistency in size of the sheet with the print data and when some recording sheet is stored in the feed sheet tray, thereby printing print data onto a sheet with an inconsistent size; and means for prohibiting the forced printing instruction means from instructing the forced printing operation for the facsimile data.

Even when no tray stores a sheet with an appropriate size. print data can be compulsorily printed onto a sheet with an inappropriate size under the printer function. However, FAX data is not compulsorily printed onto a sheet with an inappropriate size under the FAX function. It is possible to prevent the FAX data, received from outside, from being printed out with losing its part.

The image processing device may further comprise means for instructing a forced printing operation to the sheet feeding and printing means when the feeding and printing means is controlled not to perform printing operation due to inconsistency in size of the sheet with the print data and when some recording sheet is stored in the designated feed sheet tray, thereby printing print data onto a sheet with an inconsistent size; and means for prohibiting the forced printing instruction means from instructing the forced printing operation for the facsimile data.

The image processing device may further comprise means for instructing a forced printing operation to the sheet feeding and printing means when the feeding and printing means is controlled not to perform printing operation due to inconsistency in size of the sheet with the print data and when some recording sheet is stored in at least one feed sheet tray, thereby selecting the feed sheet tray storing some recording sheet and printing print data onto the sheet with the inconsistent size; and means for prohibiting the forced printing instruction means from instructing the forced printing operation for the facsimile data.

The forced printing instruction prohibiting means may change a condition for selecting a sheet feed tray for the forced printing operation dependently on whether print data is to be printed or facsimile data is to be printed.

The forced printing instruction prohibiting means may enable the forced printing only when the determining means determines that some sheet feed tray stores a normal sheet of paper with a size printable by the facsimile data without losing any part from the facsimile data. The forced printing will not be executed onto sheets other than normal sheets of paper, such as overhead projector sheets, thick sheets, color sheets and the like even when those sheets have sufficiently large sizes for printing FAX data. The forced printing is executed onto normal sheets of paper having sufficiently large size for printing main body of FAX data without losing its any part.

For example, the forced printing can be executed only when some tray stores normal sheets of paper with A4 size, letter size, or legal size. Because FAX data can be received on a fixed A4 size and normally has blank portions at its upper, lower, left, and right sides. Accordingly, the main body of A4 sized FAX data will be entirely printed on a letter size normal paper without losing any parts of the FAX data main body.

The image processing device may further comprise: means for detecting a remaining amount of the facsimile data memory region; and means for, when the remaining amount is detected as too small to store facsimile data to be received via the facsimile unit and when the determining means determines that some feed sheet tray stores a recording sheet of paper that is not a normal sheet of paper but that has a size printable by the facsimile data without losing any part from a main body of the facsimile data, controlling the sheet feeding and printing means to automatically feed a recording sheet from the some feed sheet tray and to print the facsimile data on the recording sheet regardless of the forced printing instruction prohibiting means.

When it is judged that the memory area will become too small to store FAX data, FAX data will be compulsorily printed onto a recording sheet other than normal papers if the recording sheet has a sufficiently large size to entirely print the FAX data without losing any parts of the FAX data main body. It is possible to prevent FAX reception error from occurring due to a memory full condition.

BRIEF DESCRIPTION OF THE DRAWINGS

The above and other objects, features and advantages of the invention will become more apparent from reading the following description of the preferred embodiment taken in connection with the accompanying drawings in which:

FIG. 2(a) is a block diagram showing a control portion in a color laser printer provided in the system of the first embodiment;

FIG. 16 is a flowchart showing a remaining part of the process of S960;

FIG. 19(b) is a schematic view showing a state of a memory region when the page protect mode is being ON;

DETAILED DESCRIPTION OF THE PREFERRED EMBODIMENTS

Figure 1:
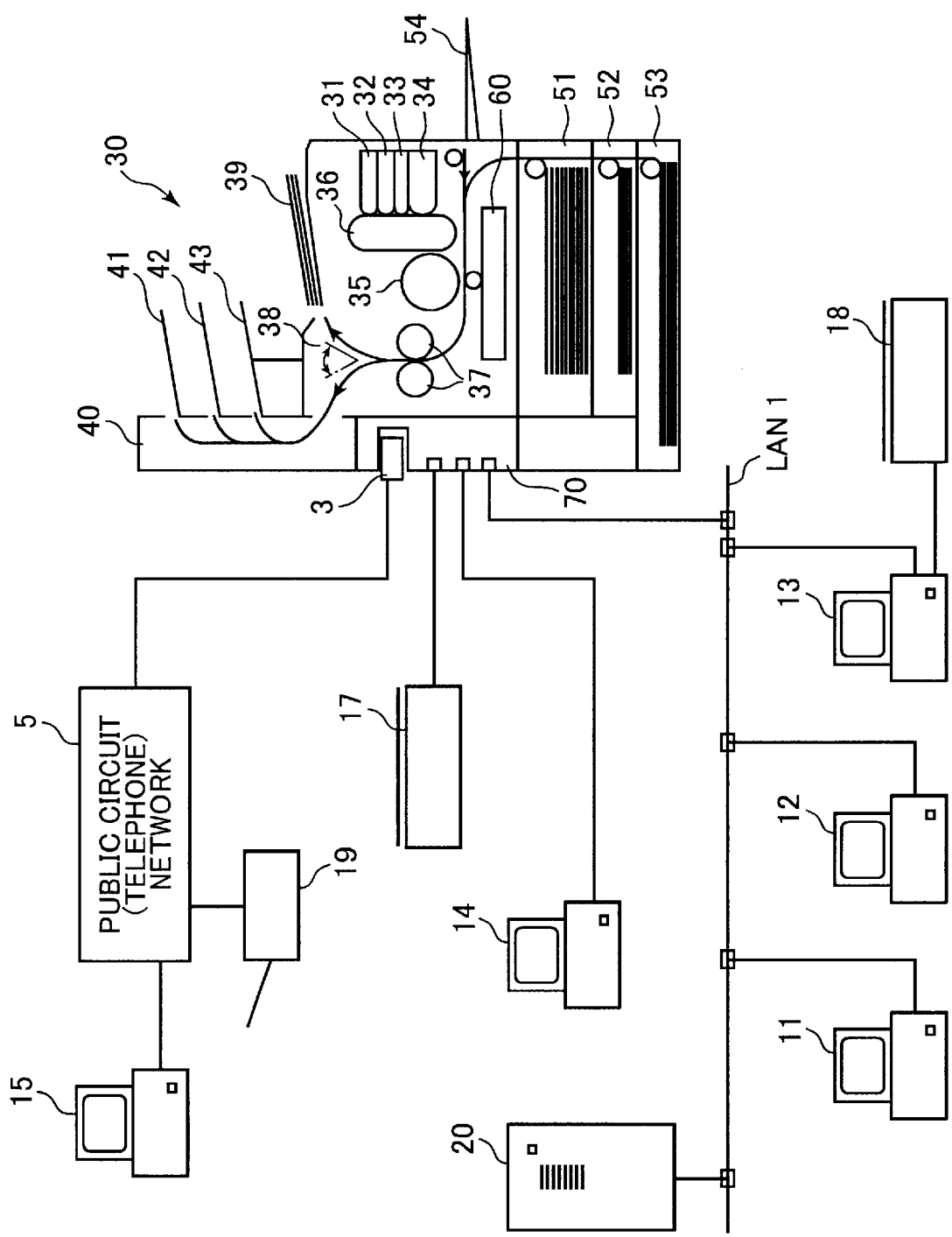
FIG. 1 is a schematic view of an entire system according to a first preferred embodiment of the present invention.

An image processing device according to preferred embodiments of the present invention will be described while referring to the accompanying drawings wherein like parts and components are designated by the same reference numerals to avoid duplicating description.

[First Embodiment]

A local area network provided with an image processing device according to a first embodiment of the present invention will be described below with reference to FIGS. 1–23.

First, an explanation will be provided for overall configuration of the local area network system according to the first embodiment of the present invention.

As shown in FIG. 1, the system according to the first embodiment includes a color laser printer 30, a plurality of personal computers 11 to 14, a server 20, image scanners 17, 18, and a local area network (LAN) 1. The color laser printer 30, the personal computers 11 to 13, and the server 20 are connected to the local area network (LAN) 1. The personal computer 14 and the image scanner 17 are directly connected to the color laser printer 30 without passing through the LAN 1.

The color laser printer 30 is mounted with a fax modem card 3, which is connected to a public network 5, such as a telephone network. The printer 30 is capable of transmitting facsimile messages to a remote personal computer 15 or a remote facsimile machine 19 over the public telephone network 5 using the fax modem card 3. The facsimile machine 19 and the personal computer 15 include internal modems connected to the public telephone network 5. At least one of the personal computers 11 to 13 (13, in this example) that are connected to the LAN 1 is connected to an image scanner 18.

In order to perform color printing, the color laser printer 30 is provided with a Y station 31 storing a yellow toner, an M station 32 storing magenta toner, a C station 33 storing cyan toner, and a K station 34 storing black toner. Also, the color laser printer 30 includes an intermediate transfer belt 36, a transfer drum 35, a pair of fixing rollers 37, a sheet discharge switching mechanism 38. The intermediate transfer belt 36 is for transferring toner from the stations 31 to 34 to the transfer drum 35. The sheet discharge switching mechanism 38 is for switching discharge of printed sheets to either a normal sheet discharge stacker 39 on the top of the main body or to sheet discharge stackers 41 to 43 of a sorter portion 40. Although not shown in the drawings, the sorter portion 40 includes a stacker switching mechanism and a sheet discharge sensor. The stacker switching mechanism is for discharging sheets onto one of the sheet discharge stackers 41 to 43 during sorter output. The sheet discharge sensor is provided near the output port of each stacker 41 to 43.

The color laser printer 30 is provided with No. 1 to No. 2 trays 51 to 52. A No. 3 tray 53 may be additionally provided as shown in FIG. 1. A manual feed tray 54 is provided at the front surface of the main body. The trays 51 to 53 and the manual feed tray 54 serve as sheet supply mechanisms. Normally, the No. 1 tray 51 is filled with A4 size normal sheets of paper, the No. 2 tray 52 is filled with overhead projector (OHP) sheets for printing documents used in an overhead projector, and the No. 3 tray 53 is filled with A3 size normal sheets of paper.

Figure 2B:
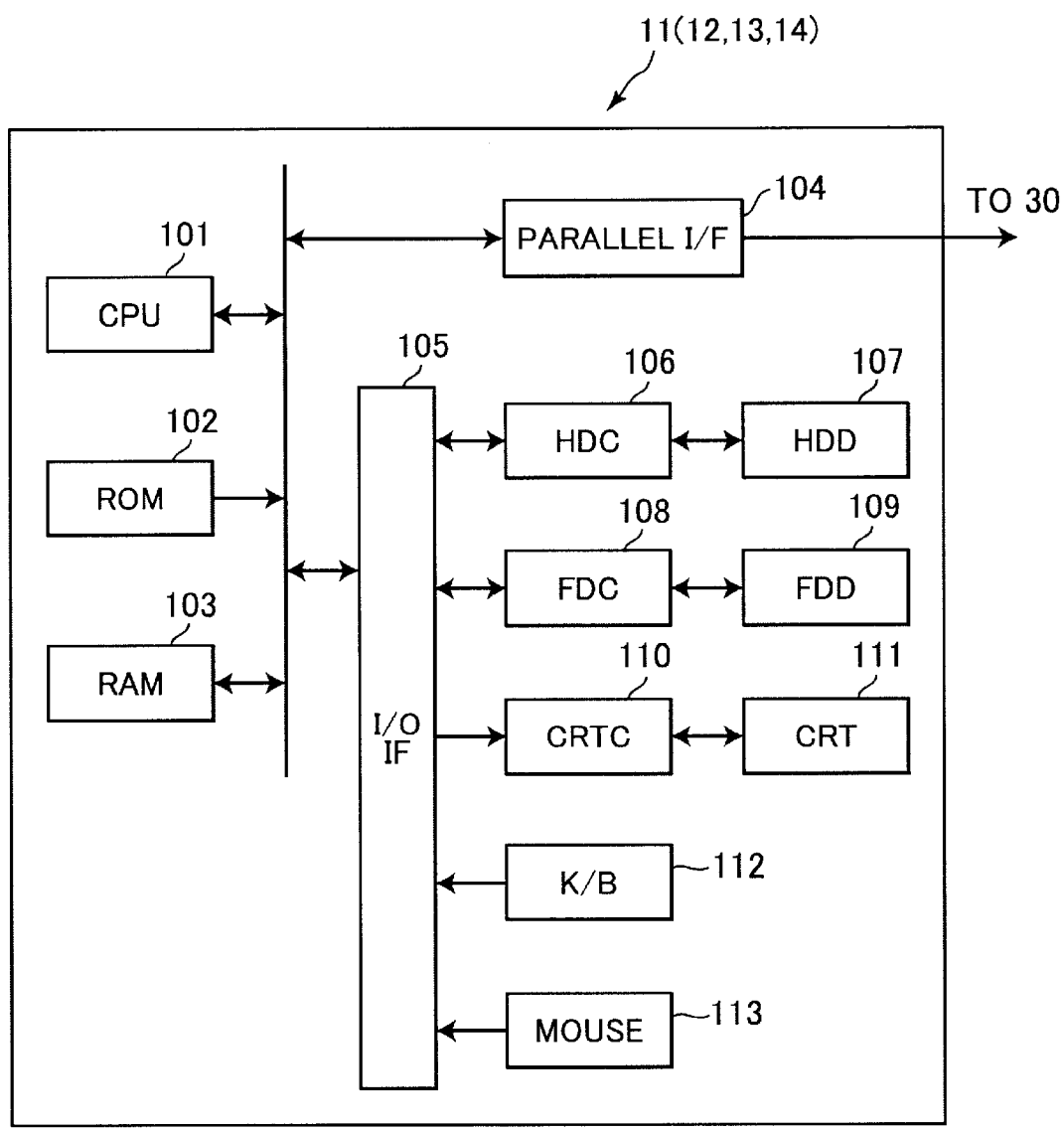
FIG. 2(b) is a block diagram showing a control portion in each personal computer provided in the system of the first embodiment.

FIG. 2(*a*) is a block diagram showing electrical configuration of the color laser printer 30. As shown in FIG. 2, the color laser printer 30 is configured mainly from a control portion 60, an interface portion 70, and a mechanism portion 80. As shown in FIG. 1, the control portion 60 for controlling drive of the color laser printer 30 is provided in the center of the printer's main body. The interface portion 70 for mounting the fax modem card 3 and the like is provided to the rear surface of the main body.

Returning to FIG. 2, the control portion 60 includes a CPU 61, a ROM 62, a RAM 63, an expansion RAM 64, a NVRAM 65, a flash ROM 66, an ASIC 67, and a timer 68. The CPU 61 is the core of the control portion 60 and executes computation processes for realizing a variety of functions of the color laser printer 30. The ROM 62 is prestored with data, such as font data and a variety of programs executed by the CPU 61. The RAM 63 and the expansion RAM 64 are used as data storage regions and work memory used by the CPU 61 when executing a variety of computation processes. The NVRAM 65 is a non-volatile RAM for storing a variety of independent settings which are optionally set by the user.

The flash ROM 66 can be used to store data, such as form and font data and a variety of programs. For example, programs and the like added, for example, when upgrading the version of a program, can be written in the flash ROM 66 while the flash ROM 66 is mounted in the main body. In this way, the data in the flash ROM 66 can be maintained even after the main body power is turned off. The ASIC 67 is an application specified IC and executes processes using hardware logic, without relying on the CPU 61. The timer 68 is used for setting interrupt timing of a variety of computation processes to be described later.

Figure 3:
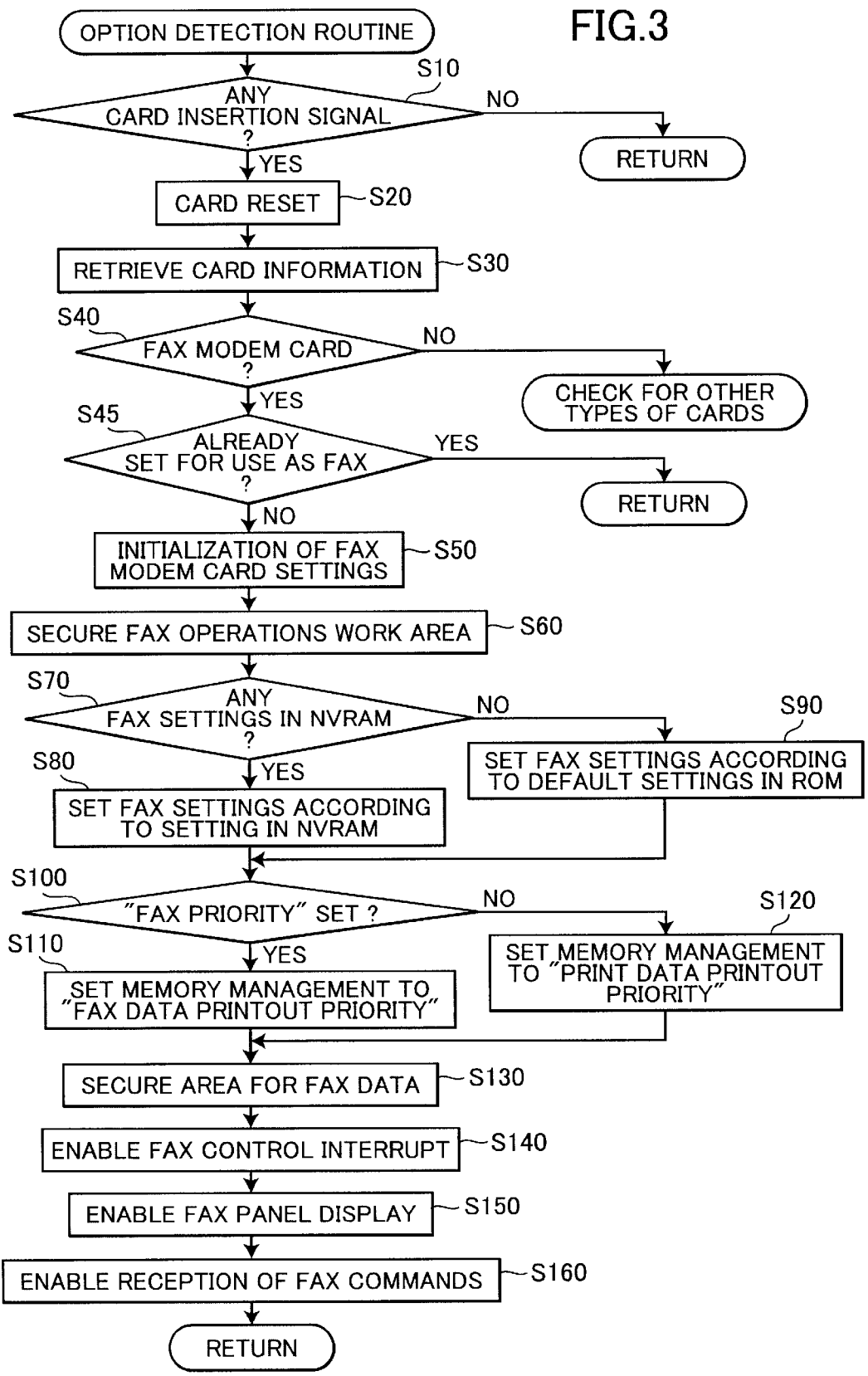
FIG. 3 is a flowchart showing an option detection routine executed by the printer.
Figure 4:
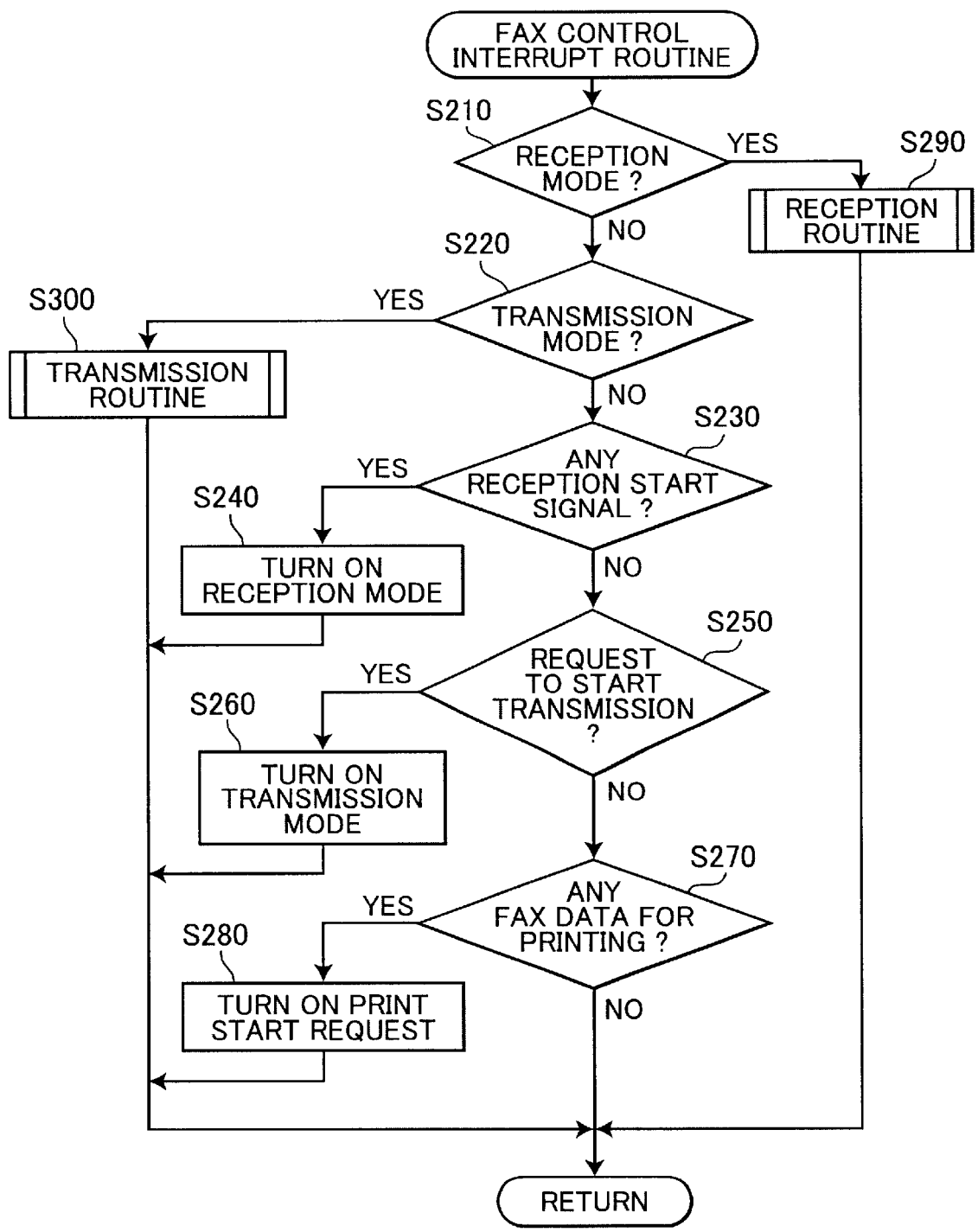
FIG. 4 is a flowchart showing a fax control interruption routine executed by the printer.

Programs stored in the ROM 62 and the flash ROM 66 include; a program for realizing a printer function for printing based on print data transferred from the computers 11 to 14 and a program of FIGS. 3–5(*c*), 6(*b*), and 7–23 for realizing a fax function for processing received fax data. It should be noted that the printer 30 can receive print data from any nearby sources, such as the computers 11–14, and perform its printer function. The printer 30 can also receive fax data either from nearby sources, such as the computers 11 to 14, or from remote sources over the public telephone network 5, for example, from the computer 15 or the facsimile machine 19, and perform its fax (facsimile) communication function. For example, the program for realizing the fax function includes a program for converting G3 compressed facsimile data into compressed data for printing and a program for executing band processes for developing the compressed data into bit map data for actual printing.

The program for realizing the fax function can be prestored in the ROM 62, or can be added when installing an upgraded version of a program in the flash ROM 66. Alternatively, the program can be added using a ROM card installed in one of two PCMCIA 75, 76 slots to be described later. The program can be transferred to the printer 30 from the personal computers 11–14.

The interface portion 70 includes an RS-232C interface 71 and a bi-directional Centronics interface 72 for connecting the printer 30 with the personal computer 14, a network interface 73 for connecting the printer 30 with the LAN 1, an SCS1 interface 74 for connecting the printer 30 with the image scanner 17, and the two PCMCIA slots 75, 76. The two PCMCIA slots 75, 76 conform to PCMCIA standards (Personal Computer Memory Card International Association Standards) and serve as option interfaces for mounting memory cards, such as the FAX modem card 3, ROM cards, hard disk cards, and RAM cards. The color laser printer 30 of the first embodiment can be used as a facsimile communication machine in addition to being used as a printer by mounting the fax modem card 3 into one of the PCMCIA slots 75, 76.

The mechanism portion 80 includes a printing engine portion 81, a sheet supply/discharge portion 82, an operation portion 83, a display portion 84, and a detection portion 85. The printing engine portion 81 is for printing on recording sheets, and includes the Y, M, C, and K toner stations 31 to 34, the transfer drum 35, the intermediate belt 36, and motors (not shown) for driving these components. The sheet supply/discharge portion 82 includes the sheet discharge switching mechanism 38, the discharge trays 39, 41 to 42, the sorter portion 40, and the sheet supply trays 51 to 53. The sheet supply/discharge portion 82 performs a well-known auto-sheet feeding operation to automatically feed sheets from the sheet trays 51 to 53 to the transfer drum 35, and feed the sheets between the fixing rollers 37 and 37 toward the sheet discharge switching mechanism 38. The operation portion 83 includes a control panel, for example, with switches for inputting a variety of settings and a power switch. The display portion 84 is configured from an LCD, an LED, and the like and is provided for displaying operation conditions of the printer. The detection portion 85 is configured from a sheet size detection sensor, a sheet type detection sensor, the sheet discharge sensor, and the like. The detection portion 85 detects sizes and types of sheets stored in the various sheet supply trays 51–53 and also detects paper jams. The sheet size detection sensor is for detecting a size of sheets stored in each sheet supply tray 51–53. The sheet type detection sensor is for detecting a type or kind of sheets stored in each sheet supply tray 51–53. For example, the size detection sensor is constructed to detect a position of a sheet guide which is provided in each sheet supply tray for guiding sheets stored therein and whose position is changed according to the size of the sheets stored in the sheet supply tray. Or, the user can previously manipulate the operation panel 83 to input information of size of sheets he or she has placed in each tray. The sheet type detection sensor may be of a light reflection type for detecting light reflected from each sheet stored in each tray to determine the type or kind of the sheets. Alternatively, the sheet type detection sensor may be of a light transmission type for detecting light that has transmitted through each sheet stored in each tray to determine the type or kind of the sheets. Or, the user can previously manipulate the operation panel 83 to input information of kind or type of sheets he or she has placed in each tray.

FIG. 2(*b*) shows a block diagram showing electrical configuration of each personal computer 11–14. As shown in FIG. 2(*b*), the personal computer 11 (12, 13, or 14) includes:

a CPU 101, a ROM 102, a RAM 103, a parallel interface 104, and an input/output interface 105, all of which are interconnected with one another via a bus. The parallel interface 104 is connected to the printer 30. The input/output interface 105 is connected to: a hard disk drive 107 via a hard disk controller 106, a floppy disk drive 109 via a floppy disk controller 108, a CRT 111 via a CRT controller 110, a keyboard 112, and a mouse 113.

The CPU 101 controls the entire portion of the personal computer 11 (12, 13, or 14.) The ROM 12 stores therein programs executed by the CPU 101. Representative examples of the programs include: an application software program for preparing text data; a fax application program for converting text data into fax data, and a program shown in FIG. 6(*a*) as will be described below to control the printer 30 both in the printer function and in the facsimile function. The CRT 111 is for displaying various screens, such as an input screen for enabling a user to input information of a remote party where fax data is desired to be transmitted. The keyboard 112 and mouse 113 are for enabling the user to input his/her desired instructions, such as instructions to control the printer 30 to print fax data, to send fax data to his/her desired remote party, and to delete fax data.

With the above-described structure, the CPU 101 can execute application processes using the application software, such as word processing software, installed in the ROM 102. During the application processes, the CPU 101 can prepare text data. After preparing text data, the user can input a print command through the keyboard 112 or mouse 113. When inputting the print command, the user selects the printer 30 as a normal printer or as a fax function-added printer.

Although not shown in the drawings, each computer 11–14 is installed with two printer drivers so that the single printer 30 can be used as both a normal printer and a fax function-added printer. The ROM 102 is installed with a fax application program for performing processes on fax transmission data. The fax application program is executed in response to the print command that designates the printer 30 as a fax function-added printer. The fax program serves to convert text data into fax transmission data, that is, a G3 compressed type FAX data and to transmit the fax transmission data to the printer 30. It is noted that when the print command designates the printer 30 as a normal printer, the application software that has prepared the text data will perform its normal printing operation to prepare print data based on the text data and to transmit the print data to the printer 30.

According to the present embodiment, the printer 30 is set into a condition capable of performing facsimile communication function in addition to its original printing function when the FAX modem card 3 is properly mounted to the PCMCIA slot 75 or 76.

More specifically, the CPU 61 of the printer 30 performs an option detection routine of FIG. 3 when the power of the printer 30 is first turned on. The CPU 61 also executes the option detection routine repeatedly and periodically while the power of the printer 30 is being on. The option detection routine enables the printer 30 to function as a facsimile communication machine when the fax modem card 3 is mounted in one of the PCMCIA slots 75 and 76.

The option detection routine will be described below.

As shown in FIG. 3, the CPU 61 first judges in S10 whether a card insertion signal is outputted from one of the PCMCIA slots 75, 76 to thereby determine whether some type of card is inserted in one of the PCMCIA slots 75 and 76. If no card insertion signal is detected from the PCMCIA slot 75 or 76 (S10:NO), then this routine is ended.

If a card is inserted into one of the slots 75, 76 (S10:YES), then in S20, the CPU 61 resets the card according to a card reset signal (not shown in the drawings). Afterward, in S30, the CPU 71 retrieves card information from the inserted card. In S40, the CPU 61 judges, based on the card information read in S30, whether or not the card presently inserted in the PCMCIA slots 75 or 76 is a fax modem card 3.

If the CPU 61 determines that the mounted card is not the fax modem card 3 (S40:NO), then the program proceeds to another routine for checking other types of cards. Examples of the other cards that can be inserted into the slots 75 and 76 include expansion memory cards, font cards, and LAN cards.

When the CPU 61 determines that the inserted card is a fax modem card 3 (S40:YES), then in S45, the CPU 61 judges whether or not the printer 30 has already been set up for use as a facsimile machine. It is noted that the process of S45 is performed to ensure that a fax modem card 3 can be mounted in only one of the two slots 75, 76 at a time. This will prevent problems that could occur when a plurality of fax modem cards are mounted at the same time, such as two fax transmissions being attempted at the same time. When fax settings have already been set (S45:YES), then this routine is ended.

On the other hand, when the printer 30 has not yet been set up for use as a facsimile machine (S45:NO), initialization processes are performed on the fax modem card 3. Next in S60, a work area for fax operations is secured in the RAM 63 and the expansion RAM 64 as shown in FIGS. 19(*b*) and 19(*c*).

Next in S70, the CPU 61 judges whether or not there are any fax settings in the NVRAM 65. The printer 30 is configured so that when a user sets new values, which differ from default values prestored in the ROM 62, with respect to a variety of fax condition settings, the new settings are stored in the NVRAM 65. The new settings are maintained in the NVRAM 65 even when the power of the printer 30 is turned OFF. Therefore, there is not need to again set the fax setting conditions each time the power source is turned on.

When it is judged that fax settings exist in the NVRAM 65 (S70:YES), then in S80, the fax condition settings for the fax communication function are set according to the fax setting values stored in the NVRAM 65. On the other hand, when no fax settings are found in the NVRAM 65 (S70:NO), then in S90, fax condition settings are set according to the default values prestored in the ROM 62.

The fax condition settings set in S80 or S90 include: 1)RAM size of data area, 2)ring delay, 3)receive ON/OFF, 4)fax priority ON/OFF, 5)reduction recording, and 6)log recording interval. The setting for 1)RAM size of data area is for setting how many megabytes or how many percents of the RAMs 62, 64 are to be used as storage area for fax images as shown in FIGS. 19(*b*) and 19(*c*).

The setting of 2) ring delay is for setting how many ringing signals have to be received before reception response processes are performed during reception of a facsimile message from remote sources.

The setting of 3) receive ON/OFF is for setting the printer 30 either to function exclusively for transmitting faxes or to also function for receiving facsimile messages. When this setting is set to ON, the printer 30 will be capable of sending and receiving facsimile messages. On the other hand, when the setting is set to OFF, the printer 30 will function exclusively for transmitting facsimile messages.

Figure 17A:
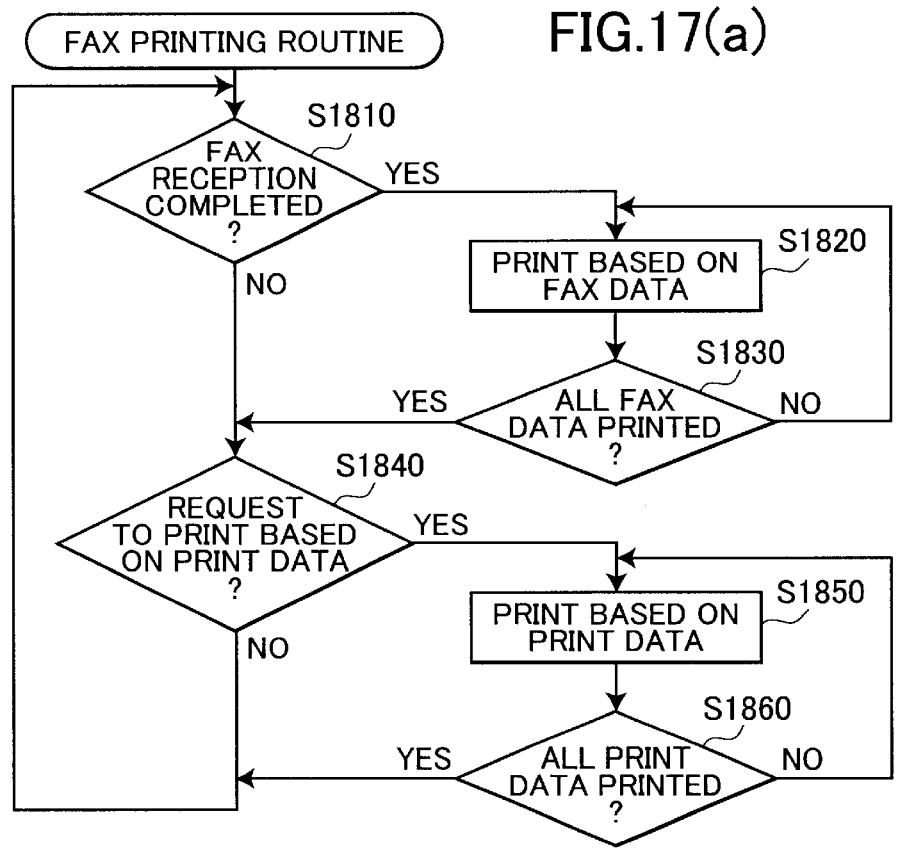
FIG. 17(a) is a flowchart showing a fax printing routine executed by the printer for printing fax reception data.
Figure 18A:
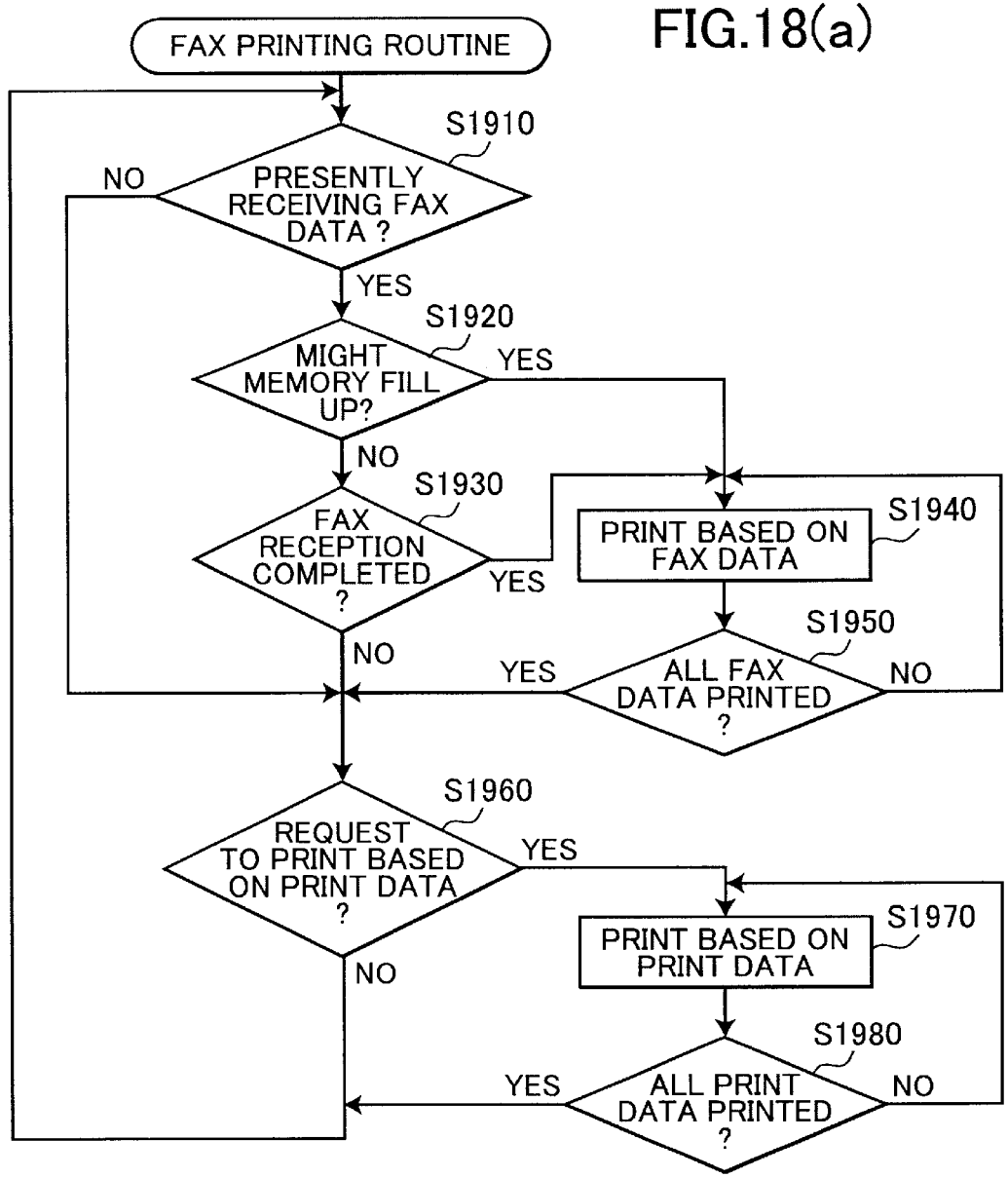
FIG. 18(a) is a flowchart showing a modification of the fax printing routine of FIG. 17(a) for printing fax reception data.

The setting of 4) fax priority ON/OFF is for setting whether printing based on fax data or printing based on print data is to be given priority when a command for printing based on fax data and a command for printing based on print data are received at the same time. Printing based on fax data is given priority when fax priority is set to ON and printing based on print data is given priority when the fax priority is turned OFF. When the setting is set to OFF, for example, the fax printing routine for printing fax reception data will be executed as shown in FIG. 17(a) or 18(a) as will be described later.

The setting of 5) reduction recording enables reducing received fax images in the lengthwise direction before printing them out. The reduction recording setting can be set to either automatic, OFF, or 90 percent. When the reduction recording setting is set to automatic, then each page of received data is automatically recorded at a reduction rate that fits the corresponding single page's worth of image onto a single sheet of paper. In this case, the received image data for each single page is divided between two separate pages if the required reduction rate becomes smaller than 50 percent.

When the reduction recording setting is set to OFF, received images are not reduced in the lengthwise direction before being printed out. In this case, long fax images will be printed out divided between two or more separate sheets.

When the reduction recording setting is set to 90 percent, then all received fax images are printed out at a fixed reduction rate of 90 percent in the lengthwise direction. This setting is beneficial when the sheets stored in the trays of the color laser printer 30 are slightly smaller than the sheet size of received fax data. For example, this setting is beneficial if the sheet supply trays of the printer color laser printer 30 are filled with letter size (with a length of about 279 mm) recording sheets, but the printer 30 receives fax data for an A4 size document (with a length of 297 mm).

The setting of 6) log recording interval is for setting the time interval between when log information of fax communication is printed out on a sheet. The log recording interval can be set to OFF, 6 hours, 12 hours, 24 hours, 2 days, 4 days, or 7 days. Log information includes information on when a fax has been transmitted or received, whether the fax communication is reception or transmission, the name of the person who has sent or received the facsimile transmission, transmission or reception period of time, the number of pages in the fax, and the transmission reception results.

It is noted that the fax setting conditions further include 7) compulsory print mode. The setting for 7) compulsory print mode is for setting whether the printer 30 should be set to a compulsory print mode. When the printer 30 is set in the compulsory print mode, if only an insufficient memory area is available for fax data, fax data will be printed on sheets if the sheets have a sufficient size for printing the fax data even when the sheets are not normal type of papers as will be described later.

After fax settings are set in S80 or S90, then in S100, it is judged whether or not fax priority is set based on processes performed in S80 or S90. If fax priority is set (S100:YES), then fax priority memory management is set in S110 as a method for managing memories. When fax priority memory management is set, print data received from the personal computers 11 to 14 during reception of facsimile will be stored in a printer buffer without printing being performed according to the print data. On the other hand, when fax priority is not set (S100:NO), then a printer priority memory management is set in S120. When printer priority memory management is set, then in contrast to fax priority memory management setting, fax data received during reception of print data will be merely stored in a fax buffer region without printing being performed on a recording sheet based on the fax data.

Figure 19C:
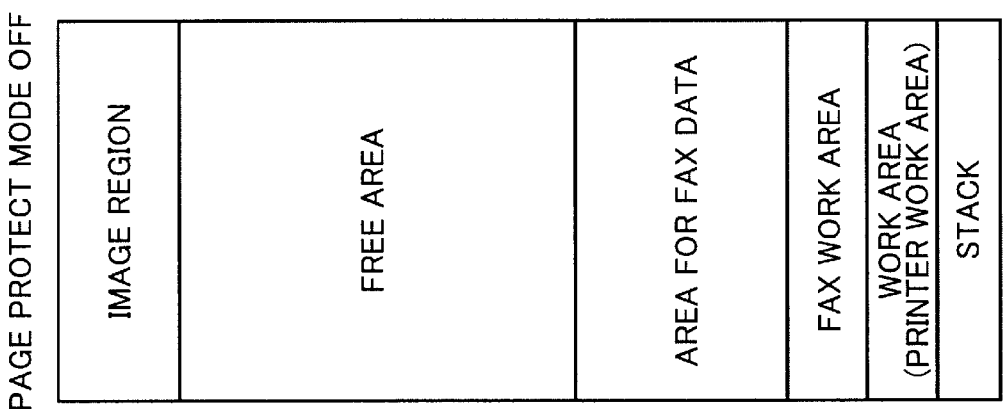
FIG. 19(c) is a schematic view showing a state of the memory region when the page protect mode is being OFF.
Figure 19B:
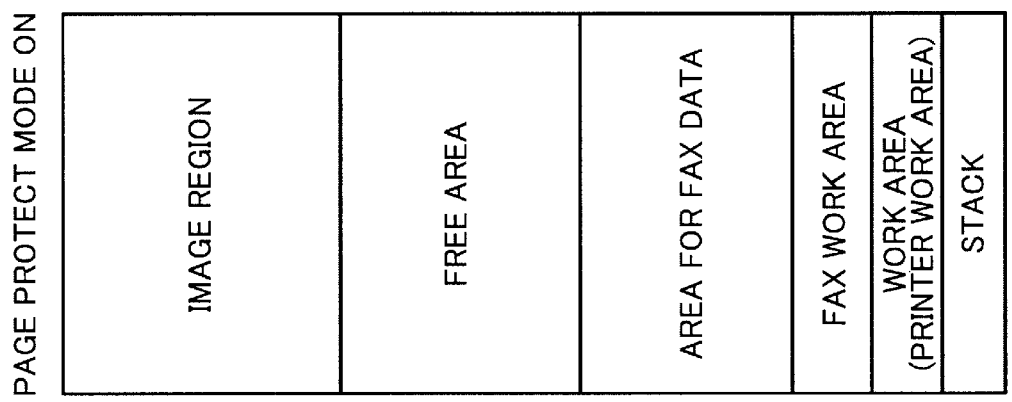

In S130, a fax data area is secured in the RAMs 63, 64 as shown in FIGS. 19(b) and 19(c) according to the setting of RAM size for data area set in the processes of S80 or S90. Accordingly, as shown in FIG. 19(b) or 19(c), the fax data area and the fax work area are secured in S60 and in S130 in the RAM 63 or 64. The fax data area and the fax work area will be used during the fax function process. A free area initially formed in the RAM as shown in FIG. 19(b) or 19(c) will be used during both the fax function process and the printer function process. A printer work area and an image region, also initially formed in the RAM, will be used during the printer function process.

Then, in S140, fax control interrupt routines of FIGS. 4–5(c), 9, 10–16, 17–20 are enabled, whereupon the variety of interrupt routines for controlling fax operations can be executed. Each of the interrupt routines will be started by being executed at a corresponding predetermined timing.

Further in S150, display of a screen for allowing a user to change fax settings, that is, of the fax RAM size and the like, is enabled. As a result, the display 84 is controlled to show a screen (not shown) enabling a user to set or change the present fax settings. Viewing the screen, the user can manipulate the operation panel 83 to input his/her desired values of fax settings. The changed fax settings are stored in the NVRAM 65 as described above. When the option detection process of FIG. 3 is executed again, the changed fax settings will be set in S80. Thus, display of this fax setting screen is enabled at this stage, but not enabled at the initial stage. This is because it is unnecessary for the user to perform settings relating to fax functions or to change the settings relating to fax functions unless the user inserts the fax modem card 3 in one of the PCMCIA slots 75 and 76 to set the printer 30 as a fax function-added printer. Thus, in S150, the display 84 is started by being controlled to display not only a screen (message) for the printer function but also another screen (message) for the fax function. The display 84 can also display the screens both for the fax function and the printer function according to the interrupt routine of FIG. 9 as will be described later.

Next in S160. fax command reception is enabled so that fax commands can be received from the personal computers 11 to 14. That is, the interface portion 70 (interfaces 71, 72, and 73) is controlled so as to be capable of receiving commands relating to the fax function from the personal computers 11–14. As a result, the printer 30 is brought into a condition capable of receiving various commands relating to the fax communication function, such as a fax entering command, various data operation commands (print command, send command, and delete command), and complete command, as will be described later with reference to FIG. 6(b). For example, the printer 30 can receive, from the personal computers 11 to 14, a send command to send fax data.

When the above-described option detection routine is executed to perform settings to the printer 30, the printer 30 is brought into a condition that is capable of functioning also as a facsimile machine according to settings set during this option detection routine. As will be described later, the printer 30 is brought into a condition that can receive fax reception data from remote devices and can print the received fax data according to processes of FIGS. 4, 5(a), 5(c), and 17(a) or 18(a) and that can receive fax transmission data from computers 11–14 and can print, transmit, and delete the received fax transmission data according to processes of FIGS. 4, 5(b), 5(c), and 6. In other words, the program of the option detection routine of FIG. 3 can add fax communication function to the printer 30. Because the option detection routine is executed automatically when the printer 30 is turned ON and is automatically executed repeatedly while the printer 30 is being ON, the printer 30 can be automatically brought into the fax function-added printer.

It is noted that the option detection routine of FIG. 3 can be designed so that the printer 30 can function as a facsimile machine also when the fax modem 3 is connected to the RS-232C interface 71. In this case, the processes of S10 to S40 may be modified so that the CPU 61 judge whether or not the fax modem 3 is connected to the RS-232C interface 71 by detecting presence or absence of a response to an AT command, that is outputted from the printer 30 to the RS-232C interface 71. In this case, however, when the fax modem 3 is not connected to the RS-232C interface 71 but some personal computer is connected to the RS-232C interface 71, the AT command will be accumulated in the personal computer and the personal computer will be in error. Accordingly, in this case, it is preferable that the processes of S10 to S40, that is, the option detection routine of FIG. 3 be designed to be started only when the user inputs a command to detect the FAX modem card 3 that the user has mounted to the RS-232C interface 71.

Next, an explanation will be provided for a fax control interrupt routine represented by the flowchart shown in FIG. 4. This routine is enabled by the process of S140 in the option detection routine of FIG. 3. The FAX control interrupt routine is executed as an interrupt routine each time a predetermined duration of time elapses.

When the fax interrupt control routine is started, the CPU 61 first judges in S210 whether or not a reception mode is set to ON. When the reception mode is not set to ON (S210:NO), then in S220, it is determined whether or not a transmission mode is set to ON. If not (S220:NO), then in S230, it is judged whether or not a reception start signal has been received. Whether or not a reception start signal has been received is determined by presence or absence of ringing signals from a remote fax transmission source. It is judged that a reception start signal has been received only when ringing signals are received in the number set, as the ring delay setting, during S80 or S90 in the option detection routine of FIG. 3.

When it is judged that a reception start signal has been received (S230:YES), then in S240, the reception modes is set to ON and this interrupt routine ends. On the other hand, when it is judged that no reception start signal has been received (S230:NO), then in S250 it is judged whether or not a transmission start request from any personal computer 11 to 14 has been received. If a transmission start request has been received (S250:YES), then in S260 the transmission mode is set to ON and the program leaves this interrupt routine.

When no transmission start request has been received (S250:NO), then in S270 it is judged whether or not there is any fax data that needs to be printed out. When such fax data exists (S270:YES), then in S280, a print start request is turned ON and this interrupt routine ends.

If during the fax control interrupt routine the reception mode is turned ON in S240, then the next time this interrupt routine is performed, S210 will result in a positive judgment so that reception processes are executed in S290. Alternatively, if the transmission mode is turned ON in S260, then the next time this interrupt routine is performed, S220 will result in a positive determination so that transmission processes are executed in S300. In other words, none of the processes from S230 on are performed in the fax control interrupt routine when either the reception mode is turned ON (S210:YES) or the transmission mode is turned ON (S220:YES). Therefore, the reception mode and the transmission mode will never be simultaneously turned on. It should be noted, however, that if the print start request is turned ON in S280, either the reception mode or the transmission mode could be turned ON when the fax control interrupt routine is executed next.

It should be noted that if the 3)receive ON/OFF setting is set to OFF in S80 or S90 during the option detection routine of FIG. 3, then S230 will always result in a negative determination, that is, a start signal will never be judged as being received. As a result, S230 will always result in a negative determination so that the printer 30 will not enter the fax reception mode.

Figure 5A:
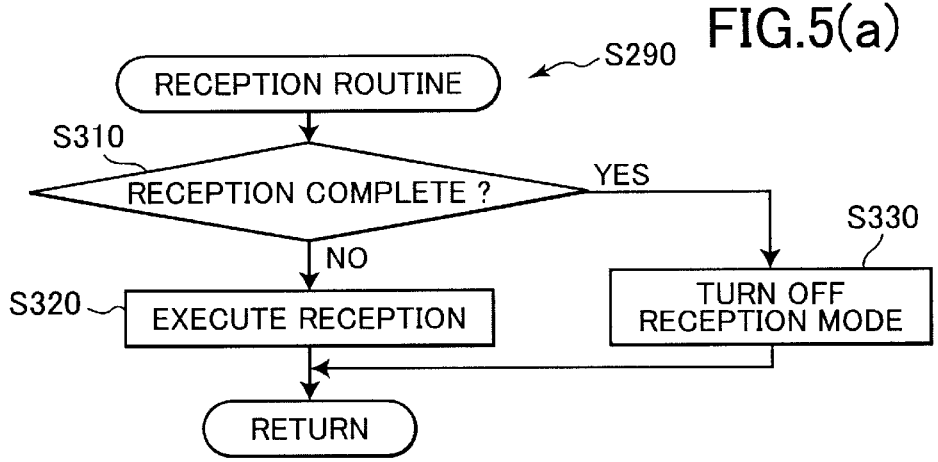
FIG. 5(a) is a flowchart showing a fax reception routine executed by the printer.

Next, an explanation will be provided for the reception process of S290 represented by the flowchart shown in FIG. 5(a). The reception routine is repeatedly executed when the reception mode is being ON, and performs reception of fax data in S310 and S320 until reception is completed from a remote device. Once reception is completed (S310:YES), then the reception mode is turned OFF in S330 and the reception routine is ended. It is noted that in S330, the received fax data is designated to be printed. That is, a print designation (P) is set for the fax reception data. Accordingly, the judgement of S270 (FIG. 4) will become affirmative, and a print start request will be turned ON in S280.

Figure 5B:
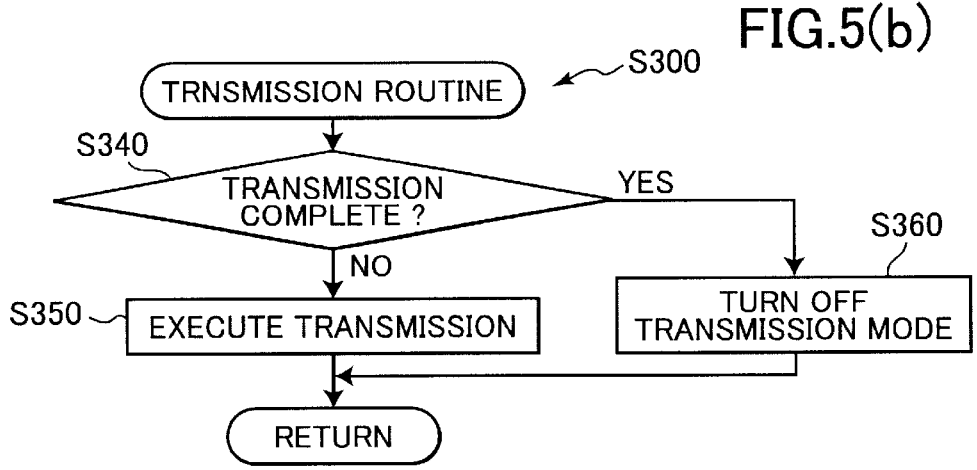
FIG. 5(b) is a flowchart showing a fax transmission routine executed by the printer.

Next, an explanation will be provided for the transmission process of S300 represented by the flowchart in FIG. 5(b). The transmission routine is repeatedly executed when the transmission mode is being turned ON. Transmission of fax data to a remote device is executed in S340 and S350 until transmission is completed. Once transmission is completed (S340:YES), then in S360, the transmission mode is turned OFF, and the transmission mode is ended.

Figure 5C:
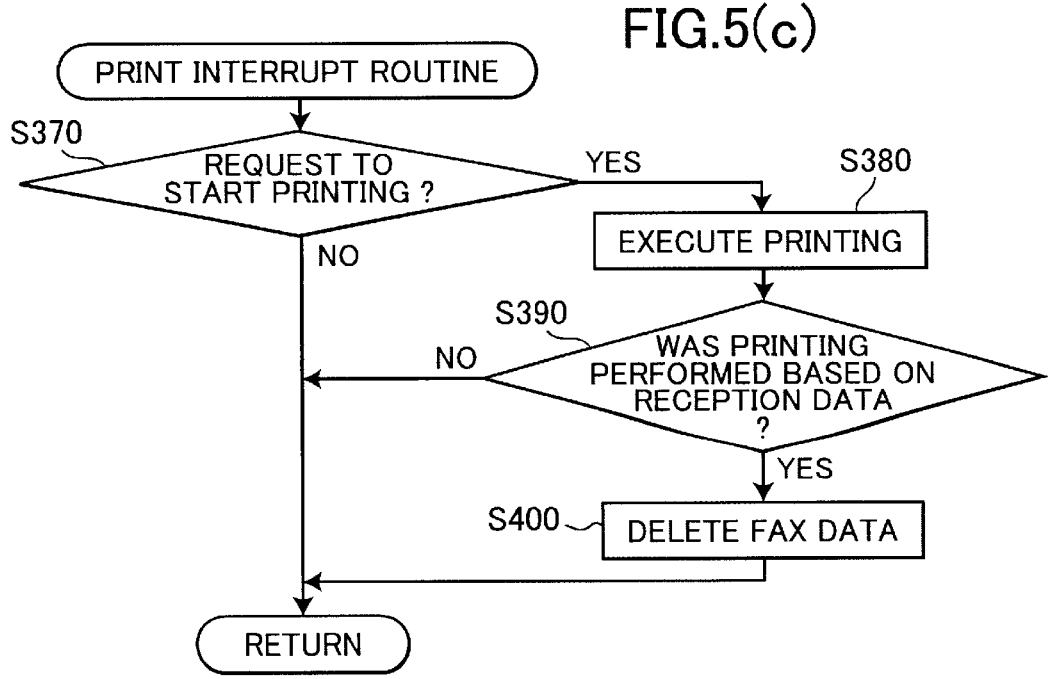
FIG. 5(c) is a flowchart showing a fax print interrupt routine executed by the printer.

Next, an explanation will be provided for a print interrupt routine represented by the flowchart in FIG. 5(c). The print interrupt routine is executed as an interrupt routine with a lower level than the fax control interrupt routine of FIG. 4. That is, when both the interrupt routines of FIGS. 4 and 5(c) are started simultaneously, the interrupt routine of FIG. 4 is given priority. In the print interrupt routine, it is first judged in S370 whether or not the print start request is turned ON. If the print start request is not turned ON, then this interrupt routine is ended. If the print start request is turned ON (S370:YES), then printing is executed in S380. For example, when fax reception is completed and fax reception data is designated to be printed in S330 (FIG. 5(a)), the print start request is turned ON in S280, and therefore the printing is executed in S380 in a manner as will be described below with reference to FIG. 17(a) or 18(a). In S390, it is judged whether or not printing just performed in S380 has been based on fax reception data received over the public telephone network 5. If so (S390:YES), then in S400, the fax reception data is deleted because it has already been printed out. On the other hand, if printing performed in S380 has not been based on fax reception data (S390:NO), then the routine is ended without deleting the fax data.

As a result of the above-described print interrupt routine of FIG. 5(c), fax data is immediately deleted once printed out if the printed fax data has been received over the public telephone network 5. However, when the printed fax data has been received, for example, from one of the personal computers 11 to 14 for the purpose of transmission to a remote device, such as the personal computer 15 or the facsimile machine 19 over the public telephone network 5, then the data is not deleted immediately after printing is completed.

As will be described later, the system of the present embodiment is provided with a function for producing a test print based on fax data before the fax data is transmitted as a facsimile message to a remote device. The test print is produced to enable the user to confirm whether text data, prepared using a word processor software package and the like installed as an application in the personal computer 11 12, 13, or 14, has been correctly converted to fax data. After the test printing has been performed in S380, the fax data is retained in the memory of the color laser printer 30 so that the personal computer 11, 12, 13, or 14 need not again output the fax data to the color laser printer 30. With this configuration, only operations that need to be performed for fax data is to output commands instructing that the fax data should be transmitted as a facsimile message.

Figure 6A:
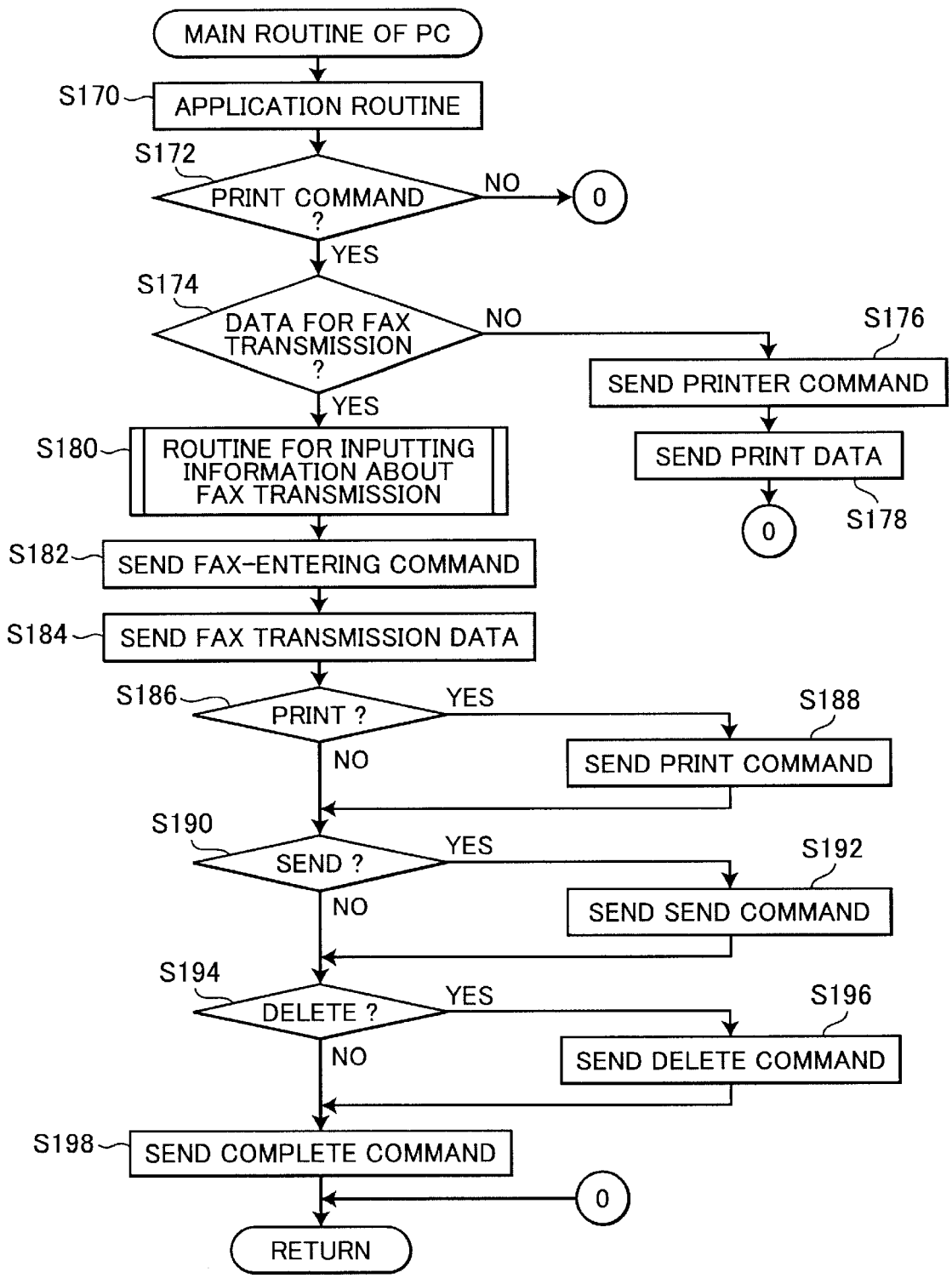
FIG. 6(a) is a flowchart showing a main routine executed by each computer.

Each of the computers 11–14 executes processes of FIG. 6(a) for controlling the printer 30 both as a normal printer and as a facsimile communication device as described below.

First, the CPU 101 executes in S170 application processes using an application software, such as a word processing software, Installed in the ROM 102. During the application processes, text and the like is prepared. The application processes are repeatedly executed until a print command is inputted by an operator through the keyboard 112 or mouse 113 (no in S172). It is noted that the user inputs his/her print command while selecting the printer 30, mounted with the fax modem card 3, as a normal printer or as a fax function-added printer.

When a print command is inputted during application processes (S172:YES), then the CPU 101 judges in S174 whether or not the inputted print command is for fax transmission. That is, the CPU 101 determines whether or not data is fax transmission data based on whether or not the printer 30 is selected as a fax function-added printer. When the inputted print command selects the printer 30 as a normal printer and therefore the subject of the print command is determined as not being for fax transmission (S174:NO), then a normal print data transmission routine is executed according to the presently-used application software. That is, a printer command is transmitted in S176 to the printer 30, and then in S178, print data is prepared based on text data and is transmitted to the printer 30.

When the print command designates the printer 30 as a fax function-added printer, on the other hand, the presently-prepared text data is judged as data for fax transmission (S174:YES). Accordingly, a fax transmission information input routine is performed in S180. The fax transmission information input routine is performed by starting up the facsimile data program preinstalled is the ROM 102. That is, the CRT 111 is controlled to display an input screen for enabling the user to input, through the keyboard 112 and the mouse 113, a telephone number of a remote party where the fax transmission is to be transmitted, indication of the user (transmission source), and the like. After inputting information necessary for fax transmission during the routine of S180, the user finally inputs an OK command. In response to the OK command, following processes are executed.

First, in S182, the CPU 101 transmits a fax mode entering command to the printer 30. Then, in S184, the CPU 101 converts text data into fax transmission data (G3 type FAX data), and transmits the fax transmission data to the printer 30. It is noted that the fax transmission data (file) is formed from the G3 type FAX image data, and is added with distinction data for enabling distinction of the image data. The CPU 101 also transmits, in S184, to the printer 30 data of the telephone number of the remote party, to which the subject fax transmission data is to be sent, and data (transmission source information) of the sender who is to send the subject fax transmission data. Each of the telephone number data and the transmission source information is appended with the same distinction data as the corresponding set of fax transmission data.

After inputting the OK command in the fax transmission information input routine of S180, the user can input a print instruction when he/she desires to let the printer 30 print the subject fax transmission data. The user can input a send instruction when he/she desires to let the printer 30 send the subject fax transmission data to his/her designated remote party. The user can input a delete instruction when he/she desires to let the printer 30 delete the subject fax transmission data. When the print instruction is inputted (yes in S186), the CPU 101 sends a print command to the printer 30. When the send instruction is inputted (yes in S190), the CPU 101 sends a send or transmission command to the printer 30. When the delete instruction is inputted (yes in S194), the CPU 101 sends a delete command to the printer 30. It is noted that the print command, the send command, and the delete command will be referred to collectively as data operation command, hereinafter. Each of the data operation command is also appended with the same distinction data as the corresponding set of fax transmission data. The CPU 101 finally sends a complete command to the printer 30, and this routine ends.

Figure 6B:
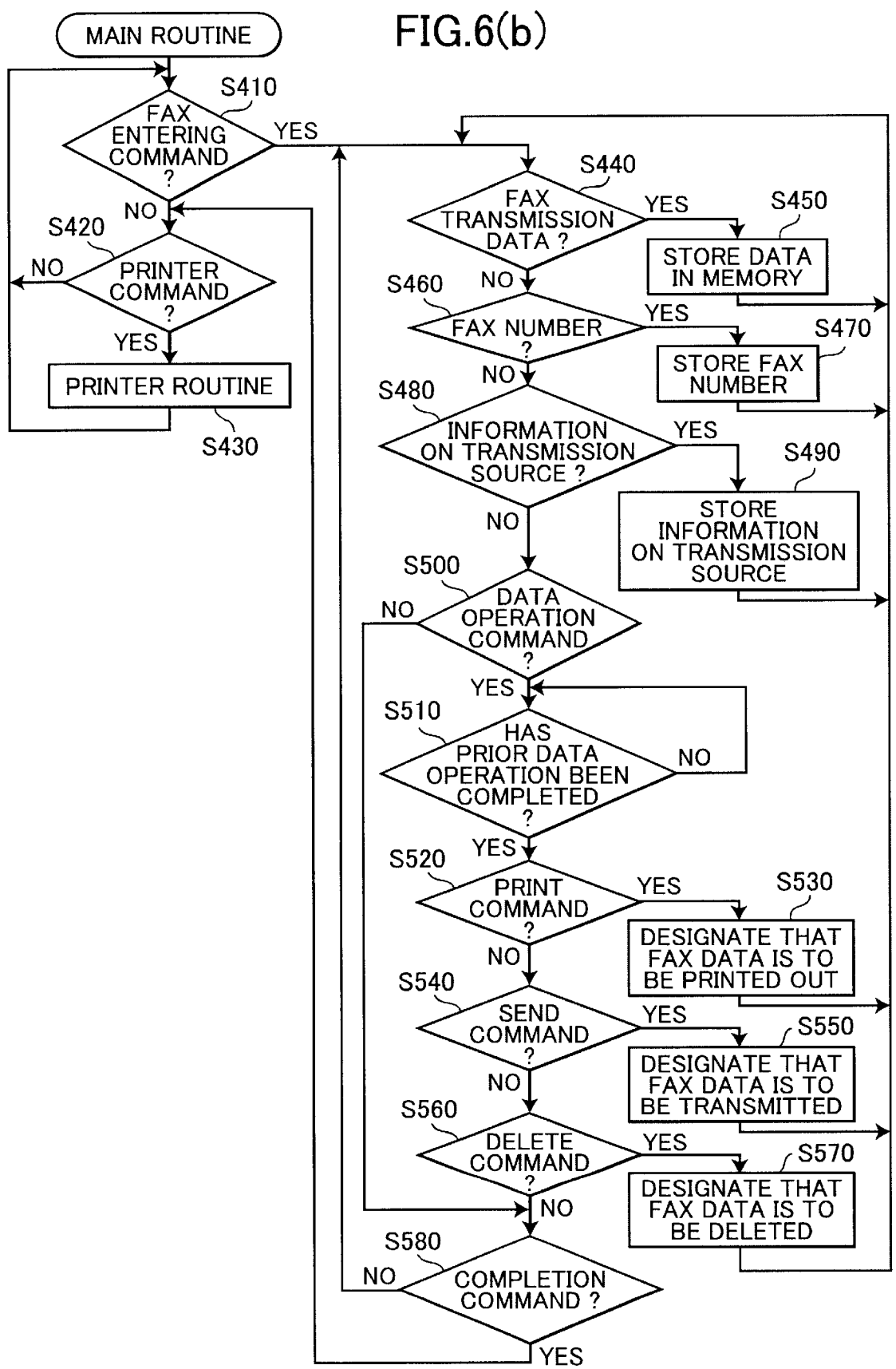
FIG. 6(b) is a flowchart showing a main routine executed by the printer.

In response to the above-described operation of the personal computers 11–14, the color laser printer 30 executes a main routine as shown in FIG. 6(b).

The main routine is executed to achieve both the fax transmission function and the printer function of the printer 30.

First, the CPU 61 judges in S410 whether or not a fax entering command has been transmitted from any personal computer 11 to 14. If a fax entering command has not been received (S410:NO), then in S420 it is determined whether a printer command has been received. When neither a fax entering command or a printer command has been received, then the routines of S410 to S420 are repeatedly performed for interpreting contents of commands received from any personal computer 11 to 14.

When a printer command is received (S420:YES), then print operations of the printer function are performed in S430. In more detail, in S430, print data received from the personal computer 11 to 14 via the printer cable or over the LAN 1 is stored in a printer buffer. Once a single page's worth of data is stored, it is converted into printer output data, and printed as shown in FIG. 17(a) or 18(a).

Figure 19A:
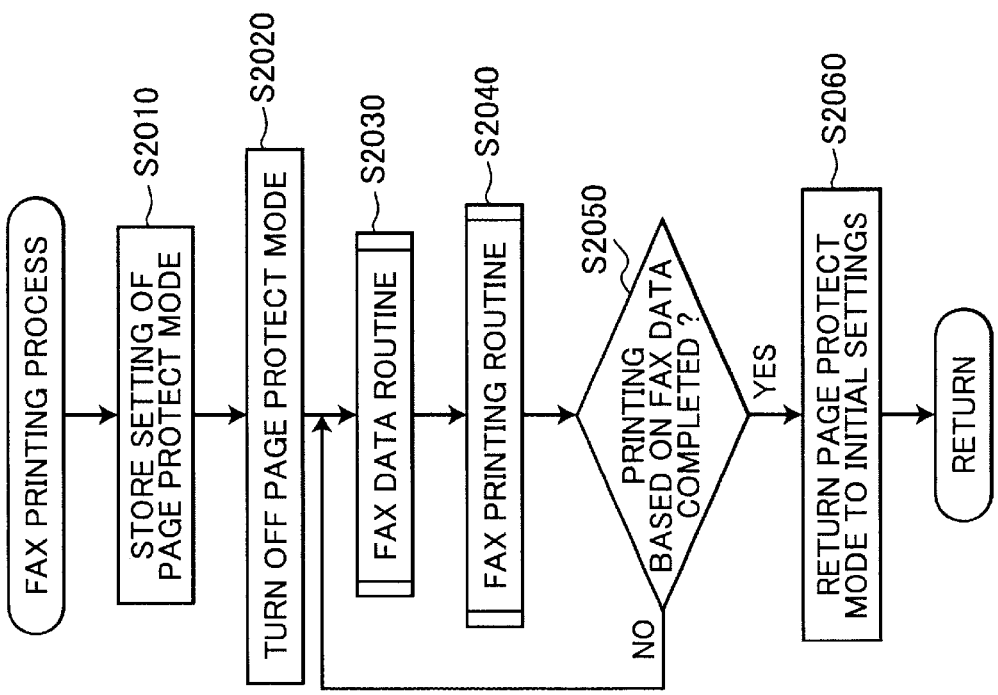
FIG. 19(a) is a flowchart showing a fax printing execution process in each of processes of FIGS. 17(a) and 18(a) for turning off a page protect mode.

On the other hand, when it is determined that a fax entering command has been received from some personal computer 11 to 14 (S410:YES), then the program proceeds to 5440. In S440 and on, fax function is attained. Thus, in S410–S420, commands received from the personal computers 11–14 are interpreted, and based on the interpreted result, the printer 30 will perform the printer function (S430) or the fax function (S440–S580). More specifically, in S440, It is judged whether or not data subsequently received is fax transmission data. As described above, fax transmission data is data desired to be fax-transmitted to a remote device over the network 5, and is formed from image data (i.e., fax data) and distinction data for enabling distinction of the image data when the image data is stored in a memory region. Each set of fax transmission data will alternatively be referred to as a file, hereinafter. When the received data is fax transmission data (S440:YES), then in S450, a process is executed for storing the fax transmission data in a memory region, that has been allotted for fax data in the RAM 63 or 64 as shown in FIG. 19(a) or 19(b) during the process of S130 (FIG. 3).

If the data is not fax transmission data (S440:NO), then in S460, it is judged whether or not the received data is data designating a fax telephone number. If the received data is data designating a fax telephone number (S460:YES), then in S470, the received data is stored as a transmission fax telephone number in an area provided in the RAM 63 or 64 for storing fax telephone numbers.

It should be noted that as described already, the fax telephone number data, as well as the data operation command and the transmission source information, is appended with the same distinction data as the corresponding set of fax transmission data (file) so that correspondence between the fax transmission data (file) and the fax telephone number data, the data operation command, and the transmission source information can be made.

If the received data is not fax telephone number-data (S460:NO), then in S480, it is judged whether the received data is transmission source information or not. If the received data is transmission source information (S480:YES), then in S490, the received data is stored in an area provided in the RAMs 63 or 64 allotted for transmission source information. It is noted that the transmission source information will be appended to fax data and will be transmitted with the fax data to a remote device. The transmission source information will also be used for outputting a fax transmission management report.

When the received data is not transmission source information (S480:NO), then in S500, it is judged whether or not the received data is a data operation command. As described above, there are three types of data operation commands: print command, send command, and delete command. When the received data is a data operation command (S500:YES), then in S510, it is judged whether or not operations are presently being performed based on some data operation command. The process of S510 can ensure that fax data has been completely operated by another data operation command that was received prior to the data operation command that is being presently received in S500. For example, the process of S510 can prevent fax data from being deleted based on a deletion command that is now being received, before it has been completely transmitted to a remote device according to a send command that was received before the deletion command.

When data operations are completed according to the prior data operation command (S510:YES), then in S520, it is judged whether or not the present data operation command is a print command. If the data operation command is a print command (S520:YES), then in S530, the corresponding fax data now being stored in the fax data storage region is designated for print (P) processes. That is, print designation data (P) is stored in correspondence with the fax data. When the fax data is thus designated for print (P) processes in this manner, then S270 in the fax control interrupt routine (FIG. 4) will result in a positive determination and the print start request will be turned ON in S280. The fax data will be printed in S380 of FIG. 5(c).

When the received data operation command is not a print command (S520:NO), then in S540, it is determined whether or not the data operation command is a send command. If the command is a send command (S540:YES), then in S550, the corresponding fax data stored in the fax data storage region is designated to undergo send (S) processes. That is, send designation data (S) is stored in correspondence with the fax data. In this case, S250 in the fax control interrupt routine (FIG. 4) results in a positive determination so that the transmission mode is turned ON in S260. The fax data will be transmitted to the designated remote device in S350 of FIG. 5(b).

When the data operation command is not a send command (S540:NO), then in S560, it is judged whether the data operation command is a deletion command. If the data operation command is a delete command (S560:YES), then in S570, the corresponding fax data stored in the fax data storage region is designated to undergo deletion (D) operations. That is, delete designation data (D) is stored in correspondence with the fax data. In this case, the fax data will be deleted from the fax storage region during an interrupt routine (not shown in the drawings).

In this way, according to the present embodiment, fax transmission data inputted from some personal computer 11 to 14 is not immediately deleted from the RAMs 63, 64 even after printing or transmission has been performed according to the fax transmission data. The fax data is only deleted after a deletion command has been received. That is to say, according to the present embodiment, text, that has been prepared using a word processor software application package or the like installed in the personal computer 11 to 14, can be transmitted to a remote device in a facsimile message in the same manner as sending print data to the printer 30. In order to allow the user to obtain a test print based on the fax transmission data before transmitting the fax transmission data or to print out a copy of the facsimile message after the corresponding fax transmission data has been transmitted, the fax data is retained in the memory until a deletion command is received, whereupon the fax data is finally deleted.

By using this configuration, there is no need to resend fax transmission data from the personal computer 11 to 14 to the printer 30 after the test printing has been performed. There is also no need to transmit fax transmission data again from the personal computer 11 to 14 to the printer 30 in order to print out a copy of the transmitted facsimile message to retain a printed copy. This achieves the maximum advantages of both the printer function and the fax function while fulfilling a variety of user needs by simplifying corresponding operations.

When the fax entering command is inputted from some personal computer 11 to 14, processes are executed for storing fax data and for performing other processes for the fax data. That is, a variety of processes in the fax mode, such as transmitting facsimile messages and printing out test copies before the transmission, can be performed as designated by the data operation commands. A variety of processes performed in the fax mode are continued being executed until a completion command is received in S580. Accordingly, during a fax modem, the following series of fax operations are executed. First, a fax entering command is inputted from some personal computer 11 to 14, and fax data is transmitted to the color laser printer 30. After the fax data is stored in the memory 63 or 64, a print command for performing test printing is inputted and test print is executed. Afterward, a send command is inputted and the fax data is actually transmitted to the remote device.

It is noted that the printer 30 may be designed so that the data operation commands (print command, send command, and delete command) and the completion command can be inputted by a user's operation of the operation portion 83 that is provided to the printer 30, rather than inputted from the personal computer 11 to 14. When the user manipulates the operation portion 83 to input his/her print command, the fax transmission data is designated as print (P) in S530, and will be printed in S380. When the user manipulates the operation portion 83 to input his/her send command, the fax transmission data is designated as send (S) in S550, and will be transmitted to the designated address in S350. When the user manipulates the operation portion 83 to input his/her delete command, the fax transmission data is designated as delete (D) in S570, and will be deleted. This configuration is convenient because the person who wishes to transmit a facsimile message has to go to the printer 30 to confirm the result of the test print. The user can input the commands via the printer 30, so the user need not return to the personal computer 11–14 and so can input a send command and the like immediately.

As described above according to the main routine represented by the flowchart in FIG. 6(*b*), the color laser printer 30 is entered into a fax operation mode according to a fax entering command that is appended to the fax transmission data. Therefore, a fax server need not be provided separately along the LAN 1. It is sufficient that the single server 20, capable of coping with both fax transmission data and print data, be provided. That is the printer 30 can perform a fax transmission function in addition to the printer function. Processes can be switched between processes for performing the printer function and processes for performing the fax transmission function based on the command interpretation process executed in the main routine of FIG. 6(*b*). The server 20 is capable of coping with both print data and the fax transmission data.

Figure 7:
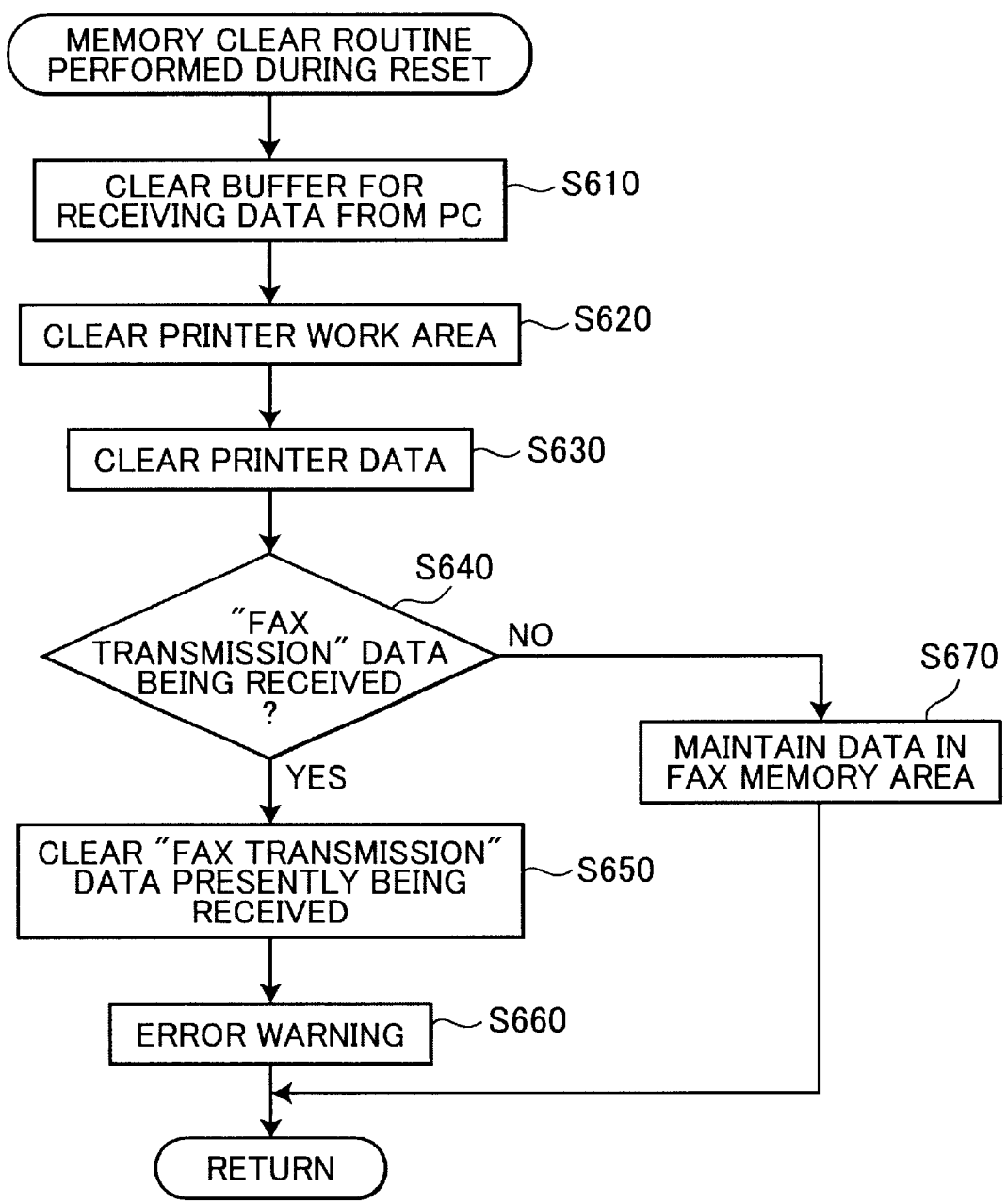
FIG. 7 is a flowchart showing a memory clear routine executed by the printer when the printer is reset.

The printer 30 executes a memory clear routine shown in FIG. 7 when the color laser printer 30 is reset by a reset command that is transmitted from some computer 11 to 14 or that is inputted from the control panel 83 of the color laser printer 30.

The memory clear routine will be described below with reference to FIG. 7.

First in S610, the reception buffer for receiving data from the personal computers 11 to 14 is cleared. In S620, the printer work area (shown in FIG. 19(*b*) or 19(*c*)) is cleared. Next, in S630, print data for being used for printer function is cleared. Afterward, it is judged in S640 whether or not facsimile transmission data is being presently received.

When it is judged that reception is being performed (S640:YES), then in S650, the fax transmission data presently being received is cleared, and in S660 a message is informed to a transmitter (computer 11, 12, 13, or 14) that has transmitted the fax data that is presently being received during S640. The message indicates that the fax data has been cleared during the middle of reception. This message can be in a form of an error report. On the other hand, when it is judged that fax transmission data is not being received (S640:NO), then in S670, data already stored in the fax memory area (shown in FIG. 19*b* or 19*c*) is maintained as is.

The printer 30 sometimes becomes in error in the middle of printer function operations for printing based on print data and prints meaningless characters. In these cases, even If reset operations are performed, fax transmission data already stored in the fax memory area is not reset, thereby preventing the user from again transmitting the fax transmission data to the printer 30. In other words, with respect to reset operations, by performing processes different for print memory area and fax memory area, even if the reset operations are performed, the printer 30 does not clear fax data already stored as normal data. Accordingly, the user can be prevented from again operating his/her own computer to retransmit his/her fax data. Operability of the color laser printer 30 can be enhanced.

Figure 8:
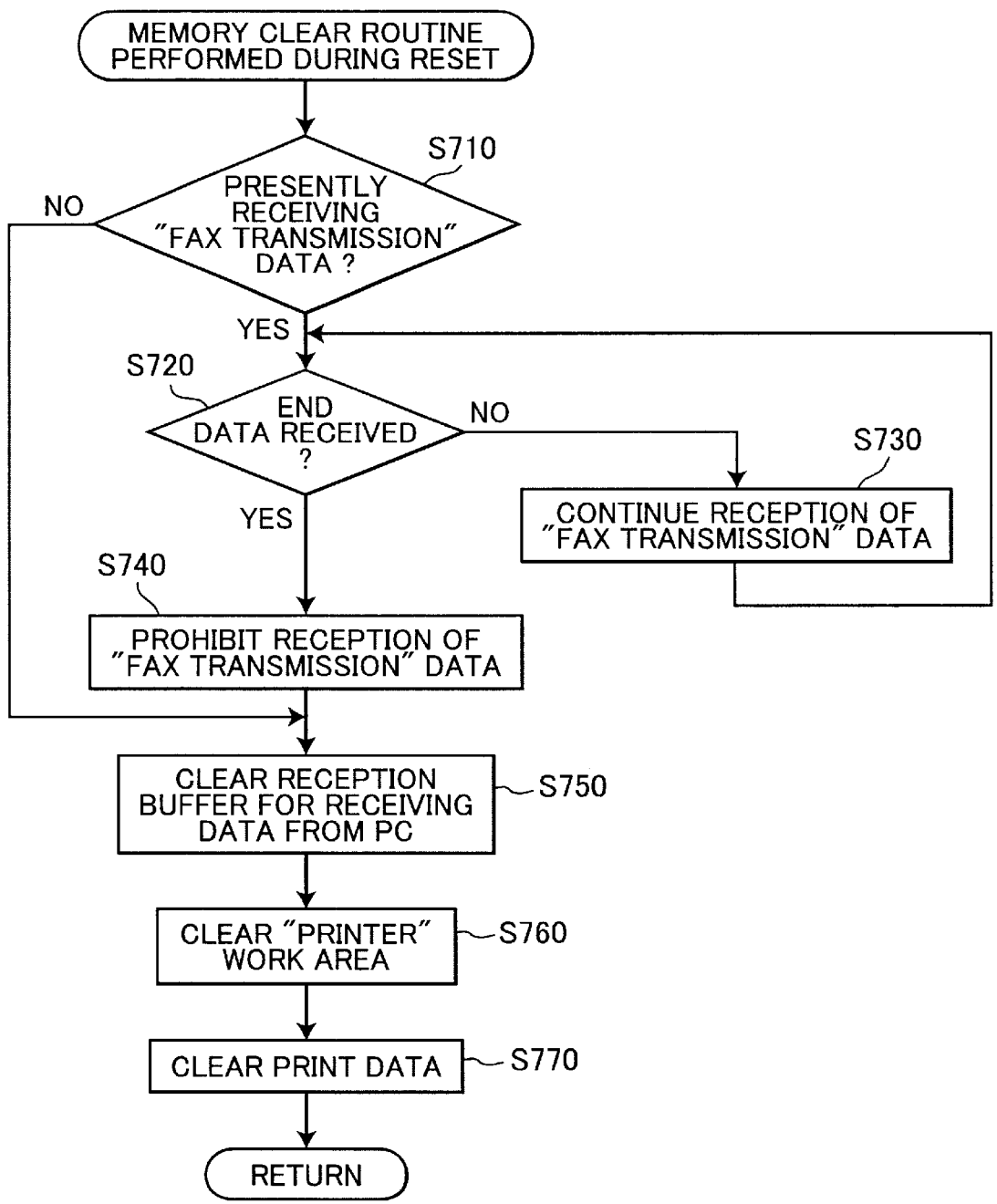
FIG. 8 is a flowchart showing a modification of the memory clear routine.

FIG. 8 is a flowchart representing another example of the memory clear operations of FIG. 7, to be performed in response to the reset command, wherein the printer memory and the fax memory are treated separately. During the memory clear operations of FIG. 8, in S710, it is judged whether or not fax transmission data is being presently received. If it is judged that fax transmission data is not being received (S710:NO), then in S750, the reception buffer for receiving data from the personal computer 11 to 14 is cleared, in S760, the printer work area is cleared, and in S770, the print data for printer function is cleared.

On the other hand, when it is judged that fax transmission data is being received (S710:YES), then in S720, it is judged whether or not reception of the fax transmission data has been completed until END data. If reception has not yet been proceeded to END data (S720:NO), in S730, reception of the fax transmission data is continued. When the fax transmission data is completely received until the END data (S720:YES), then the data in the fax memory area is maintained as is, and reception of other fax transmission data is refused any more by setting a busy condition to the interface 70 (71, 72, and 73) in S740. As a result, subsequent fax transmission data will not be received.

With this configuration, even if the reset processes are performed, in association with a print error of the color laser printer 30, reception of fax transmission data that has already been started at that point is continued. As a result, the complicated processes for informing an error message to the transmitter of the fax transmission data need not be performed. Once the single set of fax transmission data is completely received, afterward reception of further fax transmission data is refused by setting a busy condition. Therefore, even if a new fax entering command is inputted to the color laser printer 30 while the color laser printer 30 is performing the reset operations, the color laser printer 30 will not respond to the fax entering command. As a result, the reset operations can be rapidly completed while maintaining the already-received fax transmission data.

Figure 9:
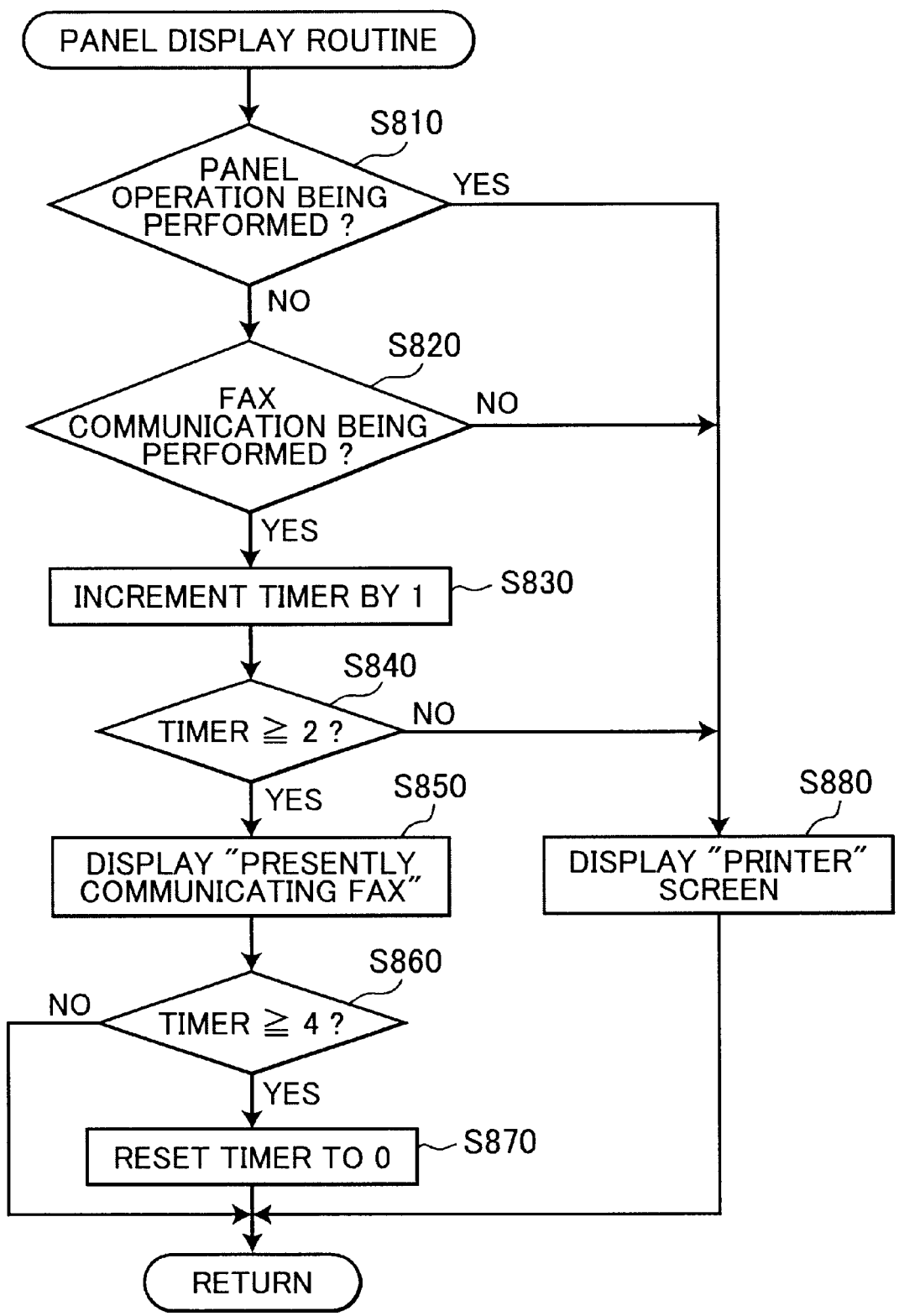
FIG. 9 is a flowchart showing a panel display routine executed by the printer.

The printer 30 executes a panel display operation shown in FIG. 9 to warn a user from erroneously turning off a power source of the printer 30 while fax communication is performed. The panel display operation routine is enabled by the process of S150 (FIG. 3), and is repeatedly executed by an interrupt function that is executed every second.

The panel display operation will be described below with reference to FIG. 9.

First in S810, the CPU 61 judges whether or not the panel 83 is being operated by a user. When the operation panel 83 is not being operated (S810:NO), then it is Judged in S820 whether or not a facsimile message is being transmitted or received. If a facsimile message is being transmitted or received (S820:YES), then the timer 68 is incremented by one (1) in S830. Next, it is judged in S840 whether or not the value of the timer 68 is two or greater. If the value of the timer is greater than or equal to two (S840:YES), then a message is displayed on the display portion (LCD) 84 in S850 to indicate that a facsimile message is being transmitted or received. For example, "Fax sending" can be displayed when a facsimile message is being transmitted and "Fax receiving" can be displayed when a fax massage is being received.

Next in S860, it is judged whether or not the value of the timer 68 is four or greater. If the timer 68 has the value of greater than or equal to four (S860:YES), then the timer is reset to zero (0) in S870.

When the operation panel 83 is being operated by the user (S810:YES), when no facsimile message is being transmitted or received (S820:NO), or when the timer value is less than two (S840:NO), the program proceeds to S880, whereupon a printer panel is displayed on the display 84 indicating information on a printer status.

Accordingly, when the operation panel 83 is not being operated by the user during transmission or reception of a facsimile message, then the panel display is performed to switchingly display, every two seconds, the condition of the printer and the fax communication condition in alternation. For example, a message indicating condition of the printer, such as "ready" or "paper jam" and a message indicating fax communication condition, such as "fax receiving" or "fax sending", are displayed alternately every two seconds on the display panel. With this configuration, the operator can be informed that a facsimile message is being transmitted or received so that the user will not erroneously cut off the power source during transmission or reception of a facsimile message.

While the operation panel 83 is being operated by the user, even when fax communication is being performed, only the printer display is performed, and the alternate display between the printer display and the fax display (warning screen) is not performed. This is because before the operator starts operating the operation panel, the user has watched the alternate display (warning screen) on the display and so will probably not erroneously turn off the power source. Also, if the alternate panel display is being performed while the operator attempts to operate the operation panel, then the operation will be difficult to perform. It is noted that normally, when the operation panel 83 is operated, an online key (not shown in the drawings), provided to the operation panel 83, is operated, thereby setting the off line condition, wherein print data can not be received. After panel operations are completed, the online key is again manipulated to bring the printer back online, that is, into a condition wherein print data can be received. Accordingly, whether or not panel operation is being performed can be judged by whether or not the printer 30 has been placed into the offline condition by panel operation.

In the above description, the panel display is alternately performed while fax communication is attained. Instead, the same objectives can be achieved by flashing an LED, provided to the display portion 84, during reception or transmission of facsimile messages. Also, instead of flashing the LED, processes for repeatedly displaying and deleting a message, that indicates fax communication condition such as "sending" or "receiving" can be executed on the display 84 to warn the user.

Figure 10:
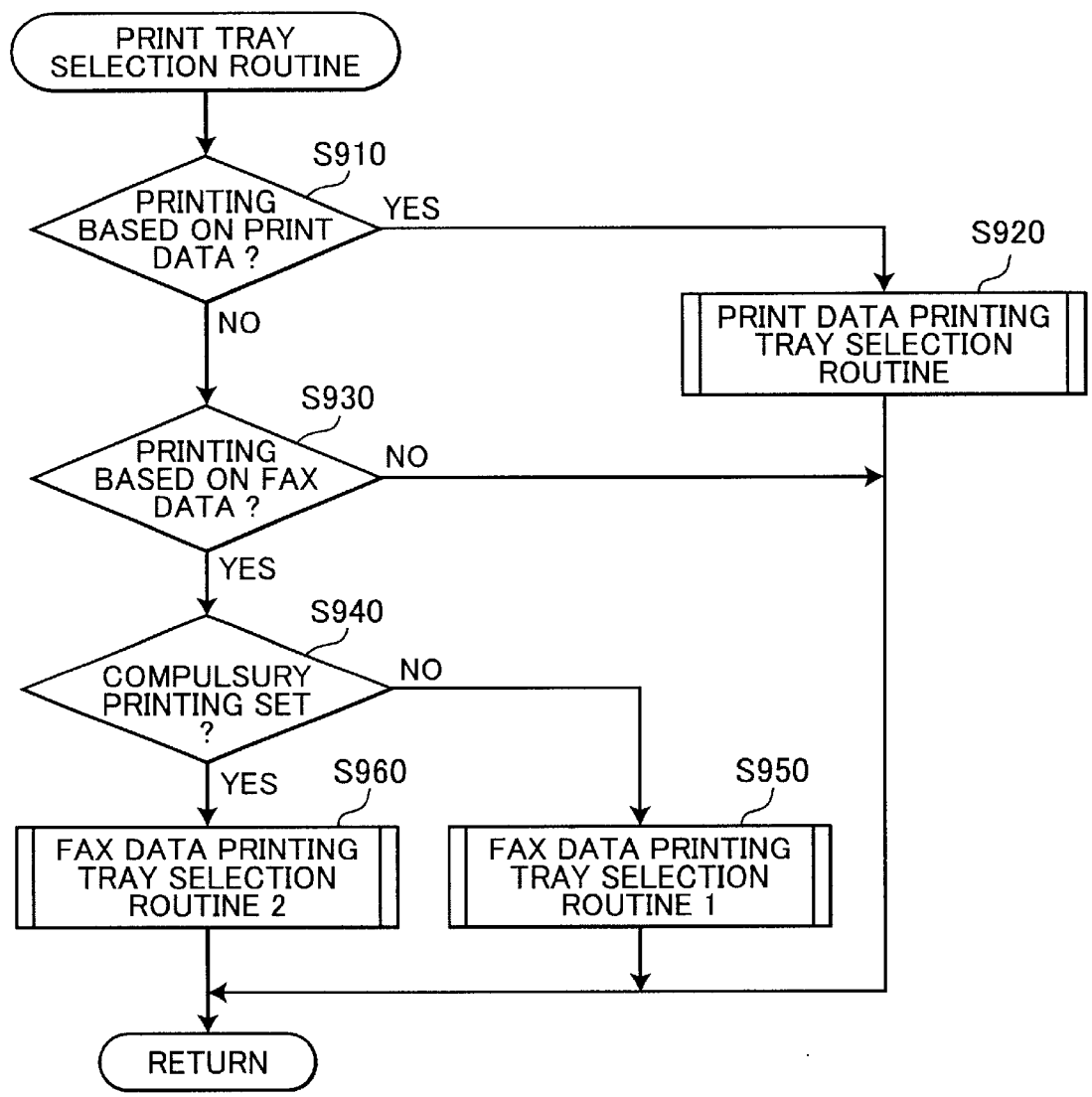
FIG. 10 is a flowchart showing a routine, for selecting a sheet tray to be used for printing, executed by the printer.

The printer 30 repeatedly executes a print tray selection process of FIG. 10. This print tray selection process is repeatedly executed as an interrupt routine at a predetermined timing. The print tray selection process is for selecting a sheet feed tray to be used for printing print data in S430 (S1850 or S1970), for printing fax transmission data in S380, and for printing fax reception data in S380 (S1820 or S1940).

The print tray selection operation will be described below with reference to FIG. 10.

First in S910, it is judged whether or not the printer print mode is being set according to the printer function. It is noted the printer 30 can be entered into the printer print mode by the affirmative judgement in S420 (FIG. 6(b)). The printer 30 can be entered into the fax print mode when some fax data (fax reception data received from remote devices or fax transmission data received from nearby computers 11–14) presently being stored in the printer 30 is designated to be printed (P) and therefore an affirmative judgement is attained in S270 and the print start request is turned ON in S280.

Figure 11:
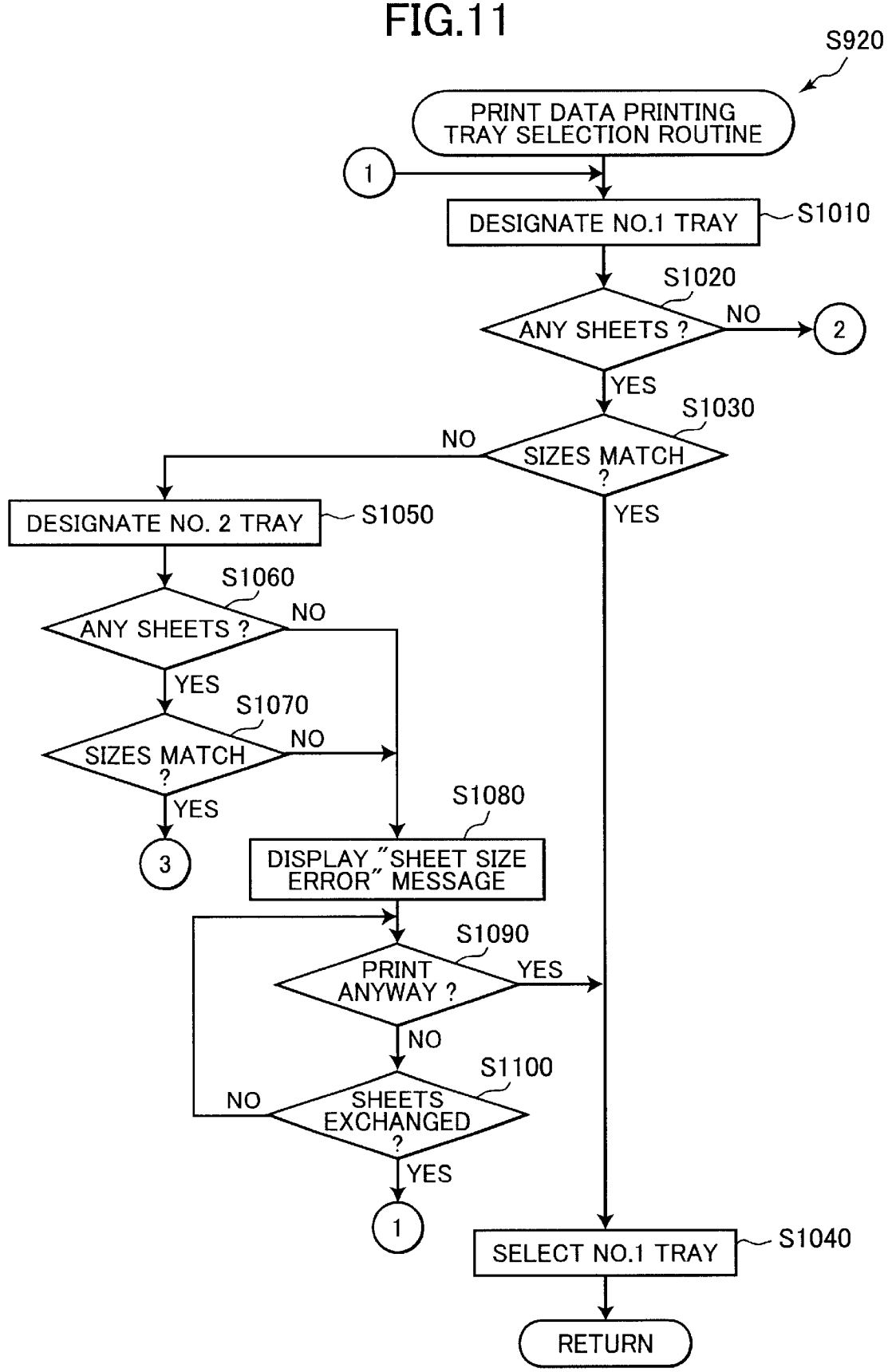
FIG. 11 is a flowchart showing a part of a process of S920, for selecting a sheet tray to be used for printing in a printer mode, during the routine of FIG. 10.
Figure 12:
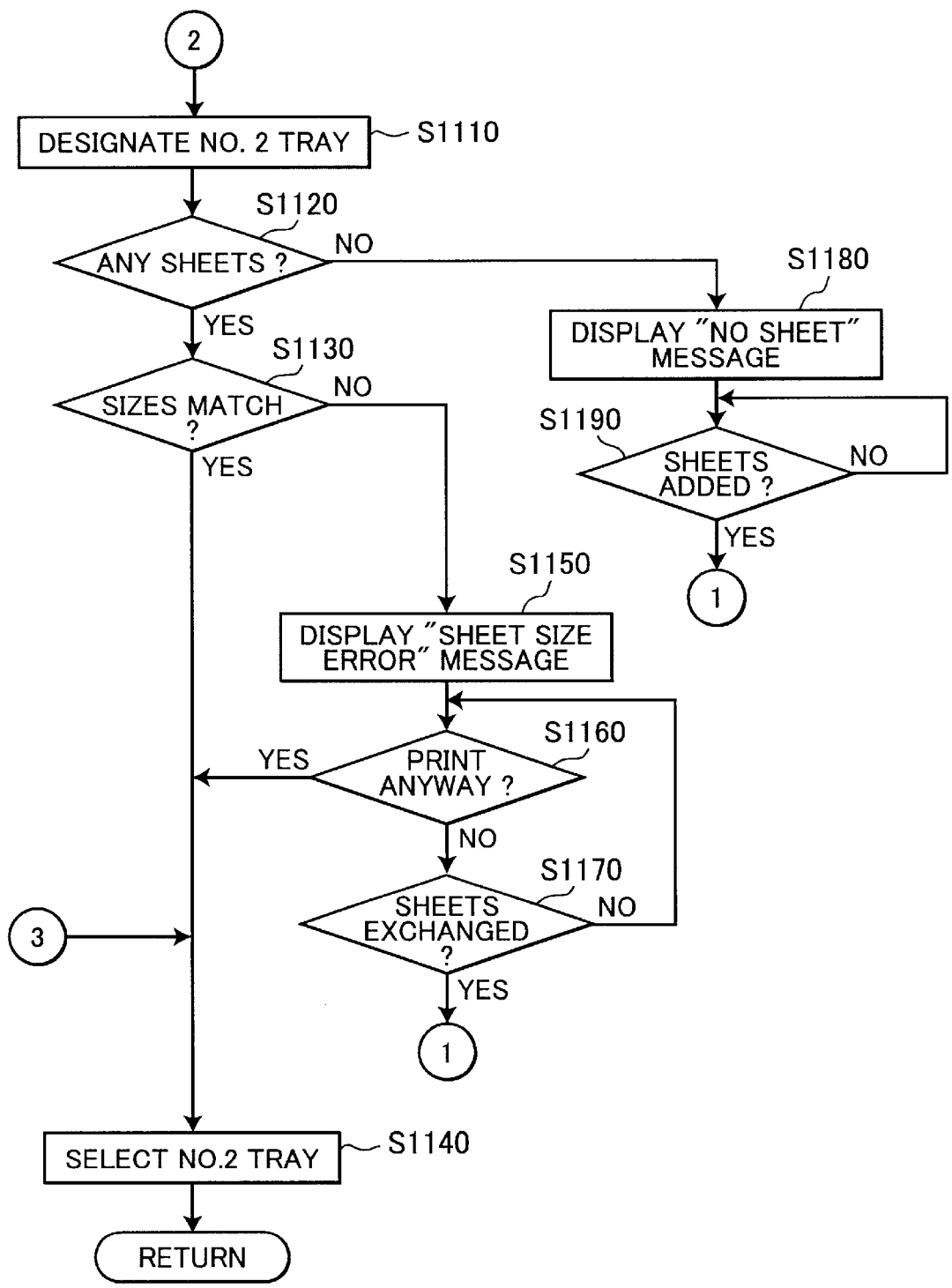
FIG. 12 is a flowchart showing a remaining part of the process of S920.

If the printer print mode is being set according to the printer function (S910:YES), then in S920, a printer print tray selection process of FIGS. 11–12 is executed. On the other hand, if the present mode is not the print mode for the printer function (S910:NO), then it is judged in S930 whether or not the present mode is a print mode for the fax function. If the present mode is not the print mode for the fax function (S930:NO), then this print tray selection operation is ended.

If it is determined that the present mode is being set as the print mode for the fax function (S930:YES), then in S940, it is judged whether or not a compulsory print mode has been set during the process of S80 or S90. If the compulsory print mode is not being set (S940:NO), then in S950, the program proceeds to a fax print tray selection routine 1 of FIGS. 13–14. When the compulsory print mode is being set (S940:YES), on the other hand, then in S960, the program proceeds to a fax print tray selection routine 2 of FIGS. 15–16. During the compulsory print mode, the amount, of an empty area in the fax reception data storage memory region (shown in FIG. 19(b) or 19(c)) is confirmed. When there is a possibility that the memory area will be insufficient, then the received fax data will be immediately printed out, in order to prevent a reception error from occurring because of the insufficient memory.

The printer print tray selection routine of S920 will be described while referring to the flowcharts shown in FIGS. 11 and 12. It is noted that the flowcharts represent the situation wherein only two trays, that is, the No. 1 tray 51 and the No. 2 tray 52, are provided to the printer 30 and the No. 1 tray 51 is set with priority as a tray for printer printing. It should be noted that as described already, the printer 30 can be additionally provided with the No. 3 tray 53 for storing A3 size normal sheets as shown in FIG. 1. However, to facilitate the explanation, the printer print tray selection routine will be explained as no No. 3 tray 53 is provided.

First in S1010, the No. 1 tray 51 is first designated as a print supply tray. In S1020, it is judged whether or not the No. 1 tray 51 has any sheets or not. When there is some sheets on the No. 1 tray 51 (S1020:YES), then in S1030 it is judged whether or not the size of the sheets in the No. 1 tray 51 matches a size required for printing print data. If the sizes match (S1030:YES), then in S1040, the No. 1 tray 51 is selected as the sheet supply tray. Printing will be executed in S430 (FIG. 6(b): S1850 or S1970) through performing the well-known sheet auto-feed printing operation with using the sheet tray 51.

On the other hand, when the size of sheets in the No. 1 tray 51 does not match the required size (S1020:YES, S1030:NO), then the No. 2 tray 52 is designated as the sheet supply tray in S1050. Next, it is judged in S1060 whether or not any sheets are in the No. 2 tray 52. When there are some sheets in the No. 2 tray 52 (S1060:YES), then it is judged in S1070 whether or not the size of sheets in the No. 2 tray 52 matches the size required for printing. It the sizes match (S1070:YES), then the program proceeds to S1140 whereupon the No. 2 tray 52 is selected as the supply sheet tray. Printing will be executed in S430 through the well-known sheet auto-feed printing operation with the tray 52.

On the other hand, when no sheets are present in the No. 2 tray 52 (S1060:NO), or even if there are sheets in the No. 2 tray 52 but the size of the sheets does not match the required size (S1070:NO), then in S1080, a size error message is displayed on the display 84 to urge the user to replace the sheets in the trays. However, when the user operates the operation panel 83 to designate a forced printing so that printing will be executed onto sheets of a mismatched size (S1090:YES), then in S1040, the No. 1 tray 51, which is set with priority, is selected as the sheet supply tray in S1040 and forced printing will be performed in S430 (S1850 or S1970) on the mismatch size sheet. When no command for forced printing is received (S1090:NO), but instead print sheets are replaced (S1100:YES), then the routine returns to S1010 and the present routine is performed again.

When no sheets are in the No. 1 tray 51 (S1020:NO), then as shown in FIG. 12, in S1110, the No. 2 tray 52 is designated as a sheet supply tray to be used. Next in S1120, it is judged whether or not any sheets are in the No. 2 tray 52. If there are some sheets in the No. 2 tray 52 (S1120:YES), it is judged in S1130 whether the size of the sheets in the No. 2 tray 52 matches the size of sheet required for printing. If the sizes match (S1130:YES), in S1140, the No. 2 tray 52 is selected as the sheet supply tray and printing will be executed with using the tray 52.

On the other hand, if there are some sheets in the No. 2 tray 52, but the size of the sheets in the No. 2 tray 52 does not match the required size (S1120:YES, S1130:NO), then in S1150, a size error message is displayed to urge the operator to exchange the sheets in the trays in S1150. In this case also, when a command is received for performing the forced printing with the mismatched size sheet (S1160:YES), then in S1140, the No. 2 tray 52 is selected as the sheet supply tray. As a result, forced printing will be performed on the sheets with the mismatched size. When no forced printing command is received (S1160:NO), but print sheets are exchanged (S1170:YES), then the program returns to S1010 and this routine is repeated.

Also, when no sheets are in the No. 1 tray 51 (S1020:NO) or the No. 2 tray 52 (S1120:NO), then in S1180, a no sheet error message is displayed on the display 84 to urge the operator to add sheets to the No. 1 tray 51 and No. 2 tray 52. Once sheets have been added (S1190:YES), then the program returns to S1010 and this routine is repeated.

Figure 13:
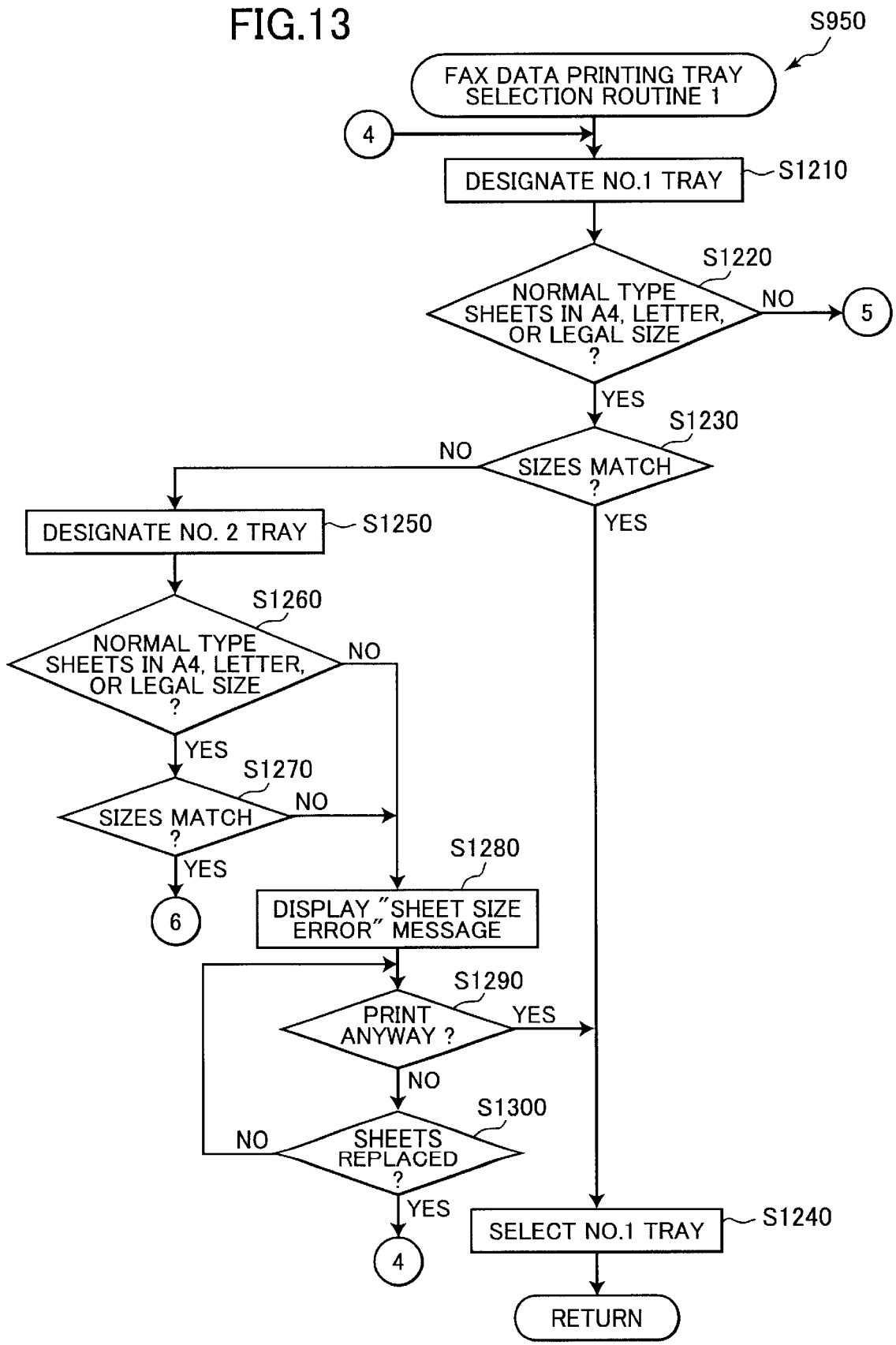
FIG. 13 is a flowchart showing a part of a process of S950, for selecting a sheet tray to be used for printing in a facsimile mode, during the routine of FIG. 10.

Next, the fax print tray selection routine 1 of S950 will be explained while referring to the flowcharts shown in FIGS. 13 and 14. The flowcharts shown in FIGS. 13, 14 also indicate the situation wherein only the two trays, that is, the No. 1 tray 51 and the No. 2 tray 52, are provided and the No. 1 tray 51 is set with priority as a print sheet supply tray for fax printing.

First in S1210, the No. 1 tray 51 is designated as the print sheet supply tray. In S1220, it is determined whether some normal type sheets (normal white thin papers) with a normal size, that is, either A4 size, letter size, or legal size, are present in the No. 1 tray 51. Even if the sheets have A4 size, but are not normal sheets of papers, such as overhead projector sheets, thick sheets, or colored sheets, then S1220 will result in a negative judgement. In other words, determination in S1220 does determine not only the size of the sheets but also the type of the sheets. As described already, the sheet size detection sensor and the sheet type detection sensor (detection portion 84) are provided to determine the size and type of sheets in each of the No. 1 tray 51 and the No. 2 tray 52. Alternatively, the user can previously manipulate the operation panel 83 to input type and size of sheets he or she has placed in the No. 1 tray 51 and the No. 2 tray 52. The determination of S1220 can be made based on this information set by the user.

When it is judged that normal white papers with a normal size, such as A4, letter, or legal size, are disposed in the No. 1 tray 51 (S1220:YES), then it is determined in S1230 whether or not the size of the sheets in the No. 1 tray 51 matches the size required for printing. If the sizes match (S1230:YES), then the No. 1 tray 51 is selected in S1240 as the sheet supply tray, and the fax printing will be executed in the fax data printing process of S380 (FIG. 5(c)).

On the other hand, when the sheets in the No. 1 tray 51 are A4. letter, or legal sized normal papers, but do not have an appropriate size required for printing fax reception data (S1220:YES, S1230:NO), then in S1250, the No. 2 tray 52 is designated as the sheet supply tray. Next in S1260, it is judged whether or not some normal type papers with the normal size, such as A4, letter, or legal size, are disposed in the No. 2 tray 52. When some normal papers with normal size are disposed in the No. 2 tray 52 (S1260:YES), then in S1270, it is judged whether or not the size of the sheets in the No. 2 tray 52 matches the size required for printing. If the sizes match (S1270:YES), the program proceeds to S1340 whereupon the No. 2 tray 52 is selected as a sheet supply tray, and printing will be executed using the tray 52.

On the other hand, when any normal sheets with normal size, such as A4, letter, or legal size, are not disposed in the No. 2 tray 52 (S1260:NO), or when the size of sheets in the No. 2 tray 52 does not match the required size (S1270:NO). then in S1280, a size error message is displayed to urge the user to change the sheets in the tray. However, if the user operates the operation panel 83 to command a forced printing with the mismatched size sheets (S1290:YES), then in S1240, the No. 1 tray 51, which is designated as the priority tray, is selected as the sheet supply tray and forced printing will be performed on the mismatched sized sheet. Even though forced printing is performed on the mismatched size sheets in this manner, because the normal type sheets with normal sizes, that is, either A4, letter, or legal size, are disposed in the No. 1 tray 51, the entire image corresponding to data received in fax transmission can be printed out without losing any information from the body of the fax data.

When no forced printing command is received (S1290:NO), but the user replaces sheets in some tray (S1300:YES), then the program returns to S1220 and the present routine is started over again.

Figure 14:
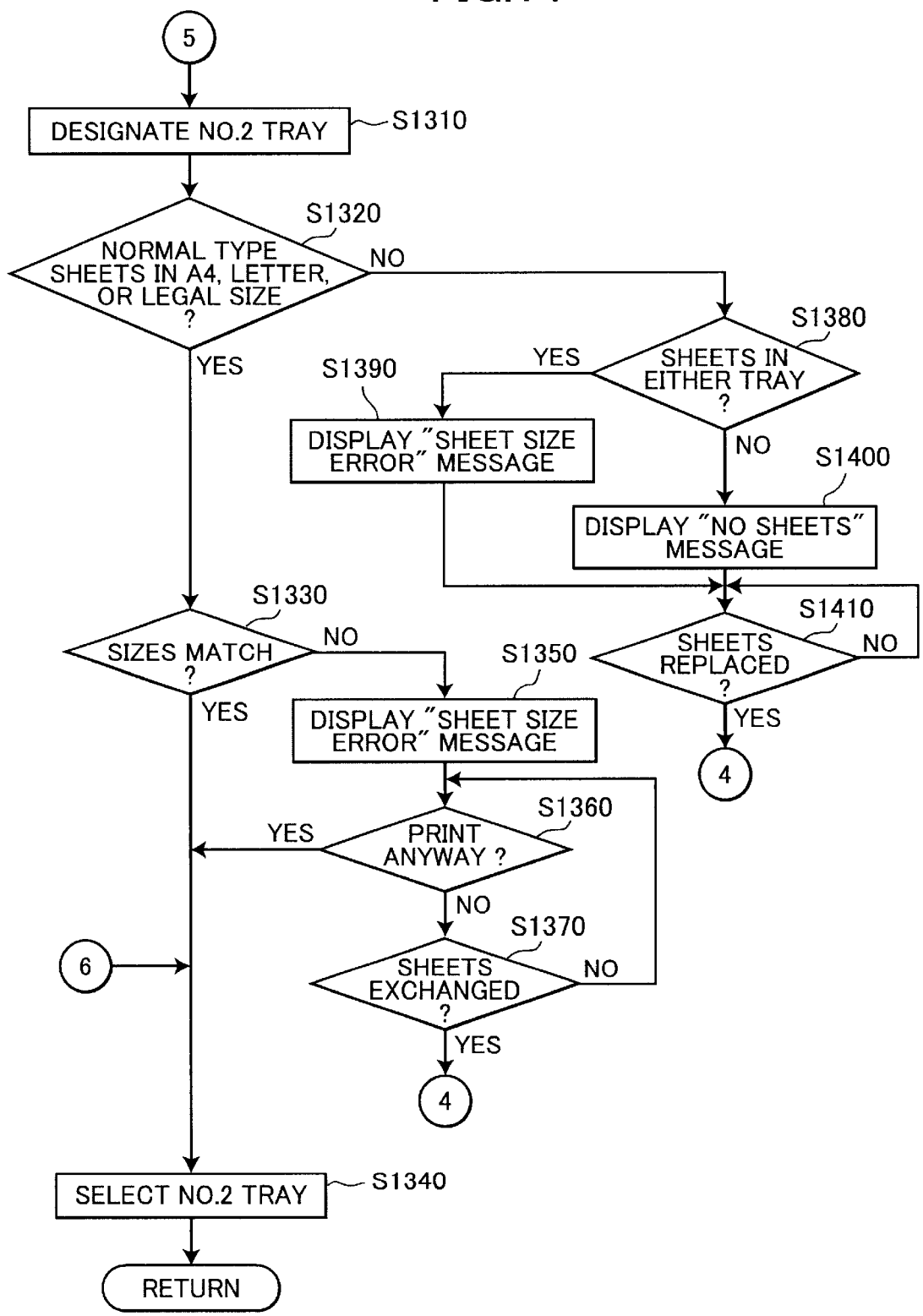
FIG. 14 is a flowchart showing a remaining part of the process of S950.

When normal sheets with normal size such as A4, letter, or legal size, are not present in the No. 1 tray 51 (S1220:NO), then as shown in FIG. 14, S1310 is performed to designate the No. 2 tray 52 as the print sheet supply tray. Next, it is determined in S1320 whether or not any normal sheets with normal size such as A4, letter, or legal size, are disposed in the No. 2 tray 52. When some normal sheets with the normal size are disposed in the No. 2 tray 52 (S1320:YES), then in S1330 it is judged whether the size of the sheets in the No. 2 tray 52 matches the size appropriate for print size of the received fax data. If the sizes match (S1330:YES), then in S1340, the No. 2 tray 52 is selected as the sheet supply tray, and printing will be executed with the tray 52.

On the other hand, when the No. 2 tray 52 contains some normal type sheets with the normal size, but the size of the sheets in the No. 2 tray 52 does not match the required size (S1320:YES, S1330:NO), then in S1350, a size error message is displayed to urge the user to replace the sheets in the No. 2 tray 52. When a forced printing command is received to instruct that a forced printing be performed with the mismatched size sheets (S1360:YES), then in S1340, the No. 2 tray 52, which has sheets disposed therein, is selected as the sheet supply tray in S1340 and forced printing will be performed on sheets with the mismatched size. Since forced printing will be performed on the normal sheets with normal sizes, even if the size of sheets is not appropriate for fax printing, all of the information, represented by the fax data, can be printed out without losing information from the body of the fax data.

When no forced printing command is received (S1360:NO), but the user exchanges sheets in some tray (S1370:YES), then the program returns to S1210 and this routine is started over again.

When neither No. 1 tray 51 or the No. 2 tray 52 has normal sheets with normal size (S1220:NO, S1320:NO), then in S1380 it is judged whether normal papers with other sizes, are present in the No. 1 tray 51 or the No. 2 tray 52. When other sized normal papers are disposed in either tray (S1380:YES), then a size error message is displayed in S1390. When no normal sheets are disposed in either tray (S1380:NO), then a no sheet error message is displayed in S1400 to urge the user to place sheets in the No. 1 tray 51 and the No. 2 tray 52. Once the user replaces sheets in the No. 1 tray 51 or No. 2 tray 52 (S1410:YES), then the program returns to S1210 and this routine is repeated over again.

In this way, when the fax print tray selection routine 1 is performed, the user can command the forced printing by operating the operation panel 83 when the normal sheets with normal sizes are present in one of the trays. On the other hand, when normal papers with other sizes or non-standard sheets, such as overhead projector sheets, thick sheets, or color sheets, are disposed in either of trays 51, 52, then forced printing will not be performed.

This is because the entire content of fax reception data can be printed out successfully without loss on normal papers with normal size. Therefore, even if the sheet size is not the optimum size, forced printing can be performed. By not enabling forced printing on other sized normal sheets, printing will not be performed on other sized normal sheets such as B5 normal sheets. Content of received data can be prevented from being lost during fax printing. Additionally, expensive sheets, such as overhead projection sheets, can be prevented from being wastefully used.

Figure 15:
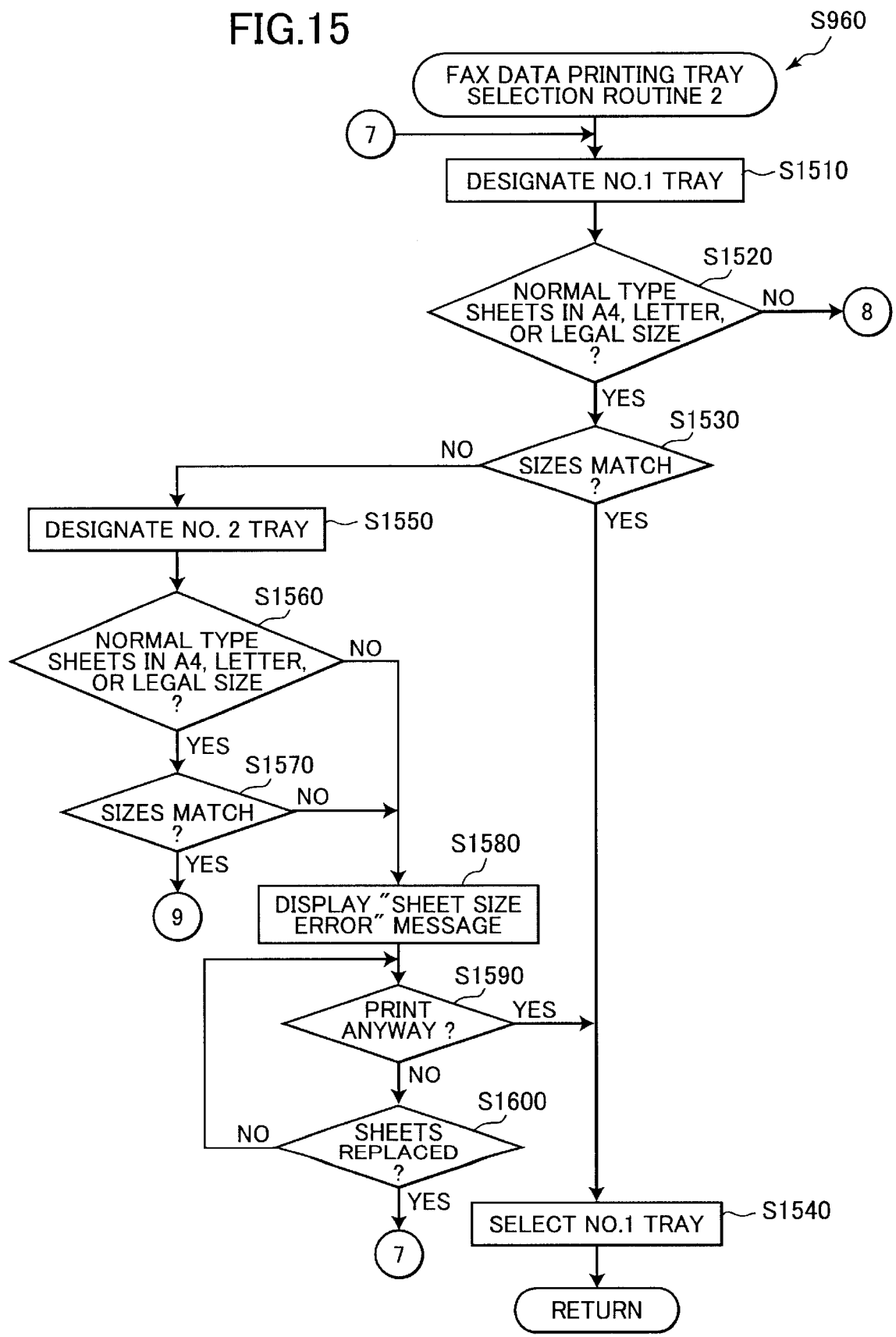
FIG. 15 is a flowchart showing a part of a process of S960, for selecting a sheet tray to be used for printing in a facsimile mode, during the routine of FIG. 10.

Next, an explanation will be provided for the fax print tray selection routine 2 while referring to the flowcharts shown in FIGS. 15 and 16. It should be noted that processes performed in S1510 to 1600 in FIG. 15 are exactly the same as the processes in S1210 to S1300 in the fax print tray selection routine 1 of FIG. 13. Also, processes of S1610 to S1710 of FIG. 16 are the same as the processes of S1310 to S1410 of the fax print tray selection routine 1 of FIG. 14.

The fax print tray selection routine 2 differs from the fax print tray selection routine 1 in that when no normal type sheets with normal size are disposed in either the No. 1 tray 51 or No. 2 tray 52, but some type of sheet is disposed in the No. 1 tray 51 or the No. 2 tray 52 (S1680:YES), after displaying a size error message in S1690, additional processes are performed in S1720 wherein it is judged whether or not an empty memory area in the fax reception region (shown in FIG. 19b or 19c) is insufficient. If the memory is judged not to be insufficient (S1720:NO), then the routine proceeds to S1710 to wait that papers be replaced. When it is judged that the memory area is insufficient (S1720:YES), even if non-standard sheets, such as overhead projector sheets, thick sheets, or colored sheets, are present in one of the trays 51, 52, but if the size is sufficient for performing fax reception printing, then the tray having those sheets is selected in S1730, and printing will be performed with using that tray.

As described above, during the fax printing tray selection routine 2, the forced printing can be performed on normal sheets with such sizes that will not lose fax data when printing the fax data. Forced printing is prohibited on normal type papers in sizes that are too small such as B5 size. These two points are the same as in the fax printing tray selection routine 1. However, in contrast to the fax printing tray selection routine 1, during the fax printing tray selection routine 2, even when sheets other than the normal type sheets with the predetermined normal sizes are disposed in the No. 1 tray 51 or the No 2 tray 52, then when the memory area is judged as being insufficient, forced printing will be compulsorily executed on available sheets which are not normal type sheets, such as overhead projector sheets, as long as the sheets have a sufficient size. This prevents reception of facsimile messages from being terminated by an insufficient memory area.

It is noted that according to the present embodiment, the No. 3 tray 53 housing A3 sized normal type sheets can be provided in addition to the No. 1 tray 51 and the No. 2 tray 52. Therefore, when memory area is judged to be insufficient (yes in S1720), the No. 3 tray 53 may be selected so that printing be executed on the A3 size normal type sheets housed therein. Even though the A3 size normal type sheets are excessively large, the entire image represented by the fax reception data can be entirely printed out without losing information. Further, the A3 size normal type sheets are less expensive than overhead protection type sheets. Furthermore, the A3 size normal type sheets can be cut down to a desired size using a paper cutter or the like.

The printer 30 repeatedly executes a fax print routine of FIG. 17(a) for printing facsimile messages received from remote devices and for printing print data received from the computers 11–14. The fax print routine is repeatedly executed as an interrupt routine with a predetermined time interval.

When the fax print routine of FIG. 17(a) is started, it is first judged in S1810 whether or not fax reception has been completed. Fax printing is started in S1820 only after fax reception has been completed (S1810:YES). Once fax printing has been started, fax printing is continued until fax printing has been performed for all the received fax data (S1830:NO, S1820). Once printing has been performed for all the received fax data (S1830:YES), then in S1840, the printer 30 can be used to print out based on print data.

If a request (printer command) is received to print out print data (S1840:YES) during the middle of fax reception (S1810:NO), then printing operations for printing out based on the print data are started in S1850 and are continued until printing is performed for all print data (S1860:NO, S1850).

Once printing has been performed for all of the print data (S1860:YES), then the color laser printer 30 is once again brought into a condition wherein it can enter the fax print mode. It should be noted that while the color laser printer 30 is in the printer print mode, the fax reception can be executed using the different routine of FIG. 5(a).

By configuring the fax print routine in this manner as shown in FIG. 17(a), when two pages' worth of fax data are received, fax printing is executed only after the second page's worth of data has been received.

Figure 17B:
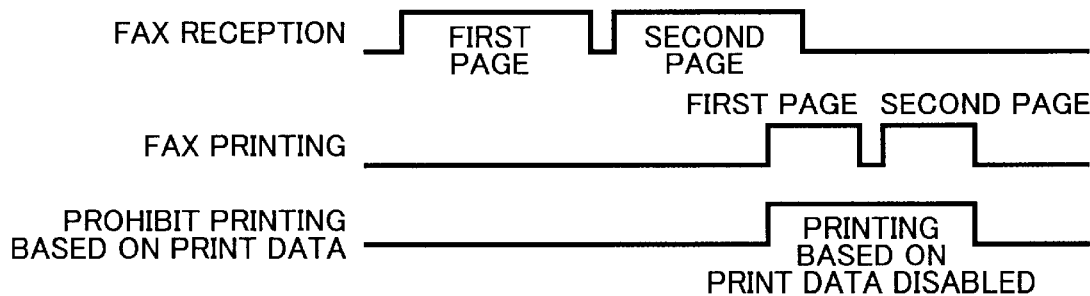
FIG. 17(b) is a timing chart for the flowchart of FIG. 17(a)

Printing based on print data is possible during reception of a facsimile message. Only when fax printing is being executed, printing can not be performed based on print data as shown in FIG. 17(b). In this way, fax print output is performed after an entire facsimile message has been completely received. Therefore, the printing engine portion 81 is driven for only a short period of time so that excessive wear on the transfer drum 35 and the like can be prevented.

Figure 17C:
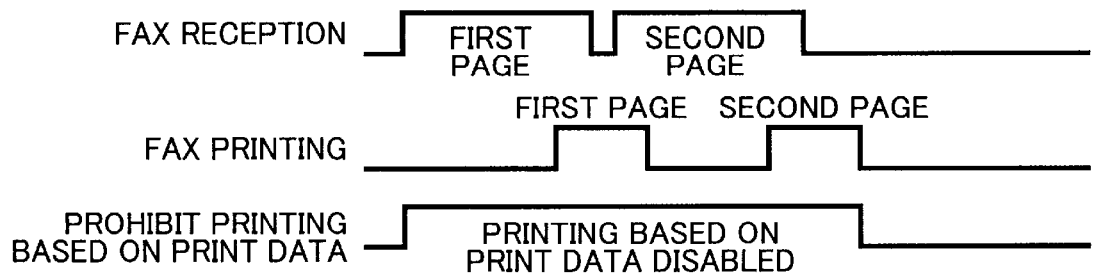
FIG. 17(c) is a comparative timing chart.

FIG. 17(c) is a comparative timing chart for showing purposes a comparative situation wherein fax print output is performed each time a single page's worth of fax data is received. When printing is performed each time a single page's worth of fax data is received, then duration of time when the printer can not be used for printing based on print data is increased. Further, the time interval between when the printing engine portion 81 prints the first page and the second page increases. Therefore, the sheet supply operations for the second page can not be performed while the first page is being printed. In other words, a consecutive printing operation can not be performed. Therefore, drive time for sheet transport operations increases, and wear of the transfer drum 35 and the like increases. Depending on the amount of fax reception data and speed of fax reception, the time interval between printing of successive pages will possibly further increase. Operations for driving the transfer drum 35 have to be temporality stopped and then restarted repeatedly. This type of drive quickly wears down the sheet transport mechanism 82, the transfer drum 35, and the like.

Thus, according to the fax print process of FIG. 17(a), while facsimile data is being received, printing of the facsimile data is not started, and the facsimile data is merely stored in the facsimile data memory region shown in FIG. 19(b) or 19(c). While the facsimile data is thus being received, the print request for print data can be received until the facsimile data is completely received. When the facsimile data is completely received and when printing of print data is not yet started, the facsimile data now stored in the facsimile data memory region is started being printed. When printing of the facsimile data is being executed, interruption by a print request for print data is prohibited until printing of the facsimile data is completed. While interruption by a print request for print data is thus prohibited, print data is merely stored in the print data memory region. When printing of the facsimile data is completed and the interruption by the print request is enabled, print data is printed. Printing of facsimile data is prohibited until printing of the print data is completed.

Next, an explanation will be provided for a modification of the fax print processes of FIG. 17(a) while referring to the flowchart in FIG. 18(a).

During the fax print processes of FIG. 18(a), it is first judged in S1910 whether or not fax reception is being performed. If fax reception is being performed, then in S1920, it is judged whether or not a memory full condition will occur based on confirmation of a residual amount of memory area in the fax data reception memory area (shown in FIG. 19b or 19c). It should be noted that judgement of whether the memory full condition will occur can be performed before fax reception is started. When the residual amount of the memory area is judged to be smaller than a predetermined amount and therefore it is speculated that the memory full condition might occur (S1920:YES), then in S1940, fax printing operations are started even while fax reception is still being performed. When it is judged that the memory full condition will not probably occur (S1920:NO), then it is judged in S1930 whether or not fax reception has been completed. The following processes in S1930 to S1980 are the same as the fax print processes of S1810–S1860 described above with reference to the flowchart in FIG. 17(a).

Figure 18B:
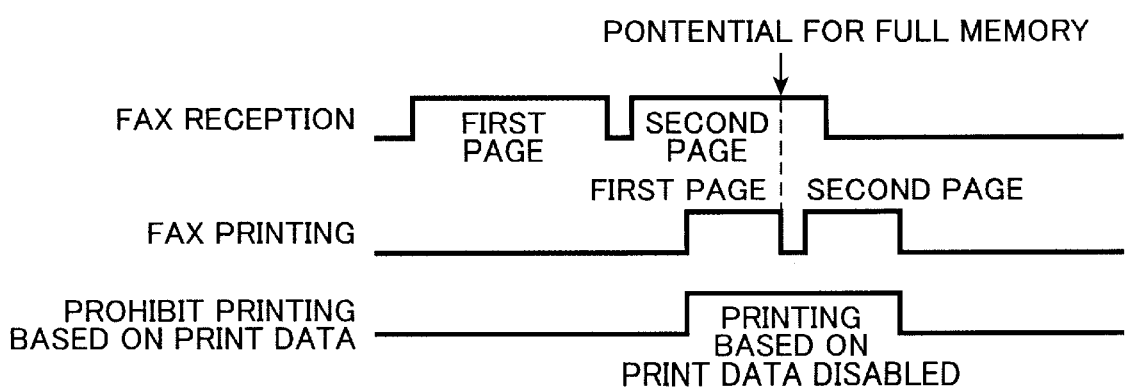
FIG. 18(b) is a timing chart for the flowchart of FIG. 18(a)

With this configuration, as shown in FIG. 18(b), when it is judged that a memory full condition might occur while receiving two page' worth of fax data, for example, then fax printing is started at a timing so that the first page of the facsimile message can be completely printed before the memory full condition occurs and so that the fax reception memory can be quickly cleaned. Therefore, the memory full condition can be prevented from occurring during the reception so that fault fax reception can be prevented. In this modification also, once fax printing is started, fax printing is given priority and continued until fax printing has been performed for all received fax data. Accordingly, a command for printing based on print data will not be received during fax printing, and therefore sheets printed based on fax data will not be mixed up with sheets printed based on print data.

In other words, according to the process of FIG. 18(a), while facsimile data is being received, it is judged whether the amount of an empty area in the facsimile data memory region will become smaller than the predetermined amount and the facsimile data memory region will become a memory full condition. When the memory full condition is judged, the interruption by the print data printing request is prohibited, printing of the facsimile data now stored in the facsimile data memory region is started, and the interruption by the print data printing request is enabled when printing of the facsimile data is completed.

It should be noted that the fax print routine of FIGS. 17 and 18 is explained on the presumption that the fax priority is set to off in the option detection routine of FIG. 3. For this reason, as described above, duration of time wherein printing can not be performed based on print data is shortened.

If the fax priority is set to ON, even if the request for printing based on print data is received during fax reception, the print data will only be stored. However, even if the fax priority is set to ON, the fax printing is executed after all fax data has been received. Therefore, the period of time when the printing engine portion 81 has to be driven consecutively can still be shortened. Therefore, wear of the transfer drum 35 and the like can be suppressed sufficiently.

According to the present embodiment, a page protect mode can be set with respect to the memory management of the RAMs 63, 64 when printing print data. As shown in FIG. 19(b), the page protect mode is generally known as a mode for securing, in a free area of the memory, an image region for enabling development of a single page's worth of print data, received from the personal computer 11–14, for printing.

During fax printing, image data, corresponding to the upper left side of the image, is received first. Therefore, there is no need to perform processes of the page protect mode. In other words, there is no need to secure an image development region for a page's worth of data in the free area. Band processes are more appropriate for fax printing. During band processes, several regions, each for developing several lines worth of image data, are prepared, and the regions are repeatedly rewritten with fax data while printing is being performed.

If the page protect mode is kept valid also during fax printing, the amount of empty regions in the RAMs 63, 64 is restricted. Accordingly, a sufficient amount of area cannot be obtained as required for developing the received fax data (G3 compressed data) into intermediate compressed data to be used for printer output. Also, the amount of the data area for storing fax reception data has to be initially set to a small value.

Considering the above-described problems, the fax print process of S1820 or S1940 can be executed as shown in FIG. 19(*a*) when the color laser printer 30 is set to the page protect mode for printing based on print data. As shown in FIG. 19(*a*), first in S2010, the settings relating to the page protect mode are stored in the RAM 63 or 64. Then in S2020, the page protect mode is turned off. As a result, even if a large image region is secured as shown in FIG. 19(*b*) when the page protect mode is on, by turning the page protect mode off during fax printing, then as shown in FIG. 19(*c*), the image region can be reduced to a smaller amount that is sufficient as required for executing band processes. As a result, the amount of the free area, for developing fax data into compressed data for printing and for performing other operations, can be increased. By thus increasing the free area, the large-sized fax data area can be initially secured.

Thus, during the fax printing processes, the page protect mode is turned off, to enable using the enlarged free area. That is, fax data processes are performed in 52030, to convert with using the enlarged free area, fax data, such as G3 compressed data, into compressed data for printing. Next, fax printing operations are performed in S2040. The fax printing operations of S2040 are performed by executing band processes to consecutively develop an every predetermined number's lines worth of data, from the top of the page consecutively downward, into bitmap data for actual printing. The bit map data is used by the print engine portion 61 to be printed.

When fax printing is completed (S2050:YES), then in S2060, the setting conditions relating to the page protect mode stored in S2010 are returned to the original condition, and this routine is ended. That is, the page protect mode is turned ON according to the stored setting conditions.

As described above, the free area shown in FIG. 19(*c*) is used for processing both print data and fax data. Accordingly, it is preferable that processes of FIG. 20 be executed for setting a busy state to an interface, that is not being used for fax communication, so that a sufficient amount of empty capacity can be secured in the free area as required for developing fax data into data for printing.

Figure 20:
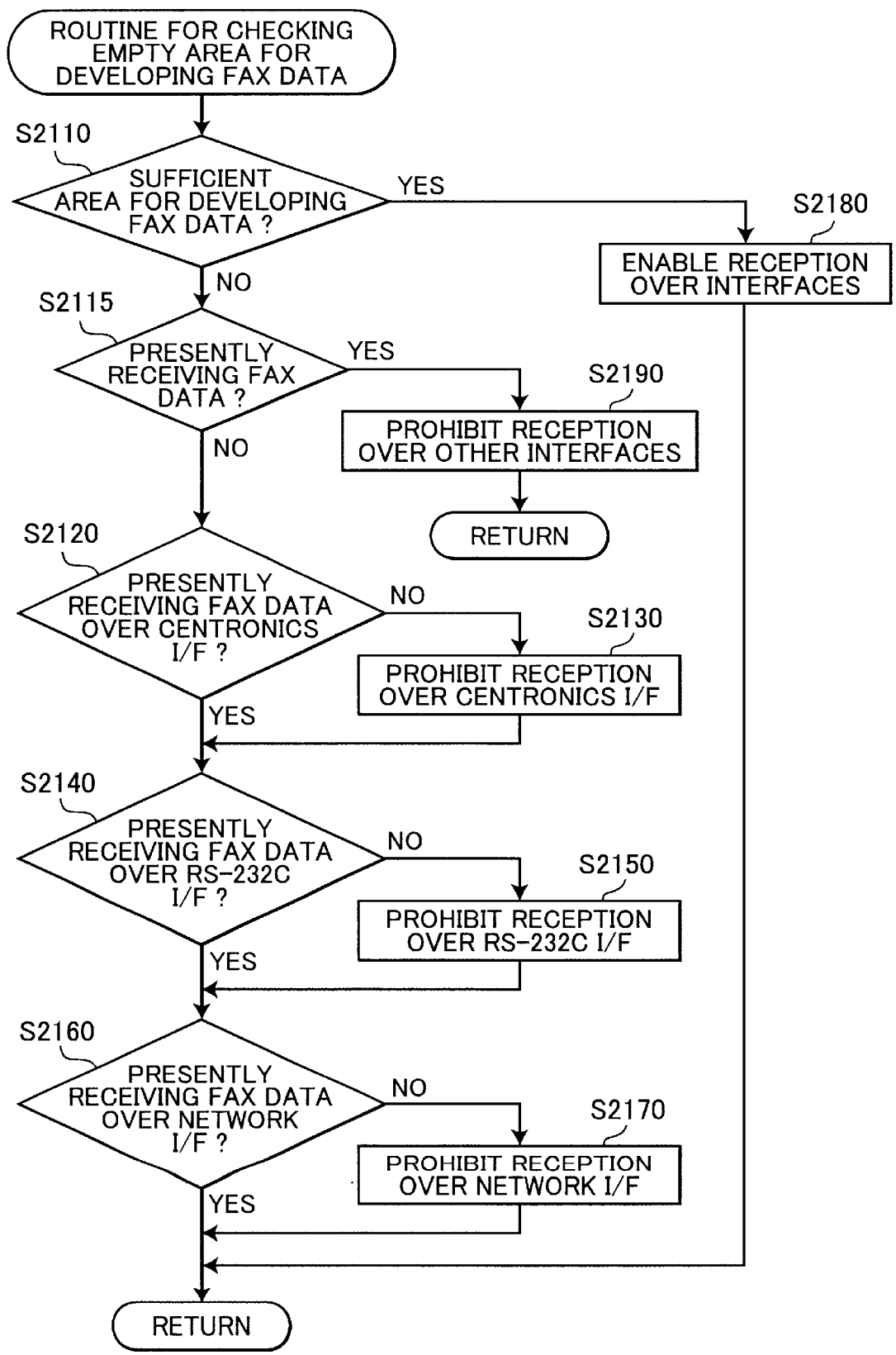
FIG. 20 is a flowchart showing a routine executed by the printer for checking empty area in a fax data memory.

This routine of FIG. 20 is repeatedly executed with a predetermined time interval.

First in S2110, it is judged whether or not a sufficient area is available in the free area (shown in FIG. 19(*c*)) for developing fax data into data for printing. If it is judged that the present empty area in the free area has an amount smaller than a predetermined amount and therefore it is judged that an insufficient area is available (S2110:NO), then in S2115, it is judged whether or not fax reception from any remote device is being performed. When it is judged that fax reception is being performed (S2115:YES), then in S2190, all the other interfaces are set to busy state (reception disabled state). When it is judged that fax reception is not being performed (S2115:NO), then in S2120, it is judged whether or not the Centronics interface 72 is presently receiving fax transmission data. If it is judged that Centronics interface 72 is not receiving fax transmission data (S2120:NO), then in S2130, the Centronics interface 72 is set to busy state (reception disabled state).

Next in S2140, it is judged whether or not the RS-232C interface 71 is presently receiving fax transmission data. If the RS-232C interface 71 is judged not to be presently receiving fax transmission data (S2140:NO), then in S2150, the RS-232C interface 71 is set to busy state (reception disabled state).

Next in S2160, it is judged whether or not the network interface 73 is presently receiving fax transmission data. When it is judged that the network interface 73 is not presently receiving fax transmission data (S2160:NO), then in S2170, the network interface 73 is set to busy state (reception disabled state).

With this configuration, when the empty capacity in the free area (common area) to be used for developing fax data into data for printing is becoming insufficient, if fax reception is not being performed, all the interfaces, other than that presently receives fax transmission data from the computers 11–14, are set to the busy conditions. When the interface is presently receiving fax reception data from a remote device, all interfaces for receiving data from personal computers 11–14 are set in a busy condition. During the next interrupt routine of FIG. 20, when sufficient free area is available (S2110:YES), then in S2180, the busy condition for interfaces, that have been set as being busy when the area for fax data development was considered to be Insufficient, are turned off in S2180. It should be noted that during S2180, turning off of the busy condition is performed only on those interfaces that have been set as being busy because the fax development area was determined to be insufficient during the already-executed interrupt routine of FIG. 20. Interfaces that have been set as being busy for other reasons than this are continued to be set as being in a busy condition. It is noted that the reasons why the interfaces are set as being in a busy condition can be known by setting a flag for indicating the busy condition in a memory of the color laser printer 30.

According to the above-described configuration, the empty area, for developing fax data into compressed data for printing, is checked so that before the empty capacity required for the fax data development in the free area can not be properly secured due to print data developed in the free area, the interfaces not being used for fax transmission or reception are set to a busy condition, thereby preventing the empty area from being decreased to an insufficiently small size.

With the above-described structure, the system of the present embodiment can perform a multiple-copy fax transmission processes for sending the same fax transmission data to a plurality of remote devices using the application software, such as a word processing software, installed in each personal computer 11–14.

Figure 21:
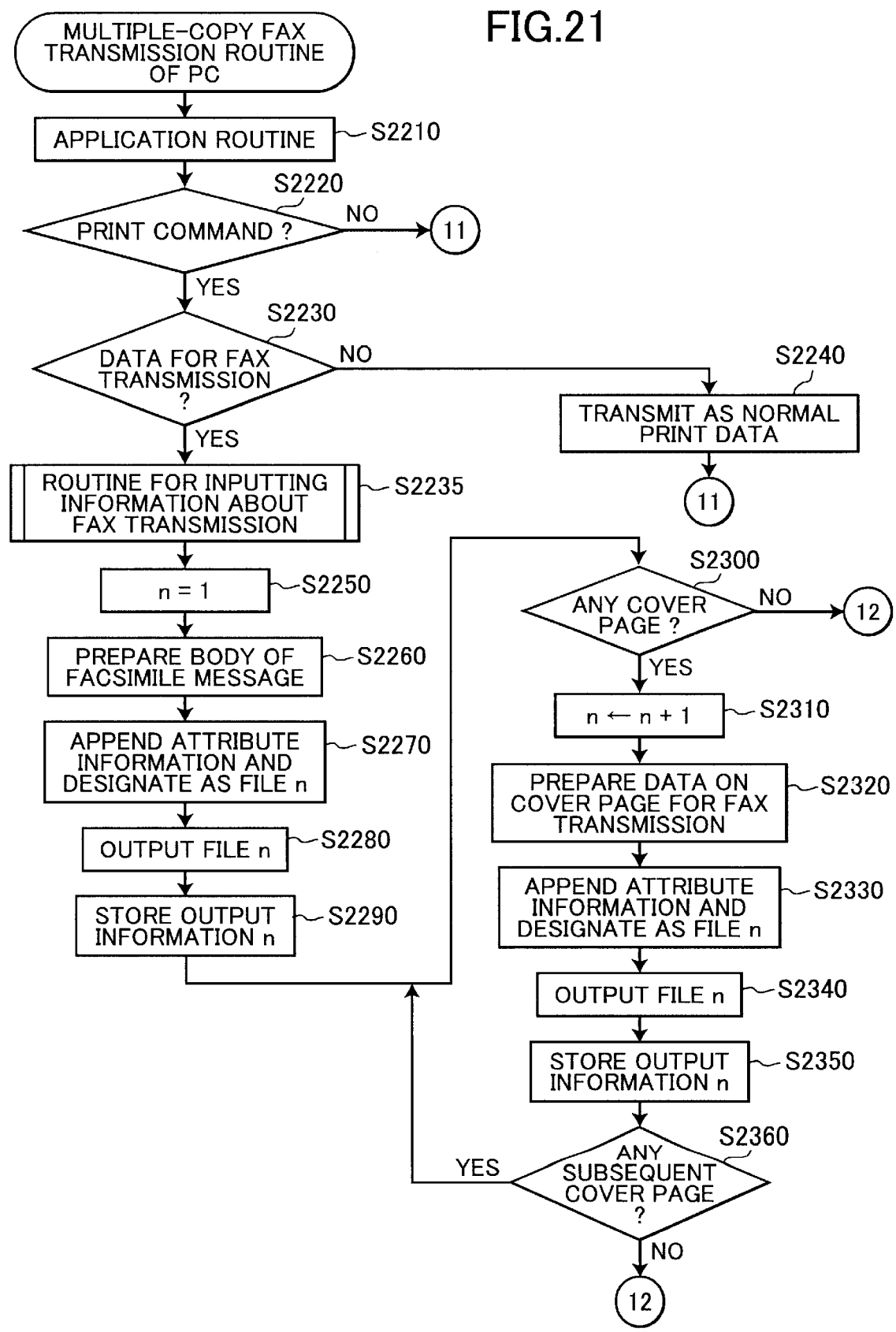
FIG. 21 is a flowchart showing a part of a routine executed by each personal computer for performing a multiple-copy fax transmission process.
Figure 22:
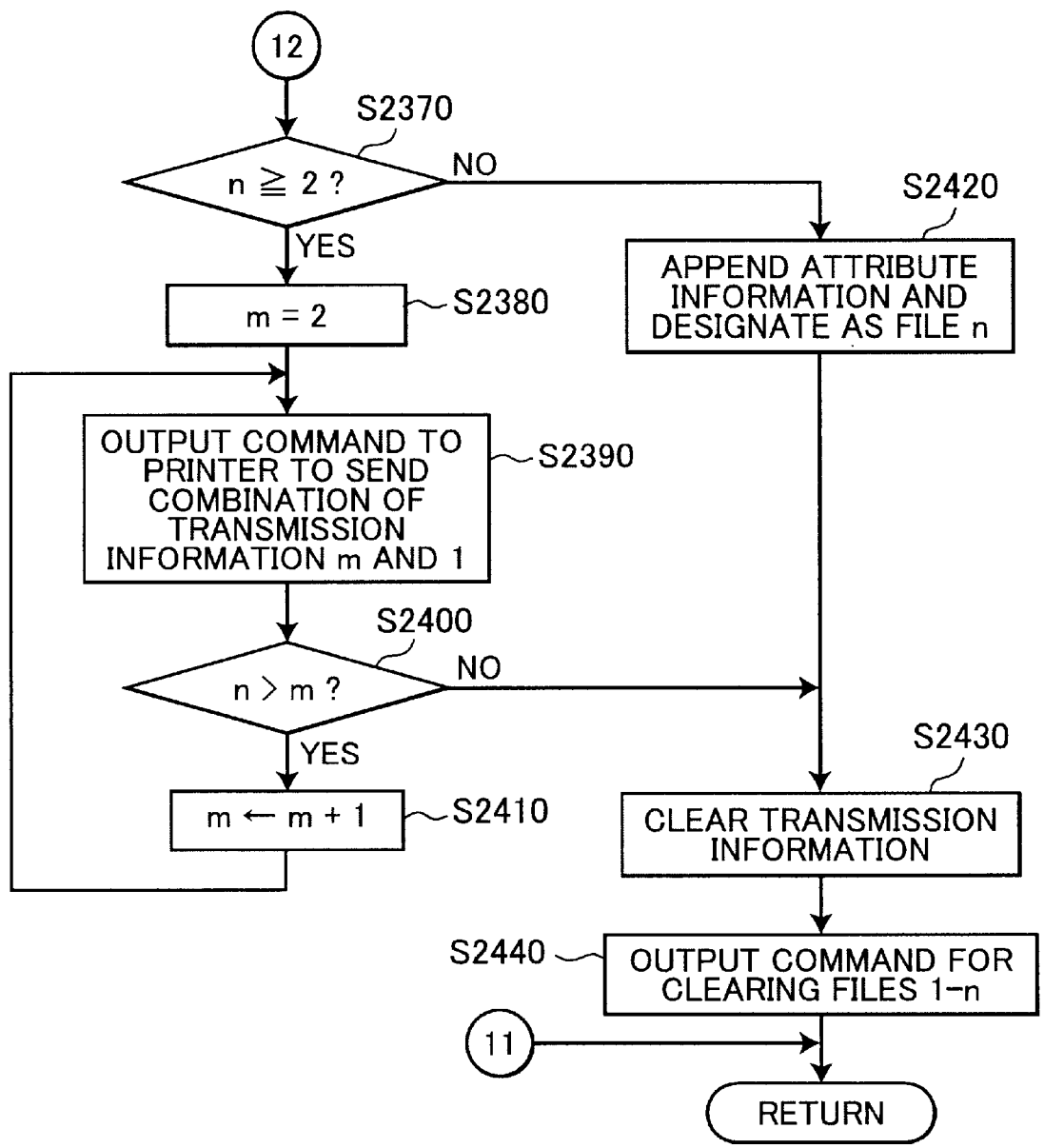
FIG. 22 is a flowchart showing a remaining part of the routine for performing the multiple-copy fax transmission process.

In order to attain the multiple-copy fax transmission processes, the main routine of FIG. 6(*b*) executed by each personal computer 11–14 may preferably be modified as shown in FIGS. 21 and 22.

First, the CPU 101 executes application processes in S2210 to prepare text data using the application software, such as a word processing software, installed in the ROM 102. The CPU 101 executes the application processes repeatedly until a print command is inputted by the operator (S2220:NO).

When a print command is inputted during the application processes (S2220:YES), then in S2230, the CPU 101 judges whether or not the print command is for fax transmission through judging whether or not the print command designates the printer 30 as a fax function-added printer. When the print command selects the printer 30 as a normal printer and therefore the subject of the print command is not for fax transmission (S2230:NO), then in S2240, a normal print data transmission routine is executed according to the presently-used application software.

When the print command designates the printer 30 as a fax function-added printer and therefore subject data is for fax transmission (S2230:YES), then the fax transmission information input routine is performed in S2235. During the fax transmission information input routine, an input screen is displayed on the CRT 111 for enabling the user to input: information (telephone number) of one or more remote parties where the subject fax transmission is to be transmitted; and data indicative of the sender (user). Another screen is also displayed for enabling the user to select whether or not a cover page is to be added. The user follows the instructions displayed on the screens and inputs: the telephone number(s) of the remote fax machine(s) where the message is to be sent; data of the user (sender); and information that needs to be shown on the cover page(s) to be sent. Then, when the user finally inputs a print OK command during the fax transmission information input routine of S2235. following processes are executed. The multiple-copy fax transmission will be performed when a plurality of fax numbers are inputted in S2235 as the telephone numbers of remote devices where the subject facsimile message is to be transmitted.

Thus, when the printer 30 is selected as a fax transmission unit (fax function-added printer) and the OK button is clicked after necessary information has been inputted in S2235, then in S2250, a counter "n" representing the number of transmission data is set to one (1). Next in S2260, fax text data is prepared by executing a fax transmission data preparation routine. More specifically, a routine for converting text data, prepared by the word processing software, into G3 compressed type fax data. Then in S2270, the G3 compressed type fax data, prepared in S2260, is appended to attribute information indicating that the present fax data is a main message to be combined with a cover page during a multiple-copy fax transmission, and is defined as file "n", that is, in the present example, file 1 because the counter "n" is now set to 1. Next in S2280, the file "n" is transmitted to the color laser printer 30, which Is now selected as a fax transmission unit. In S2290, the RAM 103 is stored with transmission information "n" (in this case transmission information 1) indicating that main message data has been transmitted to the fax transmission printer 30 as file "n".

Next in S2300, the CPU 101 judges whether or not a cover page is designated to be transmitted for the fax transmission. When a cover page is to be transmitted (S2300:YES), then in S2310, the counter "no" representing the transmission data number is incremented by one (1). In S2320, the CPU 101 prepares cover page data in a format for fax transmission, that is, G3 compressed type fax data, in the same manner as the main facsimile message. Next in S2330, the cover page data is appended with attribute information indicating that the present cover page is a fax transmission cover page to be combined with a main message during the multiple-copy fax transmission operation, and the resultant information is defined as file "n". Afterward in S2340, file "n" is transmitted to the fax transmission printer 30. In S2350, the RAM 103 is stored with transmission information "n" representing that the cover page data has been transmitted to the fax transmission printer 30 as file "n".

Afterwards, it is judged in S2360 whether or not another cover page has to be prepared for attaining the user's designated multiple-copy fax transmission. When another cover page has to be prepared (S2360:YES), then the program returns to S2310 so that the transmission data number counter "n" is incremented by one (1) and the processes from S2320 and on are repeated. Once S2310 to S2350 have been completed for all necessary cover pages (S2360:NO), then in S2370, it is judged whether or not the present value in the transmission data number counter "n" is two or greater. It is noted that when it is judged in S2300 that a cover page is not designated (S2300:NO), then the program proceeds directly from S2300 to S2370 without performing processes from S2310 to S2360.

When it is judged that the present value of the transmission data number counter "n" is two or greater (S2370:YES), then a counter "m" indicating the start number of cover page transmission information is set to two (2) in S2380. Next in S2390, the CPU 101 sends to the fax transmission printer 30 a send command indicating that transmission information "m" ((m−1)-th cover page) be combined with transmission information "1" (main message) and that the combination information be fax transmitted to an address corresponding to the transmission information "m". Thus, a send command for sending a combination of the main message and the first cover page is outputted.

After a fax send command to a single address is thus outputted, then in S2400, it is judged whether or not the value of "n" is greater than the value of "m". When "n" is greater than "m" (S2400:YES), the counter "m" is incremented by one (1) in S2410. Afterward, the program returns to S2390, whereupon the CPU 101 outputs the send command for instructing that the cover page and the main facsimile message be combined and that the combination be fax transmitted to the address corresponding to the cover page. Thus, a send command for sending a combination of the main message and the second cover page is outputted.

S2390 to S2410 are repeated until S2400 results in negative determination. Once send commands have been completely outputted to transmit all cover page/main facsimile message combinations to all addresses, then in S2430, the CPU 101 clears the transmission information stored in the RAM 103. Further in S2440, the CPU 101 transmits to the printer 30 a delete command for clearing files "1" to "n" which have been prepared in S2270 and S2330.

When the value of the counter "n" is less than 2 (S2370:NO), then this means that the user has designated to transmit a facsimile message, without a cover page, to only one address. Therefore, in S2420, the CPU 101 transmits to the printer 30 a send command instructing that transmission information "1" (main facsimile message) be fax transmitted to the designated address. Then the processes from S2430 and on are executed.

When receiving the main message and the cover pages, the printer 30 will store the main message and the cover page in the memory region in S450 (FIG. 6(*b*)). When receiving a send command for each combination of the main message and all the cover pages, the printer 30 will store in S550 (FIG. 6(*b*)) the send designation (S) data in correspondence with the main message and the cover pages. When receiving the delete (clear) command, the printer 30 will store in S570 (FIG. 6(*b*)) delete designation (D) data in correspondence with the main message and the cover page.

Figure 23:
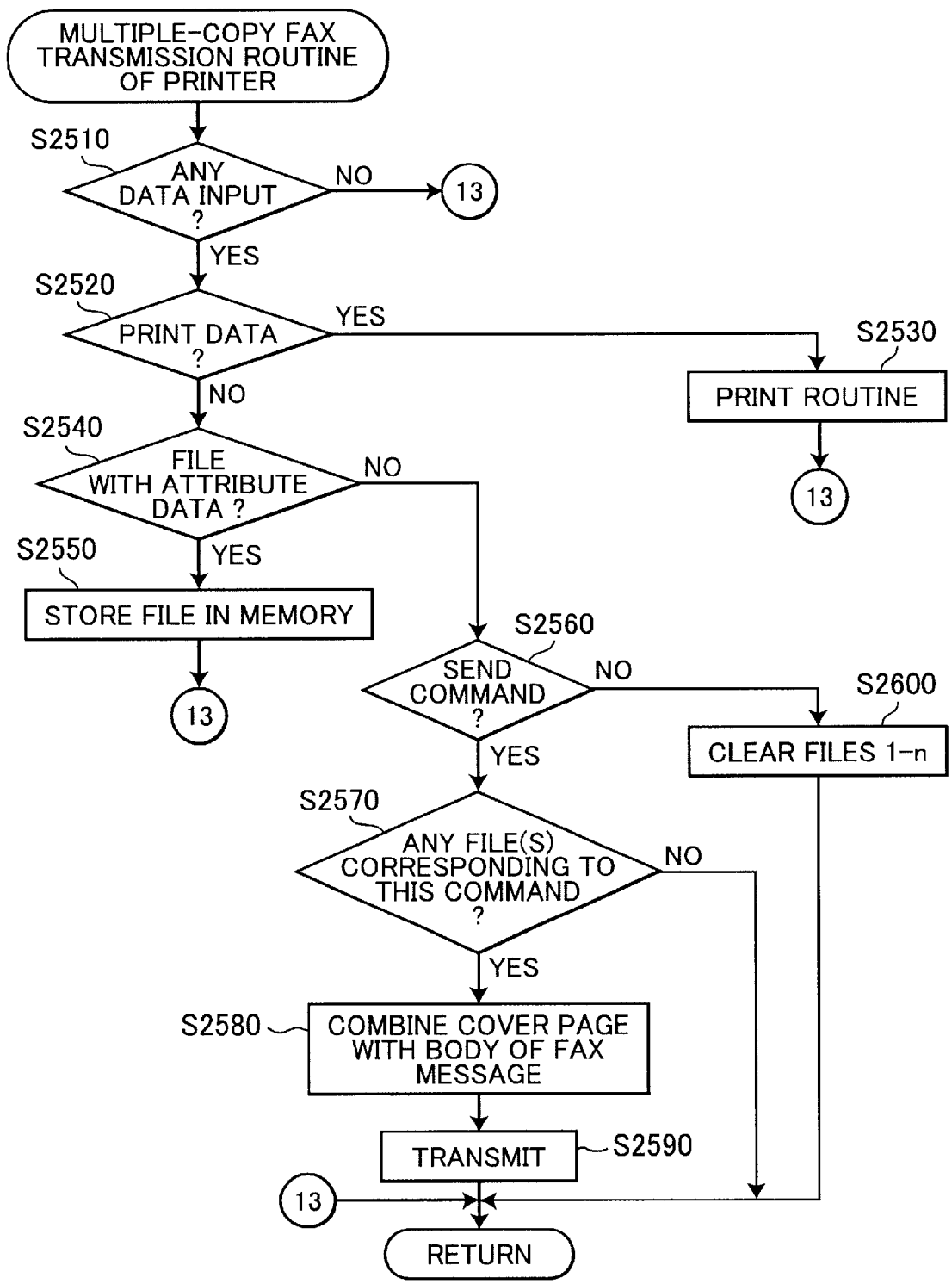
FIG. 23 is a flowchart showing a routine executed by the printer for performing the multiple-copy fax transmission process.

In order to attain the multiple-copy fax transmission operation, the printer 30 additionally executes a multiple-copy fax monitoring process shown in FIG. 23. This monitoring process is repeatedly executed as an interrupt routine at a predetermined time interval.

During the monitoring process of FIG. 23, the CPU 61 first judges in S2510 whether or not data interpreted in the main routine of FIG. 6(b) has been registered in the fax data memory region of the RAM 63 and 64. When some data has been registered (S2510:YES), then in S2520, it is judged in S530 whether or not the data is for a printing designation (P). When the data is the printing designation (P) (S2520:YES), then in S2530, a print process is executed to set a printing flag to fax transmission data designated by the printing designation data (P). As a result, the judging process of S270 (FIG. 4) will result in an affirmative, and printing processes of FIG. 5(c) will be executed.

When the data is registered not for printing (S2530:NO), then in S2540, it is judged whether or not the data is appended to the attribute information indicating that the subject data is a main message to be combined with a cover page or a cover page to be combined with a main message. It is noted that when data has been prepared in the personal computer 11–14 for the multiple-copy fax transmission, then as described above for the processes in S2270 and S2280, each main message file is produced as appended with attribute information indicating that the file is a main facsimile message to be combined with a cover page. Also, as described above for the processes in S2330 and S2340, each cover page file is produced as appended with attribute information indicating that the file is a cover page to be combined with a main message. Accordingly, the printer 30 can judge in S2540 whether or not the data is a fax main message to be combined with a cover page or a fax cover page to be combined with a main message based on presence or absence of the attribute information. When it is judged that the file includes attribute data for main message or cover page (S2540:YES), then in S2550, the data is registered with the file number in another area, for fax transmission, in the fax data memory region.

During the multiple-copy fax transmission process, as described above, after the personal computer 11 (12, 13, or 14) transmits the main facsImile message data, the personal computer transmits one or more cover pages for one or more address to be transmitted. Therefore, through repeatedly executing the routine from S2510 to S2550, the main facsimile message data is registered as file "1" and the cover page data is registered as files "2" to "n" in the fax transmission memory area.

When it is judged that data registered in the fax data memory region is not a file including attribute information (S2540:NO), then in S2560, it is judged whether the data is data for "send" designation (S).

When it is judged that the data is for "send" designation (S) (S2560:YES), in S2570, it is judged whether any file having attribute information designated by the send designation (S) is present. When a file designated by the send designation (S) is present (S2570:YES), then in S2580, the designated cover page and main facsimile message are combined and set with a "send" flag in S2590. As a result, the judging process of S220 (FIG. 4) will result in an affirmative, and sending processes of FIG. 5(b) will be executed.

When the registered data is not a "send" designation (S) (S2560:NO), then this means that the data is "delete" designation (D) for clearing files "1" to "n". Accordingly, in S2600, files "1" to "n" stored in S2550 are set to a delete flag. As a result, all the files will be cleared in the delete routine (not shown).

During the above-described multiple-copy fax transmission routine, the personal computer transmits to the printer 30 the main facsimile message data only once, and then afterward, transmits cover page data in a required number of sets. Therefore, when performing multiple-copy fax transmission, only a small amount of data need be transmitted from the personal computer 11–14. Because the small amount of data is thus transmitted from the personal computer 11–14 to the printer 30, only a small amount of burden is placed on the memory of the printer 30. Because the main facsimile message data and the cover page data can be distinguished from each other by file number, multiple-copy fax transmission can be performed, according to "send" commands transmitted from the personal computer, by merely combining the same main facsimile message data with one or more different cover pages and by transmitting those combinations.

In the above description, the "send" command is outputted in S2390 after all the files are outputted to the printers 30. It is noted, however, that the main facsimile message data is transmitted as file 1 to the printer 30 in S2280 before the cover page data is transmitted in S2340. Accordingly, the "send" command can be outputted immediately after each set of cover page data is transmitted in S2340 as file "n" to the printer 30.

When only a small amount of the fax data memory region is available, when a large number of cover pages need to be transmitted, or when each cover page includes a large amount of data, if all cover pate data is transmitted and stored in the printer 30 before the main facsimile message data is transmitted to the printer 30, the main facsimile message data may possibly not be stored in the fax data memory region of the printer 30. However, since the main facsimile message data is transmitted before cover page data, the main facsimile message data can be reliably stored in the memory region. Afterwards the required number of cover pages may be consecutively transmitted. Especially, according to the present modification, after each set of cover page is transmitted, a "send" command may be outputted. In this case, a delete command can be outputted immediately after the send command is outputted so that only the cover page data that has just been sent will be deleted. That is, a command for clearing only a cover page that has just been transmitted may be outputted in S2440 so that the already-transmitted single cover page be deleted from the memory region in S2600. By following this order of processes, the operations required to attain the multiple-copy fax transmissions can be suppressed to a minimum amount without generating an insufficient memory condition.

That is, when operations are performed in the above-described order, it is advantageous that the main facsimile messages be transmitted to the printer 30 first, and then later, the cover page data be transmitted to the printer 30.

Also, in order to transmit the main facsimile message data and the cover page data in a combination, the main facsimile message data may be transmitted in a plurality of files to the printer 30 before cover page data. The plurality of main facsimile message data may be combined with a single cover page, and may be transmitted in the same way as described above.

As described above, according to the present embodiment, a user who uses a fax transmission application to transmit data of a facsimile message, prepared using a word processing software in a personal computer, is enabled to print the facsimile message on a print out sheet using simple operations. The fax transmission routine is started in S410 when a fax entering command is transmitted from the personal computer. The fax transmission data is stored in S440 to S490. Once a data operation command, such as a print command, a send command, and a deletion command, are inputted, then corresponding operations are executed in S500 to S570. The print command is included in the data operation commands. Also the fax transmission data is deleted only after a deletion command is received. Therefore, whether or not the fax transmission data has been properly converted into a fax format can be confirmed before the fax transmission data is transmitted to a remote device. Also, a printed copy of the facsimile message can be obtained based on the fax transmission data. There is no need to retransmit the data to the printer 30 in order to obtain the fax copy.

As described above, according to the present embodiment, the printer 30 can be used also as a fax communication device according to the needs of the user. The printer 30 is produced as of a general use type, so that the printer 30 can be manufactured without taking into account communication standards of different countries. The PCMCIA slots 75 and 76 are provided to the printer 30. When a fax modem card 3 is mounted in the PCMCIA slot 75 or 76, a variety of settings are performed in the option detection process of FIG. 3 to enable the printer 30 to execute a fax function in addition to its original printing function. More specifically, a fax data area is secured in S130 in the memory region 63 or 64. Then, fax control interrupt routine operation of FIGS. 4–5(c), fax panel display of FIG. 9, and fax command reception for S410 and on are enabled in S140, S150, and S160. Contrarily, when no fax modem card is mounted in the PCMCIA slot 75 or 76, the memory region is used entirely for storing print data. Settings of wasteful functions, such as the fax control interrupt operations, which can lead to system errors are not performed.

As described above with reference to FIGS. 10–16, the printer tray selection routine of S920 is executed when the printer is set to a printer print mode (yes in S910). On the other hand, when the printer is set to a fax print mode, then either a fax print tray selection routine 1 or a fax print tray selection routine 2 (S930 to S960) is performed depending on whether a compulsory print mode is set or not. During each of the fax print tray selection routines 1, 2, forced printing is enabled only when a normal sheet having A4, letter, or legal size is available in the sheet supply tray. During the fax print tray selection routine 2, when there is a possibility that memory in the fax reception data storage region become insufficient, printing is compulsorily performed if the available sheet has a sufficiently large size to prevent loss of information even if the sheet is not a normal type sheet, for example, an overhead projector sheet. In this way, fax reception errors due to lack of memory can be prevented.

As described above with reference to FIGS. 17 and 18, printing of fax reception data is started after fax reception is completed. Once printing based on fax reception data is started, printing based on fax data is continued until printing based on all fax data is completed (S1810 to S1840). Afterward, the printer 30 is enabled to receive print data. On the other hand, a request for printing based on print data can be received at any time until reception of fax data is completed (S1810, S1840). Once printing based on print data has started, printing based on fax data will not be performed until printing based on print data is completed (S1840 to S1860).

As described above with reference to FIGS. 19(a)–19(c), when printing is to be performed on fax data, setting conditions relating to a page protect mode for a printer function are stored in S2010. Then, the page protect mode is turned off in S2020. After the page protect mode is thus turned off, printing is performed based on fax data in S2030 and S2040. That is, a large free area is used to convert fax data, such as G3 compressed type fax data, into compressed data for printing. By performing band processes, bit map data for actual printing is developed a predetermined line's worth at a time from the start of the page in order to the end of the page, and printing is performed. After printing is completed, the settings relating to the page protect mode are returned to the normal state in S2050 and 2060.

[Second Embodiment]

Figure 24:
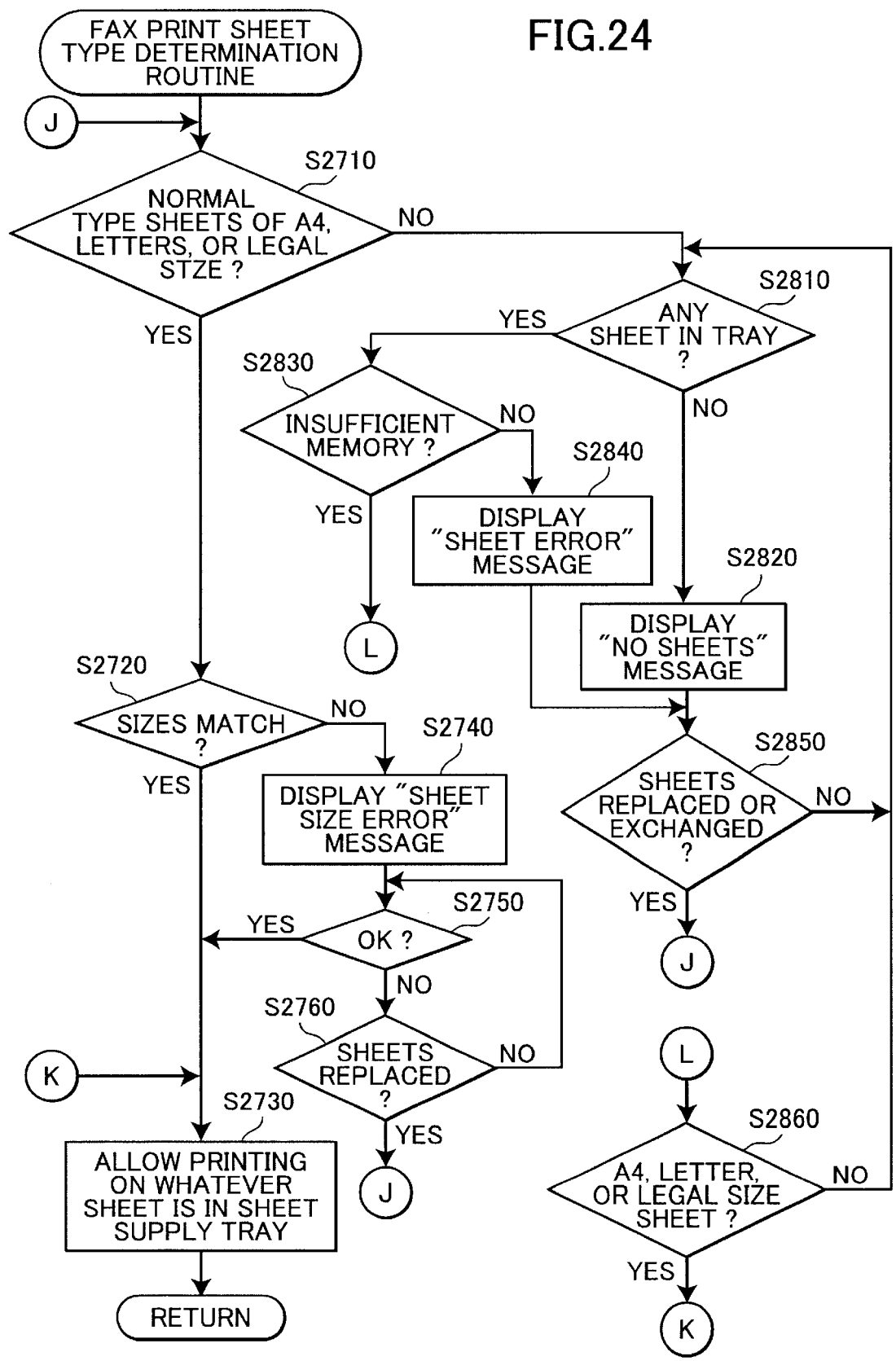
FIG. 24 is a flowchart showing a process for judging a type of sheet for FAX printing process according to a second embodiment of the present invention.

A local area network system according to a second embodiment will be described with reference to FIG. 24.

This embodiment is related to the case where the printer 30 has only a single sheet supply tray or the case where the printer 30 has a plurality of sheet supply trays but only one of the sheet supply trays is set for being used to print based on fax data. The other sheet supply trays can not be used during reception of fax data. In such a case, a fax print type determination routine of FIG. 24 is executed in the printer 30 during reception process of fax data.

During the fax print type determination routine, the CPU 61 first judges in S2710 whether or not sheets in the sheet supply tray for FAX printing are normal type sheets with normal sizes. The "normal sizes" is meant to include A4. letter, and legal sizes. The "normal type sheet" is meant to indicate normal white thin papers, rather than overhead projector sheets, thick sheets, or colored sheets. The size and the type of sheets can be determined by detection sensors as described above or by operations performed by the user to indicate what type and size of the sheet is in the sheet supply tray.

When a normal type sheet with a normal size is in the sheet supply tray (S2710:YES), then it is judged in S2720 whether or not the size of the sheet matches the size required for printing based on fax data. When the sizes match (S2720:YES), then printing on the sheet in the sheet supply tray is enabled in S2730.

On the other hands, when the sheet in the sheet supply tray is A4, letter, or legal sized normal sheet (yes in S2710) but is not an appropriate size for printing based on fax reception data (no in S2720), then a size error message is displayed in S2740 to urge the user to exchange the sheets. When the user presses a "CONTINUE" key to indicate the user's desire to perform forced printing (S2750:YES), then printing is enabled in S2730 so that printing is performed on the normal type sheet with the A4, letter, or legal size in the sheet supply tray although the sheet size is not appropriate for the FAX data.

When the user does not wish to perform forced printing (S2750:NO), then in S2760 it is judged whether or not the sheet has been replaced. When the sheet is replaced (S2760:YES), this routine returns to the initial step of S2710.

When a normal type sheet with a normal size is not contained in the sheet supply tray (S2710:NO), then in S2810 it is judged whether or not a sheet of any kind with any size is provided in the sheet supply tray. If no sheets at all are in the sheet supply tray (S2810:NO), then "no sheet error" is displayed in S2820 to urge the user to add sheets in the sheet supply tray.

When some type of sheet with some size is disposed in the sheet supply tray (S2810:YES), then in S2830 it is judged whether or not the fax reception region has insufficient memory. If the fax reception region has sufficient memory (S2830:NO), then a "sheet error" message is displayed in S2840, urging the user to exchange the sheet in the sheet supply tray. After the error messages are displayed in S2820 or S2840, then in S2850 it is judged whether or not sheets are replaced or added in the same manner as in S2760. When sheets are replaced (S2850:YES), then the program returns to the beginning of this routine.

However, when it is judged that the memory is insufficient (S2830:YES), then in S2860 it is judged whether or not any type of sheet with a normal size (A4, letter, or legal size) is stored in the sheet supply tray. Difference between S2860 and S2710 is that in S2860, the type of sheet is not judged. That is, even if the type of sheet in the sheet supply tray is an overhead projector sheet, a thick sheet, or a colored sheet, if the sheet has a size that will allow printing based on the fax reception data (S2860:YES), then the program proceeds to S2730 and printing is performed on the sheet housed in the sheet supply tray based on the fax data.

In the present embodiment, when the printer 30 has only a single sheet supply tray or when the printer 30 has a plurality of sheet supply trays but only a single sheet supply tray is available for being used to print based on fax data, printing is performed on the sheet in the sheet supply tray when the sheet has an optimum size for printing fax data. Printing is not performed when the sheet is not such a type and size so that any portion of the fax message will not be lost.

The forced printing can be performed only when a normal type sheet with normal size is available in the sheet supply tray. That is, if a normal type sheet with a too small size such as B5 is available in the sheet supply tray, then forced printing can not be performed. This prevents a portion of the fax messages from being lost during the force printing operation. Because fax data can be received for a fixed A4 size sheet, forced printing is enabled when A4, letter, or legal size sheets are available. Printing can be performed onto those sheets based on fax data without losing any portions of a main body or message of the fax message.

Further, even when the sheet in the sheet supply tray has one of the above-described three normal sizes, when the sheet is not a normal type sheet such as an overhead projector sheet or an envelope, then forced printing can not be performed. Therefore, there is no fear of wasting sheets such as expensive overhead projector sheets.

When some type of sheets are available in the sheet supply tray, it is judged whether there is a possibility that the memory area might be insufficient. When the memory might become a memory full condition, then the printer 30 is set to its compulsory printing mode if the sheets in the sheet supply tray have the normal size such as A4 even if the sheets are of a peculiar type, such as overhead projector sheet. This prevents a facsimile reception error from occurring due to lack of memory area. On the other hand, even if it is judged that the memory area is insufficient, when the size of the sheet in the sheet supply tray is not the normal size (A4 size, letter size, or legal size), then printing is not enabled so that fax messages will not be lost.

The present embodiment can be modified so that not only the above-described normal type sheets with the three (A4, letter and legal) sizes but also other normal type sheets with sizes large than the three sizes can enable forced printings to be performed or can enable printing in the compulsory print mode. If the sheet is thus overly large, no portions of the received fax message will be lost. Also, compared to an overhead projector sheet, A3 size or B4 size sheets are still cheaper and the user can cut the overly large sheets down to a desired size using a paper cutter and the like.

While the invention has been described in detail with reference to the specific embodiments thereof, it would be apparent to those skilled in the art that various changes and modifications may be made therein without departing from the spirit of the invention, the scope of which is defined by the attached claims.

For example, in the above-described embodiments, the present invention is applied to the printer 30. However, the present invention can be applied to other various types of image processing devices for processing images to input or output image information. For example, the present invention can be applied to an image scanner so that the image scanner can perform both its own image scanning operation (original function) and the facsimile communication function. In this case, it becomes possible to easily transmit images, printed on a paper, to a remote device. The present invention can be applied also to a printer provided with an image scanner so that the printer can perform its own printing operation and image scanning operation (original functions) and the facsimile communication function.

As described above, according to the present invention, any type of image processing device is enabled to perform facsimile communication function in addition to its own original function. The image processing device can still be manufactured without taking into account the communication standards for many counties, where the image processing device is to be used.

With using the image processing device of the present invention, by changing the fax modem between the image processing device and a personal computer depending on whether it is daytime or night time, the image processing device can be used for its main function during the daytime and the image processing device can be used as a fax reception device during the night time. These functions can be divided in this way so it is very convenient.

Especially when the present invention is applied to the image processing device having a printer mechanism, an image communication device such as a fax modem card can be mounted in the image processing device. A personal computer installed with a fax communication application software is connected to the image processing device. With this configuration, during fax transmission, fax transmission data need merely be transmitted from the personal computer to the image processing device. Accordingly, compared to configuration wherein the fax modem card is mounted in the personal computer and the personal computer is connected to a public telephone circuit network, so that the fax transmission data can be outputted over the public circuit network from the personal computer, the time required to output data from the personal computer can be greatly shortened. As a result, burden placed on the personal computer can be reduced so that the personal computer can be more effectively used. By mounting the fax card in the image processing device having a printer function to add a fax communication function so that fax reception is also possible, with respect to fax reception also there is no need to designate data at the personal computer and output a print command each time it is desired to print out on a sheet of paper according to the received fax data. Therefore, operations are trouble-free when the user wishes to print out based on the plurality of received fax data sets.

Also, the present invention can be applied to the image processing device having an image scanner function. In this case, a fax modem card can be mounted in the image processing device located within an office system. Information such as text printed on the sheet is retrieved using the image processing device. Then, fax transmission can be directly performed. Compared to the situation wherein data formed in the image scanner is first retrieved by a personal computer and then the personal computer performs fax transmission, operations are much easier.

What is claimed is:

1. An image processing device, comprising:

means for processing an image according to an original image processing function;

an interface detachably mounted with a facsimile image communication unit;

means for adding a facsimile communication function to the image processing means when the facsimile image communication unit is mounted to the interface;

means for judging whether or not the facsimile communication unit is mounted to the interface, the function adding means includes means for setting the image processing means into a facsimile communication enabling state capable of performing facsimile communication when the facsimile communication unit is judged to be mounted to the interface; and a storage area capable of storing data, wherein the setting means includes means for setting, in the storage area, a memory region for being used for facsimile communication, and wherein the function adding means includes means for prestoring a facsimile function adding program for adding the facsimile communication function to the image processing means.

2. An image processing device as claimed in claim 1, wherein the image processing means includes means for printing print data, the function adding means enabling the printing means to print facsimile data received from outside via the facsimile communication unit.

3. An image processing device as claimed in claim 1, wherein the interface includes a general use interface.

4. An image processing device as claimed in claim 3, wherein the interface includes a PCMCIA slot, and the communication unit includes a facsimile modem card.

5. An image processing device as claimed in claim 1, wherein the judging means automatically judges whether or not the facsimile communication unit is mounted to the interface.

6. An image processing device as claimed in claim 1, wherein the judging means judges whether or not the facsimile communication unit is mounted to the interface when a judging command is inputted from outside.

7. An image processing device as claimed in claim 1, further comprising means for prestoring a program of a facsimile control interrupt process, wherein the setting means includes means for executing the program of the facsimile control interrupt process.

8. An image processing device as claimed in claim 1, further comprising means for displaying messages, wherein the setting means includes means for controlling the display means to display not only a message for the original function but also a message for the facsimile communication function.

9. An image processing device as claimed in claim 1, further comprising means connected to an external device and capable of receiving commands from the external device, wherein the setting means includes means for controlling the command receiving means into a state capable of receiving a facsimile communication command from the external device.

10. An image processing device as claimed in claim 9, further comprising:

means for interpreting whether a command received from the external device is either a command for the original function or a facsimile communication function; and means for switching, based on the interpreted result, the image processing means to perform the original function and to perform the facsimile communication function.

11. An image processing device, comprising:

means for processing an image according to an original image processing function;

an interface detachably mounted with a facsimile image communication unit;

means for adding a facsimile communication function to the image processing means when the facsimile image communication unit is mounted to the interface;

a storage area;

means for inputting a reset command; and means for executing different resetting processes onto data, stored in the storage area, for being processed by the original function and data, stored in the storage area, for being processed by the facsimile communication function, wherein the function adding means includes means for prestoring a facsimile function adding program for adding the facsimile communication function to the image processing means.

12. An image processing device as claimed in claim 11, wherein the reset execution means includes:

means for clearing the data for being processed by the original function; and means for clearing transmission data for being processed by the facsimile function when the transmission data being received when the reset command is inputted and for maintaining the transmission data for being processed by the facsimile function when the transmission data is already stored in the storage area when the reset command is inputted.

13. An image processing device as claimed in claim 12, wherein the reset execution means further includes means for performing an error process to notify an error to outside when the clearing means clears the transmission data in response to the reset command.

14. An image processing device as claimed in claim 11, wherein the reset execution means includes means for continuing receiving transmission data for being processed by the facsimile function when the transmission data being received when the reset command is inputted and for maintaining the transmission data after the reception is completed, and for disabling reception of other transmission data to be received after the transmission data and for clearing data for being processed by the original function.

15. An image processing device, comprising:

means for processing an image according to an original image processing function;

an interface detachably mounted with a facsimile image communication unit;

means for adding a facsimile communication function to the image processing means when the facsimile image communication unit is mounted to the interface;

means capable of displaying a message; and means for controlling the display means to display a warning screen to inform a user that the facsimile communication is being performed, wherein the function adding means includes means for prestoring a facsimile function adding program for adding the facsimile communication function to the image processing means.

16. An image processing device as claimed in claim 15, wherein the control means controls the display means to stop displaying the warning screen when the user operates an operation panel.

17. An image processing device, comprising:
  means for processing an image according to an original image processing function;
  an interface detachably mounted with a facsimile image communication unit;
  means for adding a facsimile communication function to the image processing means when the facsimile image communication unit is mounted to the interface; and
  means capable of receiving print data to be printed and facsimile data to be printed; and
  a storage area having a print data memory region capable of storing the received print data to be printed, wherein the image processing means includes means for printing print data, the function adding means enabling the printing means to print facsimile data received from outside via the facsimile communication unit, and
  wherein the function adding means includes means for forming, in the storage area, a facsimile data memory region capable of storing the facsimile data to be printed.

18. An image processing device as claimed in claim 17, further comprising:
  first facsimile data control means for, while the reception means receives the facsimile data, controlling the printing means not to start printing facsimile data and to store the facsimile data in the facsimile data memory region, while enabling the reception means to receive a print request for print data until the reception means completes receiving the facsimile data;
  second facsimile data control means for, when the reception means completes receiving the facsimile data and when printing of print data is not yet started, controlling the printing means to start printing the facsimile data stored in the facsimile data memory region, and for prohibiting an interruption by a print request for print data until printing of the facsimile data is completed; and
  print data control means for storing print data to the print data memory region while interruption by the print request is prohibited by the second facsimile data control means and for, when the interruption by the print request is not prohibited, controlling the printing means to print print data while prohibiting the printing means from printing facsimile data until printing of the print data is completed.

19. An image processing device as claimed in claim 18, wherein the first facsimile data control means includes:
  means for judging, while facsimile data is being received, whether the amount of an empty area in the facsimile data memory region will become smaller than a predetermined amount and the facsimile data memory region will become a memory full condition; and
  means for, when the memory full condition is judged, prohibiting the interruption by the print data printing request, controlling the printing means to start printing the facsimile data stored in the facsimile data memory region, and enabling the interruption by the print data printing request when printing of the facsimile data is completed.

20. An image processing device, comprising:
  means for processing an image according to an original image processing function;
  an interface detachably mounted with a facsimile image communication unit;
  means for adding a facsimile communication function to the image processing means when the facsimile image communication unit is mounted to the interface;
  means for setting a page protect mode for securing, in the common area, an image region for developing one page's worth of print data as image data to be printed by the printing means; and
  means for controlling the printing means to print the facsimile data while turning off the page protect mode to the common area, wherein the image processing means includes means for printing print data, the function adding means enabling the printing means to print facsimile data received from outside via the facsimile communication unit, the image processing device further comprising a storage area capable of storing data, the storage area having a predetermined common area, wherein the function adding means includes means for securing, in the storage area, a facsimile data memory region capable of storing the facsimile data to be printed.

21. An image processing device as claimed in claim 20, wherein the control means returns the page protect mode to the original state after the printing means completes printing the facsimile data.

22. An image processing device as claimed in claim 21, wherein the control means includes;
  means for storing data of conditions, on which the page protect mode is set by the page protect mode setting means;
  means for turning off the page protect mode after data of the page protect mode setting conditions is stored;
  means for controlling the printing means to print facsimile data after the page protect mode is turned off; and
  means for returning the page protect mode to the original state, according to the setting condition stored by the page protect mode setting condition storing means, after the printing of the facsimile data is completed.

23. An image processing device, comprising:
  means for processing an image according to an original image processing function;
  an interface detachably mounted with a facsimile image communication unit;
  means for adding a facsimile communication function to the image processing means when the facsimile image communication unit is mounted to the interface;
  a storage area capable of storing data, the storage area having a predetermined common area; and
  at least one interface capable of receiving facsimile data and print data, wherein the function adding means includes:
    means for securing, in the storage area, a facsimile data memory region capable of storing the facsimile data to be printed; and
    means for controlling the printing means to print the facsimile data, stored in the facsimile data memory region, while developing the facsimile data in the predetermined common area, the image processing device further comprising:
    means for judging whether or not a sufficient empty area exists in the common area for developing the facsimile data; and means for, when it is judged that the sufficient empty area does not exist in the common area, bringing an interface, that is not presently receiving facsimile data, into a data reception disabled condition incapable of receiving any data, wherein the image processing means includes means for printing print data, the function adding means enabling the printing means to print facsimile data received from outside via the facsimile communication unit.

24. An image processing device as claimed in claim 23, further comprising means for returning the interface, that has been brought into the data reception disabled condition, into a condition that can receive data when the judging means judges that a sufficient empty area exists in the common area.

25. An image processing device as claimed in claim 1, wherein the image processing means includes means for printing print data, the function adding means enabling the printing means to print facsimile data received from outside via the facsimile communication unit, wherein the printing means includes:

at least one sheet feed tray each for storing a recording sheet;

means capable of receiving print data from outside and capable of receiving facsimile data from the facsimile communication unit; and means capable of automatically feeding the recording sheet from each sheet feed tray and for printing the print data onto the recording sheet, and the image processing device further comprises:

means for determining at least one of a size and a kind of the recording sheet stored in the at least one sheet feed tray; and means for prohibiting the sheet feeding and printing means from printing the facsimile data received via the facsimile communication unit at least one of the time when the determined size of the recording sheet is inappropriate for printing the facsimile data and the time when the determined kind of the recording sheet is not a normal sheet of paper.

26. An image processing device as claimed in claim 25, wherein the determining means determines the size of the recording sheet stored in the sheet feed tray, the prohibiting means prohibiting the sheet feeding and printing means from printing the facsimile data when the determined size of the recording sheet is inappropriate for printing the facsimile data.

27. An image processing device as claimed in claim 26, wherein the determining means determines the kind of the recording sheet stored in the sheet feed tray, the prohibiting means prohibiting the sheet feeding and printing means from printing the facsimile data when the determined kind of the recording sheet is not a normal sheet of paper.

28. An image processing device as claimed in claim 25, wherein the determining means includes:

means for determining the size of the recording sheet stored in the sheet feed tray; and means for determining the kind of the recording sheet stored in the sheet feed tray, and wherein the prohibiting means prohibits the sheet feeding and printing means from printing the facsimile data when the determined kind of the recording sheet is not a normal sheet of paper even when the determined size of the recording sheet is appropriate for printing the facsimile data.

29. An image processing device as claimed in claim 25, further comprising:

means for, when print data is received by the receiving means, judging whether or not the determined sheet size is appropriate for printing the print data; and means for controlling, when it is judged that the determined size is appropriate for printing the print data, the sheet feeding and printing means to automatically feed the recording sheet from the sheet feed tray and to print the print data on the recording sheet, wherein the prohibiting means prohibits the sheet feeding and printing means from printing the facsimile data when the determined kind of the recording sheet is not a normal sheet of paper even when it is judged that the size of the recording sheet stored in the feed sheet tray is appropriate for printing the facsimile data.

30. An image processing device as claimed in claim 25, wherein a plurality of feed sheet trays are provided, the image processing device further comprising:

means for designating a tray to be used for printing; and means for determining at least size and kind of the recording sheet stored in each feed sheet tray, wherein the prohibiting means prohibits the sheet feeding and printing means from printing the facsimile data at least one of the time when the determined size of the recording sheet stored in the designated feed sheet tray is inappropriate for printing the facsimile data and the time when the determined kind of the recording sheet stored in the designated feed sheet tray is not a normal sheet of paper.

31. An image processing device as claimed in claim 30, wherein the determining means includes:

means for determining the size of the recording sheet stored in each sheet feed tray; and means for determining the kind of the recording sheet stored in each sheet feed tray, and wherein the prohibiting means prohibits the sheet feeding and printing means from printing the facsimile data when the determined kind of the recording sheet in the designated sheet feed tray is not a normal sheet of paper even when the determined size of the recording sheet in the designated sheet feed tray is appropriate for printing the facsimile data.

32. An image processing device as claimed in claim 30, further comprising:

means for, when print data is received by the receiving means, judging whether or not the determined size of the sheet in the designated sheet feed tray is appropriate for printing the print data; and means for controlling, when it is judged that the determined size is appropriate for printing the print data, the sheet feeding and printing means to automatically feed the recording sheet from the designated sheet feed tray and to print the print data on the recording sheet, wherein the prohibiting means prohibits the sheet feeding and printing means from printing the facsimile data when the determined kind of the recording sheet in the designated sheet feed tray is not a normal sheet of paper even when it is judged that the size of the recording sheet stored in the designated feed sheet tray is appropriate for printing the facsimile data.

33. An image processing device as claimed in claim 25, wherein a plurality of feed sheet trays are provided, and the determining means includes:

means for determining the size of the recording sheet stored in each feed sheet tray; and means for determining the kind of the recording sheet stored in each feed sheet tray;

the image processing means further comprising:

means for selecting a tray, to be used for printing print data, that has a recording sheet with a size consistent with print data received by the receiving means; and means for controlling the sheet feeding and printing means to automatically feed the recording sheet from the selected tray and to print the print data on the recording sheet, wherein the prohibiting means prohibits the sheet feeding and printing means from printing the facsimile data when the determined kind of the recording sheet stored in the feed sheet tray selected by the selecting means is not a normal sheet of paper even when the determined size of the recording sheet stored in the selected one feed sheet tray is appropriate for printing the facsimile data.

34. An image processing device as claimed in claim 29, further comprising means for instructing a forced printing operation to the sheet feeding and printing means when the feeding and printing means is controlled not to perform printing operation due to inconsistency in size of the sheet with the print data and when some recording sheet is stored in the feed sheet tray, thereby printing print data onto a sheet with an inconsistent size; and means for prohibiting the forced printing instruction means from instructing the forced printing operation for the facsimile data.

35. An image processing device as claimed in claim 32, further comprising means for instructing a forced printing operation to the sheet feeding and printing means when the feeding and printing means is controlled not to perform printing operation due to inconsistency in size of the sheet with the print data and when some recording sheet is stored in the designated feed sheet tray, thereby printing print data onto a sheet with an inconsistent size; and means for prohibiting the forced printing instruction means from instructing the forced printing operation for the facsimile data.

36. An image processing device as claimed in claim 33, further comprising means for instructing a forced printing operation to the sheet feeding and printing means when the feeding and printing means is controlled not to perform printing operation due to inconsistency in size of the sheet with the print data and when some recording sheet is stored in at least one feed sheet tray, thereby selecting the feed sheet tray storing some recording sheet and printing print data onto the sheet with the inconsistent size; and means for prohibiting the forced printing instruction means from instructing the forced printing operation for the facsimile data.

37. An image processing device as claimed in claim 36, wherein the forced printing instruction prohibiting means changes a condition for selecting a sheet feed tray for the forced printing operation dependently on whether print data is to be printed or facsimile data is to be printed.

38. An image processing device as claimed in claim 37, wherein the forced printing instruction prohibiting means enables the forced printing only when the determining means determines that some sheet feed tray stores a normal sheet of paper with a size printable by the facsimile data without losing any part from the facsimile data.

39. An image processing device as claimed in claim 28, further comprising:

means for detecting a remaining amount of the facsimile data memory region; and means for, when the remaining amount is detected as too small to store facsimile data to be received via the facsimile unit and when the determining means determines that some feed sheet tray stores a recording sheet of paper that is not a normal sheet of paper but that has a size printable by the facsimile data without losing any part from a main body of the facsimile data, controlling the sheet feeding and printing means to automatically feed a recording sheet from the some feed sheet tray and to print the facsimile data on the recording sheet regardless of the prohibiting means.

* * * * *